(12) United States Patent
Srikanth et al.

(10) Patent No.: US 10,089,740 B2
(45) Date of Patent: Oct. 2, 2018

(54) SYSTEM AND METHODS FOR DEPTH REGULARIZATION AND SEMIAUTOMATIC INTERACTIVE MATTING USING RGB-D IMAGES

(71) Applicant: FotoNation Limited, Ballybrit, Galway (IE)

(72) Inventors: Manohar Srikanth, Mountain View, CA (US); Ravi Ramamoorthi, Carlsbad, CA (US); Kartik Venkataraman, San Jose, CA (US); Priyam Chatterjee, Sunnyvale, CA (US)

(73) Assignee: FotoNation Limited (IE)

( * ) Notice: Subject to any disclaimer, the term of this patent is extended or adjusted under 35 U.S.C. 154(b) by 490 days.

(21) Appl. No.: 14/642,637

(22) Filed: Mar. 9, 2015

(65) Prior Publication Data

US 2015/0254868 A1    Sep. 10, 2015

Related U.S. Application Data

(60) Provisional application No. 61/949,999, filed on Mar. 7, 2014.

(51) Int. Cl.
*H04N 13/15*    (2018.01)
*G06T 7/00*    (2017.01)
(Continued)

(52) U.S. Cl.
CPC ............. *G06T 7/0081* (2013.01); *G06T 7/11* (2017.01); *G06T 7/194* (2017.01);
(Continued)

(58) Field of Classification Search
None
See application file for complete search history.

(56) References Cited

U.S. PATENT DOCUMENTS

| 4,124,798 A | 11/1978 | Thompson |
| 4,198,646 A | 4/1980 | Alexander et al. |

(Continued)

FOREIGN PATENT DOCUMENTS

| CN | 1669332 A | 9/2005 |
| CN | 1839394 A | 9/2006 |

(Continued)

OTHER PUBLICATIONS

US 8,957,977, 02/2015, Venkataraman et al. (withdrawn)
(Continued)

*Primary Examiner* — William C Vaughn, Jr.
*Assistant Examiner* — Stuart Bennett
(74) *Attorney, Agent, or Firm* — KPPB LLP

(57) ABSTRACT

Systems and methods in accordance with embodiments of this invention perform depth regularization and semiautomatic interactive matting using images. In an embodiment of the invention, the image processing pipeline application directs a processor to receive (i) an image (ii) an initial depth map corresponding to the depths of pixels within the image, regularize the initial depth map into a dense depth map using depth values of known pixels to compute depth values of unknown pixels, determine an object of interest to be extracted from the image, generate an initial trimap using the dense depth map and the object of interest to be extracted from the image, and apply color image matting to unknown regions of the initial trimap to generate a matte for image matting.

17 Claims, 24 Drawing Sheets

(51) Int. Cl.
- *H04N 5/232* (2006.01)
- *H04N 5/272* (2006.01)
- *H04N 5/262* (2006.01)
- *G06T 7/11* (2017.01)
- *G06T 7/194* (2017.01)
- *H04N 13/271* (2018.01)
- *H04N 13/00* (2018.01)

(52) U.S. Cl.
CPC ..... *H04N 5/23216* (2013.01); *H04N 5/23293* (2013.01); *H04N 5/2621* (2013.01); *H04N 5/272* (2013.01); *G06T 2200/24* (2013.01); *G06T 2200/28* (2013.01); *G06T 2207/10024* (2013.01); *G06T 2207/10028* (2013.01); *G06T 2207/20096* (2013.01); *H04N 13/15* (2018.05); *H04N 13/271* (2018.05); *H04N 2013/0081* (2013.01)

(56) References Cited

U.S. PATENT DOCUMENTS

| | | |
|---|---|---|
| 4,323,925 A | 4/1982 | Abell et al. |
| 4,460,449 A | 7/1984 | Montalbano |
| 4,467,365 A | 8/1984 | Murayama et al. |
| 4,652,909 A | 3/1987 | Glenn |
| 4,899,060 A | 2/1990 | Lischke |
| 5,005,083 A | 4/1991 | Grage |
| 5,070,414 A | 12/1991 | Tsutsumi |
| 5,144,448 A | 9/1992 | Hornbaker |
| 5,157,499 A | 10/1992 | Oguma et al. |
| 5,325,449 A | 6/1994 | Burt |
| 5,327,125 A | 7/1994 | Iwase et al. |
| 5,488,674 A | 1/1996 | Burt |
| 5,629,524 A | 5/1997 | Stettner et al. |
| 5,638,461 A | 6/1997 | Fridge |
| 5,793,900 A | 8/1998 | Nourbakhsh et al. |
| 5,801,919 A | 9/1998 | Griencewic et al. |
| 5,808,350 A | 9/1998 | Jack et al. |
| 5,832,312 A | 11/1998 | Rieger et al. |
| 5,833,507 A | 11/1998 | Woodgate et al. |
| 5,880,691 A | 3/1999 | Fossum et al. |
| 5,911,008 A | 6/1999 | Niikura et al. |
| 5,933,190 A | 8/1999 | Dierickx et al. |
| 5,963,664 A | 10/1999 | Kumar et al. |
| 5,973,844 A | 10/1999 | Burger |
| 6,002,743 A | 12/1999 | Telymonde |
| 6,005,607 A | 12/1999 | Uomori et al. |
| 6,034,690 A | 3/2000 | Gallery et al. |
| 6,069,351 A | 5/2000 | Mack |
| 6,069,365 A | 5/2000 | Chow et al. |
| 6,097,394 A | 8/2000 | Levoy et al. |
| 6,124,974 A | 9/2000 | Burger |
| 6,130,786 A | 10/2000 | Osawa et al. |
| 6,137,100 A | 10/2000 | Fossum et al. |
| 6,137,535 A | 10/2000 | Meyers |
| 6,141,048 A | 10/2000 | Meyers |
| 6,160,909 A | 12/2000 | Melen |
| 6,163,414 A | 12/2000 | Kikuchi et al. |
| 6,172,352 B1 | 1/2001 | Liu et al. |
| 6,175,379 B1 | 1/2001 | Uomori et al. |
| 6,205,241 B1 | 3/2001 | Melen |
| 6,239,909 B1 | 5/2001 | Hayashi et al. |
| 6,292,713 B1 | 9/2001 | Jouppi et al. |
| 6,340,994 B1 | 1/2002 | Margulis et al. |
| 6,358,862 B1 | 3/2002 | Ireland et al. |
| 6,443,579 B1 | 9/2002 | Myers et al. |
| 6,476,805 B1 | 11/2002 | Shum et al. |
| 6,477,260 B1 | 11/2002 | Shimomura |
| 6,502,097 B1 | 12/2002 | Chan et al. |
| 6,525,302 B2 | 2/2003 | Dowski, Jr. et al. |
| 6,552,742 B1 | 4/2003 | Seta |
| 6,563,537 B1 | 5/2003 | Kawamura et al. |
| 6,571,466 B1 | 6/2003 | Glenn et al. |
| 6,603,513 B1 | 8/2003 | Berezin |
| 6,611,289 B1 | 8/2003 | Yu |
| 6,627,896 B1 | 9/2003 | Hashimoto et al. |
| 6,628,330 B1 | 9/2003 | Lin |
| 6,635,941 B2 | 10/2003 | Suda |
| 6,639,596 B1 | 10/2003 | Shum et al. |
| 6,647,142 B1 | 11/2003 | Beardsley |
| 6,657,218 B2 | 12/2003 | Noda |
| 6,671,399 B1 | 12/2003 | Berestov |
| 6,674,892 B1 | 1/2004 | Melen et al. |
| 6,750,904 B1 | 6/2004 | Lambert |
| 6,765,617 B1 | 7/2004 | Tangen et al. |
| 6,771,833 B1 | 8/2004 | Edgar |
| 6,774,941 B1 | 8/2004 | Boisvert et al. |
| 6,788,338 B1 | 9/2004 | Dinev |
| 6,795,253 B2 | 9/2004 | Shinohara |
| 6,801,653 B1 | 10/2004 | Wu et al. |
| 6,819,328 B1 | 11/2004 | Moriwaki et al. |
| 6,819,358 B1 | 11/2004 | Kagle et al. |
| 6,879,735 B1 | 4/2005 | Portniaguine et al. |
| 6,897,454 B2 | 5/2005 | Sasaki et al. |
| 6,903,770 B1 | 6/2005 | Kobayashi et al. |
| 6,909,121 B2 | 6/2005 | Nishikawa |
| 6,917,702 B2 | 7/2005 | Beardsley |
| 6,927,922 B2 | 8/2005 | George et al. |
| 6,958,862 B1 | 10/2005 | Joseph |
| 6,985,175 B2 | 1/2006 | Iwai et al. |
| 7,015,954 B1 | 3/2006 | Foote et al. |
| 7,085,409 B2 | 8/2006 | Sawhney et al. |
| 7,161,614 B1 | 1/2007 | Yamashita et al. |
| 7,199,348 B2 | 4/2007 | Olsen et al. |
| 7,206,449 B2 | 4/2007 | Raskar et al. |
| 7,215,364 B2 | 5/2007 | Wachtel et al. |
| 7,235,785 B2 | 6/2007 | Hornback et al. |
| 7,245,761 B2 | 7/2007 | Grossberg et al. |
| 7,262,799 B2 | 8/2007 | Suda |
| 7,292,735 B2 | 11/2007 | Blake et al. |
| 7,295,697 B1 | 11/2007 | Satoh |
| 7,333,651 B1 | 2/2008 | Kim et al. |
| 7,369,165 B2 | 5/2008 | Bosco et al. |
| 7,391,572 B2 | 6/2008 | Jacobowitz et al. |
| 7,408,725 B2 | 8/2008 | Sato |
| 7,425,984 B2 | 9/2008 | Chen |
| 7,430,312 B2 | 9/2008 | Gu |
| 7,496,293 B2 | 2/2009 | Shamir et al. |
| 7,564,019 B2 | 7/2009 | Olsen |
| 7,599,547 B2 | 10/2009 | Sun et al. |
| 7,606,484 B1 | 10/2009 | Richards et al. |
| 7,620,265 B1 | 11/2009 | Wolff |
| 7,633,511 B2 | 12/2009 | Shum et al. |
| 7,639,435 B2 | 12/2009 | Chiang et al. |
| 7,646,549 B2 | 1/2010 | Zalevsky et al. |
| 7,657,090 B2 | 2/2010 | Omatsu et al. |
| 7,667,824 B1 | 2/2010 | Moran et al. |
| 7,675,080 B2 | 3/2010 | Boettiger |
| 7,675,681 B2 | 3/2010 | Tomikawa et al. |
| 7,706,634 B2 | 4/2010 | Schmitt et al. |
| 7,723,662 B2 | 5/2010 | Levoy et al. |
| 7,738,013 B2 | 6/2010 | Galambos et al. |
| 7,741,620 B2 | 6/2010 | Doering et al. |
| 7,782,364 B2 | 8/2010 | Smith |
| 7,826,153 B2 | 11/2010 | Hong |
| 7,840,067 B2 | 11/2010 | Shen et al. |
| 7,912,673 B2 | 3/2011 | Hébert et al. |
| 7,924,321 B2 | 4/2011 | Mitsunaga et al. |
| 7,956,871 B2 | 6/2011 | Fainstain et al. |
| 7,965,314 B1 | 6/2011 | Miller et al. |
| 7,973,834 B2 | 7/2011 | Yang |
| 7,986,018 B2 | 7/2011 | Rennie |
| 7,990,447 B2 | 8/2011 | Honda et al. |
| 8,000,498 B2 | 8/2011 | Shih et al. |
| 8,013,904 B2 | 9/2011 | Tan et al. |
| 8,027,531 B2 | 9/2011 | Wilburn et al. |
| 8,044,994 B2 | 10/2011 | Vetro et al. |
| 8,055,466 B2 | 11/2011 | Bryll |
| 8,077,245 B2 | 12/2011 | Adamo et al. |
| 8,089,515 B2 | 1/2012 | Chebil et al. |
| 8,098,297 B2 | 1/2012 | Crisan et al. |
| 8,098,304 B2 | 1/2012 | Pinto et al. |
| 8,106,949 B2 | 1/2012 | Tan et al. |

(56) References Cited

U.S. PATENT DOCUMENTS

| | | |
|---|---|---|
| 8,111,910 B2 | 2/2012 | Tanaka |
| 8,126,279 B2 | 2/2012 | Marcellin et al. |
| 8,130,120 B2 | 3/2012 | Kawabata et al. |
| 8,131,097 B2 | 3/2012 | Lelescu et al. |
| 8,149,323 B2 | 4/2012 | Li |
| 8,164,629 B1 | 4/2012 | Zhang |
| 8,169,486 B2 | 5/2012 | Corcoran et al. |
| 8,180,145 B2 | 5/2012 | Wu et al. |
| 8,189,065 B2 | 5/2012 | Georgiev et al. |
| 8,189,089 B1 | 5/2012 | Georgiev |
| 8,194,296 B2 | 6/2012 | Compton |
| 8,212,914 B2 | 7/2012 | Chiu |
| 8,213,711 B2 | 7/2012 | Tam |
| 8,231,814 B2 | 7/2012 | Duparre |
| 8,242,426 B2 | 8/2012 | Ward et al. |
| 8,244,027 B2 | 8/2012 | Takahashi |
| 8,244,058 B1 | 8/2012 | Intwala et al. |
| 8,254,668 B2 | 8/2012 | Mashitani et al. |
| 8,279,325 B2 | 10/2012 | Pitts et al. |
| 8,280,194 B2 | 10/2012 | Wong et al. |
| 8,284,240 B2 | 10/2012 | Saint-Pierre et al. |
| 8,289,409 B2 | 10/2012 | Chang |
| 8,289,440 B2 | 10/2012 | Pitts et al. |
| 8,290,358 B1 | 10/2012 | Georgiev |
| 8,294,099 B2 | 10/2012 | Blackwell, Jr. |
| 8,294,754 B2 | 10/2012 | Jung et al. |
| 8,300,085 B2 | 10/2012 | Yang et al. |
| 8,305,456 B1 | 11/2012 | McMahon |
| 8,315,476 B1 | 11/2012 | Georgiev et al. |
| 8,345,144 B1 | 1/2013 | Georgiev et al. |
| 8,360,574 B2 | 1/2013 | Ishak et al. |
| 8,400,555 B1 | 3/2013 | Georgiev |
| 8,406,562 B2 | 3/2013 | Bassi et al. |
| 8,411,146 B2 | 4/2013 | Twede |
| 8,446,492 B2 | 5/2013 | Nakano et al. |
| 8,456,517 B2 | 6/2013 | Mor et al. |
| 8,493,496 B2 | 7/2013 | Freedman et al. |
| 8,514,291 B2 | 8/2013 | Chang et al. |
| 8,514,491 B2 | 8/2013 | Duparre |
| 8,541,730 B2 | 9/2013 | Inuiya |
| 8,542,933 B2 | 9/2013 | Venkataraman et al. |
| 8,553,093 B2 | 10/2013 | Wong et al. |
| 8,559,756 B2 | 10/2013 | Georgiev et al. |
| 8,565,547 B2 | 10/2013 | Strandemar |
| 8,576,302 B2 | 11/2013 | Yoshikawa |
| 8,577,183 B2 | 11/2013 | Robinson |
| 8,581,995 B2 | 11/2013 | Lin et al. |
| 8,619,082 B1 | 12/2013 | Ciurea et al. |
| 8,648,918 B2 | 2/2014 | Kauker et al. |
| 8,655,052 B2 | 2/2014 | Spooner et al. |
| 8,682,107 B2 | 3/2014 | Yoon et al. |
| 8,687,087 B2 | 4/2014 | Pertsel et al. |
| 8,692,893 B2 | 4/2014 | McMahon |
| 8,754,941 B1 | 6/2014 | Sarwari et al. |
| 8,773,536 B1 | 7/2014 | Zhang |
| 8,780,113 B1 | 7/2014 | Ciurea et al. |
| 8,804,255 B2 | 8/2014 | Duparre |
| 8,830,375 B2 | 9/2014 | Ludwig |
| 8,831,367 B2 | 9/2014 | Venkataraman et al. |
| 8,836,793 B1 | 9/2014 | Kriesel et al. |
| 8,842,201 B2 | 9/2014 | Tajiri |
| 8,854,462 B2 | 10/2014 | Herbin et al. |
| 8,861,089 B2 | 10/2014 | Duparre |
| 8,866,912 B2 | 10/2014 | Mullis |
| 8,866,920 B2 | 10/2014 | Venkataraman et al. |
| 8,866,951 B2 | 10/2014 | Keelan |
| 8,878,950 B2 | 11/2014 | Lelescu et al. |
| 8,885,059 B1 | 11/2014 | Venkataraman et al. |
| 8,885,922 B2 | 11/2014 | Ito et al. |
| 8,896,594 B2 | 11/2014 | Xiong et al. |
| 8,896,719 B1 | 11/2014 | Venkataraman et al. |
| 8,902,321 B2 | 12/2014 | Venkataraman et al. |
| 8,928,793 B2 | 1/2015 | Mcmahon |
| 8,977,038 B2 | 3/2015 | Tian et al. |
| 9,001,226 B1 | 4/2015 | Ng et al. |
| 9,019,426 B2 | 4/2015 | Han et al. |
| 9,025,894 B2 | 5/2015 | Venkataraman et al. |
| 9,025,895 B2 | 5/2015 | Venkataraman et al. |
| 9,030,528 B2 | 5/2015 | Pesach et al. |
| 9,031,335 B2 | 5/2015 | Venkataraman et al. |
| 9,031,342 B2 | 5/2015 | Venkataraman et al. |
| 9,031,343 B2 | 5/2015 | Venkataraman et al. |
| 9,036,928 B2 | 5/2015 | Venkataraman et al. |
| 9,036,931 B2 | 5/2015 | Venkataraman et al. |
| 9,041,823 B2 | 5/2015 | Venkataraman et al. |
| 9,041,824 B2 | 5/2015 | Lelescu et al. |
| 9,041,829 B2 | 5/2015 | Venkataraman et al. |
| 9,042,667 B2 | 5/2015 | Venkataraman et al. |
| 9,047,684 B2 | 6/2015 | Lelescu et al. |
| 9,049,367 B2 | 6/2015 | Venkataraman et al. |
| 9,055,233 B2 | 6/2015 | Venkataraman et al. |
| 9,060,120 B2 | 6/2015 | Venkataraman et al. |
| 9,060,124 B2 | 6/2015 | Venkataraman et al. |
| 9,077,893 B2 | 7/2015 | Venkataraman et al. |
| 9,094,661 B2 | 7/2015 | Venkataraman et al. |
| 9,100,586 B2 | 8/2015 | McMahon et al. |
| 9,100,635 B2 | 8/2015 | Duparre et al. |
| 9,123,117 B2 | 9/2015 | Ciurea et al. |
| 9,123,118 B2 | 9/2015 | Ciurea et al. |
| 9,124,815 B2 | 9/2015 | Venkataraman et al. |
| 9,124,831 B2 | 9/2015 | Mullis |
| 9,124,864 B2 | 9/2015 | Mullis |
| 9,128,228 B2 | 9/2015 | Duparre |
| 9,129,183 B2 | 9/2015 | Venkataraman et al. |
| 9,129,377 B2 | 9/2015 | Ciurea et al. |
| 9,143,711 B2 | 9/2015 | McMahon |
| 9,147,254 B2 | 9/2015 | Ciurea et al. |
| 9,185,276 B2 | 11/2015 | Rodda et al. |
| 9,188,765 B2 | 11/2015 | Venkataraman et al. |
| 9,191,580 B2 | 11/2015 | Venkataraman et al. |
| 9,197,821 B2 | 11/2015 | McMahon |
| 9,210,392 B2 | 12/2015 | Nisenzon et al. |
| 9,214,013 B2 | 12/2015 | Venkataraman et al. |
| 9,235,898 B2 | 1/2016 | Venkataraman et al. |
| 9,235,900 B2 | 1/2016 | Ciurea et al. |
| 9,240,049 B2 | 1/2016 | Ciurea et al. |
| 9,253,380 B2 | 2/2016 | Venkataraman et al. |
| 9,256,974 B1 | 2/2016 | Hines |
| 9,264,592 B2 | 2/2016 | Rodda et al. |
| 9,264,610 B2 | 2/2016 | Duparre |
| 9,361,662 B2 | 6/2016 | Lelescu et al. |
| 9,412,206 B2 | 8/2016 | McMahon et al. |
| 9,413,953 B2 | 8/2016 | Maeda |
| 9,426,343 B2 | 8/2016 | Rodda et al. |
| 9,426,361 B2 | 8/2016 | Venkataraman et al. |
| 9,438,888 B2 | 9/2016 | Venkataraman et al. |
| 9,445,003 B1 | 9/2016 | Lelescu et al. |
| 9,456,134 B2 | 9/2016 | Venkataraman et al. |
| 9,456,196 B2 | 9/2016 | Kim et al. |
| 9,462,164 B2 | 10/2016 | Venkataraman et al. |
| 9,485,496 B2 | 11/2016 | Venkataraman et al. |
| 9,497,370 B2 | 11/2016 | Venkataraman et al. |
| 9,497,429 B2 | 11/2016 | Mullis et al. |
| 9,516,222 B2 | 12/2016 | Duparre et al. |
| 9,519,972 B2 | 12/2016 | Venkataraman et al. |
| 9,521,319 B2 | 12/2016 | Rodda et al. |
| 9,521,416 B1 | 12/2016 | McMahon et al. |
| 9,536,166 B2 | 1/2017 | Venkataraman et al. |
| 9,576,369 B2 | 2/2017 | Venkataraman et al. |
| 9,578,237 B2 | 2/2017 | Duparre et al. |
| 9,578,259 B2 | 2/2017 | Molina |
| 9,602,805 B2 | 3/2017 | Venkataraman et al. |
| 9,633,442 B2 | 4/2017 | Venkataraman et al. |
| 9,635,274 B2 | 4/2017 | Lin et al. |
| 9,638,883 B1 | 5/2017 | Duparre |
| 9,661,310 B2 | 5/2017 | Deng et al. |
| 9,706,132 B2 | 7/2017 | Nisenzon et al. |
| 9,712,759 B2 | 7/2017 | Venkataraman et al. |
| 9,733,486 B2 | 8/2017 | Lelescu et al. |
| 9,741,118 B2 | 8/2017 | Mullis |
| 9,743,051 B2 | 8/2017 | Venkataraman et al. |
| 9,749,547 B2 | 8/2017 | Venkataraman et al. |
| 9,749,568 B2 | 8/2017 | McMahon |
| 9,754,422 B2 | 9/2017 | McMahon et al. |

(56) References Cited

U.S. PATENT DOCUMENTS

| | | |
|---|---|---|
| 9,766,380 B2 | 9/2017 | Duparre et al. |
| 9,769,365 B1 | 9/2017 | Jannard |
| 9,774,789 B2 | 9/2017 | Ciurea et al. |
| 9,774,831 B2 | 9/2017 | Venkataraman et al. |
| 9,787,911 B2 | 10/2017 | McMahon et al. |
| 9,794,476 B2 | 10/2017 | Nayar et al. |
| 9,800,856 B2 | 10/2017 | Venkataraman et al. |
| 9,800,859 B2 | 10/2017 | Venkataraman et al. |
| 9,807,382 B2 | 10/2017 | Duparre et al. |
| 9,811,753 B2 | 11/2017 | Venkataraman et al. |
| 9,813,616 B2 | 11/2017 | Lelescu et al. |
| 9,813,617 B2 | 11/2017 | Venkataraman et al. |
| 9,858,673 B2 | 1/2018 | Ciurea et al. |
| 9,864,921 B2 | 1/2018 | Venkataraman et al. |
| 9,888,194 B2 | 2/2018 | Duparre |
| 9,898,856 B2 | 2/2018 | Yang et al. |
| 9,917,998 B2 | 3/2018 | Venkataraman et al. |
| 9,924,092 B2 | 3/2018 | Rodda et al. |
| 9,955,070 B2 | 4/2018 | Lelescu et al. |
| 2001/0005225 A1 | 6/2001 | Clark et al. |
| 2001/0019621 A1 | 9/2001 | Hanna et al. |
| 2001/0028038 A1 | 10/2001 | Hamaguchi et al. |
| 2001/0038387 A1 | 11/2001 | Tomooka et al. |
| 2002/0012056 A1 | 1/2002 | Trevino |
| 2002/0015536 A1 | 2/2002 | Warren |
| 2002/0027608 A1 | 3/2002 | Johnson |
| 2002/0028014 A1 | 3/2002 | Ono et al. |
| 2002/0039438 A1 | 4/2002 | Mori et al. |
| 2002/0057845 A1 | 5/2002 | Fossum |
| 2002/0061131 A1 | 5/2002 | Sawhney et al. |
| 2002/0063807 A1 | 5/2002 | Margulis |
| 2002/0075450 A1 | 6/2002 | Aratani |
| 2002/0087403 A1 | 7/2002 | Meyers et al. |
| 2002/0089596 A1 | 7/2002 | Suda |
| 2002/0094027 A1 | 7/2002 | Sato et al. |
| 2002/0101528 A1 | 8/2002 | Lee |
| 2002/0113867 A1 | 8/2002 | Takigawa et al. |
| 2002/0113888 A1 | 8/2002 | Sonoda et al. |
| 2002/0120634 A1 | 8/2002 | Min et al. |
| 2002/0122113 A1 | 9/2002 | Foote et al. |
| 2002/0163054 A1 | 11/2002 | Suda et al. |
| 2002/0167537 A1 | 11/2002 | Trajkovic |
| 2002/0177054 A1 | 11/2002 | Saitoh et al. |
| 2002/0190991 A1 | 12/2002 | Efran et al. |
| 2002/0195548 A1 | 12/2002 | Dowski, Jr. et al. |
| 2003/0025227 A1 | 2/2003 | Daniell |
| 2003/0086079 A1 | 5/2003 | Barth et al. |
| 2003/0124763 A1 | 7/2003 | Fan et al. |
| 2003/0140347 A1 | 7/2003 | Varsa |
| 2003/0156189 A1 | 8/2003 | Utsumi et al. |
| 2003/0179418 A1 | 9/2003 | Wengender et al. |
| 2003/0188659 A1 | 10/2003 | Merry et al. |
| 2003/0190072 A1 | 10/2003 | Adkins et al. |
| 2003/0198377 A1 | 10/2003 | Ng et al. |
| 2003/0211405 A1 | 11/2003 | Venkataraman |
| 2004/0003409 A1 | 1/2004 | Berstis et al. |
| 2004/0008271 A1 | 1/2004 | Hagimori et al. |
| 2004/0012689 A1 | 1/2004 | Tinnerino |
| 2004/0027358 A1 | 2/2004 | Nakao |
| 2004/0047274 A1 | 3/2004 | Amanai |
| 2004/0050104 A1 | 3/2004 | Ghosh et al. |
| 2004/0056966 A1 | 3/2004 | Schechner et al. |
| 2004/0061787 A1 | 4/2004 | Liu et al. |
| 2004/0066454 A1 | 4/2004 | Otani et al. |
| 2004/0071367 A1 | 4/2004 | Irani et al. |
| 2004/0075654 A1 | 4/2004 | Hsiao et al. |
| 2004/0096119 A1 | 5/2004 | Williams |
| 2004/0100570 A1 | 5/2004 | Shizukuishi |
| 2004/0105021 A1 | 6/2004 | Hu et al. |
| 2004/0114807 A1 | 6/2004 | Lelescu et al. |
| 2004/0141659 A1 | 7/2004 | Zhang et al. |
| 2004/0151401 A1 | 8/2004 | Sawhney et al. |
| 2004/0165090 A1 | 8/2004 | Ning |
| 2004/0169617 A1 | 9/2004 | Yelton et al. |
| 2004/0170340 A1 | 9/2004 | Tipping et al. |
| 2004/0174439 A1 | 9/2004 | Upton |
| 2004/0179008 A1 | 9/2004 | Gordon et al. |
| 2004/0179834 A1 | 9/2004 | Szajewski |
| 2004/0196379 A1 | 10/2004 | Chen et al. |
| 2004/0207600 A1 | 10/2004 | Zhang et al. |
| 2004/0207836 A1 | 10/2004 | Chhibber et al. |
| 2004/0213449 A1 | 10/2004 | Safaee-Rad et al. |
| 2004/0218809 A1 | 11/2004 | Blake et al. |
| 2004/0234873 A1 | 11/2004 | Venkataraman |
| 2004/0239782 A1 | 12/2004 | Equitz et al. |
| 2004/0239885 A1 | 12/2004 | Jaynes et al. |
| 2004/0240052 A1 | 12/2004 | Minefuji et al. |
| 2004/0251509 A1 | 12/2004 | Choi |
| 2004/0264806 A1 | 12/2004 | Herley |
| 2005/0006477 A1 | 1/2005 | Patel |
| 2005/0007461 A1 | 1/2005 | Chou et al. |
| 2005/0009313 A1 | 1/2005 | Suzuki et al. |
| 2005/0010621 A1 | 1/2005 | Pinto et al. |
| 2005/0012035 A1 | 1/2005 | Miller |
| 2005/0036778 A1 | 2/2005 | DeMonte |
| 2005/0047678 A1 | 3/2005 | Jones et al. |
| 2005/0048690 A1 | 3/2005 | Yamamoto |
| 2005/0068436 A1 | 3/2005 | Fraenkel et al. |
| 2005/0083531 A1 | 4/2005 | Millerd et al. |
| 2005/0084179 A1 | 4/2005 | Hanna et al. |
| 2005/0128509 A1 | 6/2005 | Tokkonen et al. |
| 2005/0128595 A1 | 6/2005 | Shimizu |
| 2005/0132098 A1 | 6/2005 | Sonoda et al. |
| 2005/0134698 A1 | 6/2005 | Schroeder |
| 2005/0134699 A1 | 6/2005 | Nagashima |
| 2005/0134712 A1 | 6/2005 | Gruhlke et al. |
| 2005/0147277 A1 | 7/2005 | Higaki et al. |
| 2005/0151759 A1 | 7/2005 | Gonzalez-Banos et al. |
| 2005/0168924 A1 | 8/2005 | Wu et al. |
| 2005/0175257 A1 | 8/2005 | Kuroki |
| 2005/0185711 A1 | 8/2005 | Pfister et al. |
| 2005/0205785 A1 | 9/2005 | Hornback et al. |
| 2005/0219264 A1 | 10/2005 | Shum et al. |
| 2005/0219363 A1 | 10/2005 | Kohler |
| 2005/0224843 A1 | 10/2005 | Boemler |
| 2005/0225654 A1 | 10/2005 | Feldman et al. |
| 2005/0265633 A1 | 12/2005 | Piacentino |
| 2005/0275946 A1 | 12/2005 | Choo et al. |
| 2005/0286612 A1 | 12/2005 | Takanashi |
| 2005/0286756 A1 | 12/2005 | Hong et al. |
| 2006/0002635 A1 | 1/2006 | Nestares et al. |
| 2006/0007331 A1 | 1/2006 | Izumi et al. |
| 2006/0018509 A1 | 1/2006 | Miyoshi |
| 2006/0023197 A1 | 2/2006 | Joel |
| 2006/0023314 A1 | 2/2006 | Boettiger et al. |
| 2006/0028476 A1 | 2/2006 | Sobel et al. |
| 2006/0029270 A1 | 2/2006 | Berestov et al. |
| 2006/0029271 A1 | 2/2006 | Miyoshi et al. |
| 2006/0033005 A1 | 2/2006 | Jerdev et al. |
| 2006/0034003 A1 | 2/2006 | Zalevsky |
| 2006/0034531 A1 | 2/2006 | Poon et al. |
| 2006/0035415 A1 | 2/2006 | Wood |
| 2006/0038891 A1 | 2/2006 | Okutomi et al. |
| 2006/0039611 A1* | 2/2006 | Rother .................. H04N 5/275 382/199 |
| 2006/0046204 A1 | 3/2006 | Ono et al. |
| 2006/0049930 A1 | 3/2006 | Zruya et al. |
| 2006/0050980 A1 | 3/2006 | Kohashi et al. |
| 2006/0054780 A1 | 3/2006 | Garrood et al. |
| 2006/0054782 A1 | 3/2006 | Olsen et al. |
| 2006/0055811 A1 | 3/2006 | Frtiz et al. |
| 2006/0069478 A1 | 3/2006 | Iwama |
| 2006/0072029 A1 | 4/2006 | Miyatake et al. |
| 2006/0087747 A1 | 4/2006 | Ohzawa et al. |
| 2006/0098888 A1 | 5/2006 | Morishita |
| 2006/0103754 A1 | 5/2006 | Wenstrand et al. |
| 2006/0125936 A1 | 6/2006 | Gruhike et al. |
| 2006/0138322 A1 | 6/2006 | Costello et al. |
| 2006/0152803 A1 | 7/2006 | Provitola |
| 2006/0157640 A1 | 7/2006 | Perlman et al. |
| 2006/0159369 A1 | 7/2006 | Young |
| 2006/0176566 A1 | 8/2006 | Boettiger et al. |
| 2006/0187338 A1 | 8/2006 | May et al. |
| 2006/0197937 A1 | 9/2006 | Bamji et al. |

(56) References Cited

U.S. PATENT DOCUMENTS

| | | |
|---|---|---|
| 2006/0203100 A1 | 9/2006 | Ajito et al. |
| 2006/0203113 A1 | 9/2006 | Wada et al. |
| 2006/0210146 A1 | 9/2006 | Gu |
| 2006/0210186 A1 | 9/2006 | Berkner |
| 2006/0214085 A1 | 9/2006 | Olsen |
| 2006/0221250 A1 | 10/2006 | Rossbach et al. |
| 2006/0239549 A1 | 10/2006 | Kelly et al. |
| 2006/0243889 A1 | 11/2006 | Farnworth et al. |
| 2006/0251410 A1 | 11/2006 | Trutna |
| 2006/0274174 A1 | 12/2006 | Tewinkle |
| 2006/0278948 A1 | 12/2006 | Yamaguchi et al. |
| 2006/0279648 A1 | 12/2006 | Senba et al. |
| 2006/0289772 A1 | 12/2006 | Johnson et al. |
| 2007/0002159 A1 | 1/2007 | Olsen et al. |
| 2007/0008575 A1 | 1/2007 | Yu et al. |
| 2007/0009150 A1 | 1/2007 | Suwa |
| 2007/0024614 A1 | 2/2007 | Tam |
| 2007/0030356 A1 | 2/2007 | Yea et al. |
| 2007/0035707 A1 | 2/2007 | Margulis |
| 2007/0036427 A1 | 2/2007 | Nakamura et al. |
| 2007/0040828 A1 | 2/2007 | Zalevsky et al. |
| 2007/0040922 A1 | 2/2007 | McKee et al. |
| 2007/0041391 A1 | 2/2007 | Lin et al. |
| 2007/0052825 A1 | 3/2007 | Cho |
| 2007/0083114 A1 | 4/2007 | Yang et al. |
| 2007/0085917 A1 | 4/2007 | Kobayashi |
| 2007/0092245 A1 | 4/2007 | Bazakos et al. |
| 2007/0102622 A1 | 5/2007 | Olsen et al. |
| 2007/0126898 A1 | 6/2007 | Feldman |
| 2007/0127831 A1 | 6/2007 | Venkataraman |
| 2007/0139333 A1 | 6/2007 | Sato et al. |
| 2007/0140685 A1 | 6/2007 | Wu et al. |
| 2007/0146503 A1 | 6/2007 | Shiraki |
| 2007/0146511 A1 | 6/2007 | Kinoshita et al. |
| 2007/0153335 A1 | 7/2007 | Hosaka |
| 2007/0158427 A1 | 7/2007 | Zhu et al. |
| 2007/0159541 A1 | 7/2007 | Sparks et al. |
| 2007/0160310 A1 | 7/2007 | Tanida et al. |
| 2007/0165931 A1 | 7/2007 | Higaki |
| 2007/0171290 A1 | 7/2007 | Kroger |
| 2007/0177004 A1 | 8/2007 | Kolehmainen et al. |
| 2007/0182843 A1 | 8/2007 | Shimamura et al. |
| 2007/0201859 A1 | 8/2007 | Sarrat et al. |
| 2007/0206241 A1 | 9/2007 | Smith et al. |
| 2007/0211164 A1 | 9/2007 | Olsen et al. |
| 2007/0216765 A1 | 9/2007 | Wong et al. |
| 2007/0225600 A1* | 9/2007 | Weibrecht .............. A61B 6/025 600/429 |
| 2007/0228256 A1 | 10/2007 | Mentzer |
| 2007/0236595 A1 | 10/2007 | Pan et al. |
| 2007/0242141 A1 | 10/2007 | Ciurea |
| 2007/0247517 A1 | 10/2007 | Zhang et al. |
| 2007/0257184 A1 | 11/2007 | Olsen et al. |
| 2007/0258006 A1 | 11/2007 | Olsen et al. |
| 2007/0258706 A1 | 11/2007 | Raskar et al. |
| 2007/0263113 A1 | 11/2007 | Baek et al. |
| 2007/0263114 A1 | 11/2007 | Gurevich et al. |
| 2007/0268374 A1 | 11/2007 | Robinson |
| 2007/0296721 A1 | 12/2007 | Chang et al. |
| 2007/0296832 A1 | 12/2007 | Ota et al. |
| 2007/0296835 A1 | 12/2007 | Olsen |
| 2007/0296847 A1 | 12/2007 | Chang et al. |
| 2007/0297696 A1 | 12/2007 | Hamza |
| 2008/0006859 A1 | 1/2008 | Mionetto et al. |
| 2008/0019611 A1 | 1/2008 | Larkin |
| 2008/0024683 A1 | 1/2008 | Damera-Venkata et al. |
| 2008/0025649 A1 | 1/2008 | Liu et al. |
| 2008/0030592 A1 | 2/2008 | Border et al. |
| 2008/0030597 A1 | 2/2008 | Olsen et al. |
| 2008/0043095 A1 | 2/2008 | Vetro et al. |
| 2008/0043096 A1 | 2/2008 | Vetro et al. |
| 2008/0054518 A1 | 3/2008 | Ra et al. |
| 2008/0056302 A1 | 3/2008 | Erdal et al. |
| 2008/0062164 A1 | 3/2008 | Bassi et al. |
| 2008/0079805 A1 | 4/2008 | Takagi et al. |
| 2008/0080028 A1 | 4/2008 | Bakin et al. |
| 2008/0084486 A1 | 4/2008 | Enge et al. |
| 2008/0088793 A1 | 4/2008 | Sverdrup et al. |
| 2008/0095523 A1 | 4/2008 | Schilling-Benz et al. |
| 2008/0099804 A1 | 5/2008 | Venezia et al. |
| 2008/0106620 A1 | 5/2008 | Sawachi et al. |
| 2008/0112059 A1 | 5/2008 | Choi et al. |
| 2008/0112635 A1 | 5/2008 | Kondo et al. |
| 2008/0117289 A1 | 5/2008 | Schowengerdt et al. |
| 2008/0118241 A1 | 5/2008 | Tekolste et al. |
| 2008/0131019 A1 | 6/2008 | Ng |
| 2008/0131107 A1 | 6/2008 | Ueno |
| 2008/0151097 A1 | 6/2008 | Chen et al. |
| 2008/0152215 A1 | 6/2008 | Horie et al. |
| 2008/0152296 A1 | 6/2008 | Oh et al. |
| 2008/0156991 A1 | 7/2008 | Hu et al. |
| 2008/0158259 A1 | 7/2008 | Kempf et al. |
| 2008/0158375 A1 | 7/2008 | Kakkori et al. |
| 2008/0158698 A1 | 7/2008 | Chang et al. |
| 2008/0165257 A1 | 7/2008 | Boettiger et al. |
| 2008/0174670 A1 | 7/2008 | Olsen et al. |
| 2008/0187305 A1 | 8/2008 | Raskar et al. |
| 2008/0193026 A1 | 8/2008 | Horie et al. |
| 2008/0211737 A1 | 9/2008 | Kim et al. |
| 2008/0218610 A1 | 9/2008 | Chapman et al. |
| 2008/0218611 A1 | 9/2008 | Parulski et al. |
| 2008/0218612 A1 | 9/2008 | Border et al. |
| 2008/0218613 A1 | 9/2008 | Janson et al. |
| 2008/0219654 A1 | 9/2008 | Border et al. |
| 2008/0239116 A1 | 10/2008 | Smith |
| 2008/0240598 A1 | 10/2008 | Hasegawa |
| 2008/0247638 A1 | 10/2008 | Tanida et al. |
| 2008/0247653 A1 | 10/2008 | Moussavi et al. |
| 2008/0272416 A1 | 11/2008 | Yun |
| 2008/0273751 A1 | 11/2008 | Yuan et al. |
| 2008/0278591 A1 | 11/2008 | Barna et al. |
| 2008/0278610 A1 | 11/2008 | Boettiger et al. |
| 2008/0284880 A1 | 11/2008 | Numata |
| 2008/0291295 A1 | 11/2008 | Kato et al. |
| 2008/0298674 A1 | 12/2008 | Baker et al. |
| 2008/0310501 A1 | 12/2008 | Ward et al. |
| 2009/0027543 A1 | 1/2009 | Kanehiro et al. |
| 2009/0050946 A1 | 2/2009 | Duparre et al. |
| 2009/0052743 A1 | 2/2009 | Techmer |
| 2009/0060281 A1 | 3/2009 | Tanida et al. |
| 2009/0066693 A1 | 3/2009 | Carson |
| 2009/0079862 A1 | 3/2009 | Subbotin |
| 2009/0086074 A1 | 4/2009 | Li et al. |
| 2009/0091645 A1 | 4/2009 | Trimeche et al. |
| 2009/0091806 A1 | 4/2009 | Inuiya |
| 2009/0096050 A1 | 4/2009 | Park |
| 2009/0102956 A1 | 4/2009 | Georgiev |
| 2009/0103792 A1 | 4/2009 | Rahn et al. |
| 2009/0109306 A1 | 4/2009 | Shan et al. |
| 2009/0127430 A1 | 5/2009 | Hirasawa et al. |
| 2009/0128644 A1 | 5/2009 | Camp, Jr. et al. |
| 2009/0128833 A1 | 5/2009 | Yahav |
| 2009/0129667 A1 | 5/2009 | Ho et al. |
| 2009/0140131 A1 | 6/2009 | Utagawa et al. |
| 2009/0141933 A1 | 6/2009 | Wagg |
| 2009/0147919 A1 | 6/2009 | Goto et al. |
| 2009/0152664 A1 | 6/2009 | Klem et al. |
| 2009/0167922 A1 | 7/2009 | Perlman et al. |
| 2009/0167934 A1 | 7/2009 | Gupta |
| 2009/0179142 A1 | 7/2009 | Duparre et al. |
| 2009/0180021 A1 | 7/2009 | Kikuchi et al. |
| 2009/0200622 A1 | 8/2009 | Tai et al. |
| 2009/0201371 A1 | 8/2009 | Matsuda et al. |
| 2009/0207235 A1 | 8/2009 | Francini et al. |
| 2009/0219435 A1 | 9/2009 | Yuan et al. |
| 2009/0225203 A1 | 9/2009 | Tanida et al. |
| 2009/0237520 A1 | 9/2009 | Kaneko et al. |
| 2009/0245573 A1 | 10/2009 | Saptharishi et al. |
| 2009/0256947 A1* | 10/2009 | Ciurea .................. G06F 3/0488 348/333.12 |
| 2009/0263017 A1 | 10/2009 | Tanbakuchi |
| 2009/0268192 A1 | 10/2009 | Koenck et al. |
| 2009/0268970 A1 | 10/2009 | Babacan et al. |
| 2009/0268983 A1 | 10/2009 | Stone |

(56) References Cited

U.S. PATENT DOCUMENTS

| | | |
|---|---|---|
| 2009/0273663 A1 | 11/2009 | Yoshida et al. |
| 2009/0274387 A1 | 11/2009 | Jin |
| 2009/0279800 A1 | 11/2009 | Uetani et al. |
| 2009/0284651 A1 | 11/2009 | Srinivasan |
| 2009/0290811 A1 | 11/2009 | Imai |
| 2009/0297056 A1 | 12/2009 | Lelescu et al. |
| 2009/0302205 A9 | 12/2009 | Olsen et al. |
| 2009/0317061 A1 | 12/2009 | Jung et al. |
| 2009/0322876 A1 | 12/2009 | Lee et al. |
| 2009/0323195 A1 | 12/2009 | Hembree et al. |
| 2009/0323206 A1 | 12/2009 | Oliver et al. |
| 2009/0324118 A1 | 12/2009 | Maslov et al. |
| 2010/0002126 A1 | 1/2010 | Wenstrand et al. |
| 2010/0002313 A1 | 1/2010 | Duparre |
| 2010/0002314 A1 | 1/2010 | Duparre |
| 2010/0007714 A1 | 1/2010 | Kim et al. |
| 2010/0013927 A1 | 1/2010 | Nixon |
| 2010/0044815 A1 | 2/2010 | Chang et al. |
| 2010/0045809 A1 | 2/2010 | Packard |
| 2010/0053342 A1 | 3/2010 | Hwang |
| 2010/0053600 A1 | 3/2010 | Tanida et al. |
| 2010/0060746 A9 | 3/2010 | Olsen et al. |
| 2010/0073463 A1 | 3/2010 | Momonoi et al. |
| 2010/0074532 A1 | 3/2010 | Gordon et al. |
| 2010/0085425 A1 | 4/2010 | Tan |
| 2010/0086227 A1 | 4/2010 | Sun et al. |
| 2010/0091389 A1 | 4/2010 | Henriksen et al. |
| 2010/0097491 A1 | 4/2010 | Farina et al. |
| 2010/0103175 A1 | 4/2010 | Okutomi et al. |
| 2010/0103259 A1 | 4/2010 | Tanida et al. |
| 2010/0103308 A1 | 4/2010 | Butterfield et al. |
| 2010/0111444 A1 | 5/2010 | Coffman |
| 2010/0118127 A1 | 5/2010 | Nam |
| 2010/0128145 A1 | 5/2010 | Pitts et al. |
| 2010/0129048 A1 | 5/2010 | Pitts et al. |
| 2010/0133230 A1 | 6/2010 | Henriksen et al. |
| 2010/0133418 A1 | 6/2010 | Sargent et al. |
| 2010/0141802 A1 | 6/2010 | Knight et al. |
| 2010/0142828 A1 | 6/2010 | Chang et al. |
| 2010/0142839 A1 | 6/2010 | Lakus-becker |
| 2010/0157073 A1 | 6/2010 | Kondo et al. |
| 2010/0165152 A1 | 7/2010 | Lim |
| 2010/0166410 A1 | 7/2010 | Chang |
| 2010/0171866 A1 | 7/2010 | Brady et al. |
| 2010/0177411 A1 | 7/2010 | Hegde et al. |
| 2010/0182406 A1 | 7/2010 | Benitez et al. |
| 2010/0194860 A1 | 8/2010 | Mentz et al. |
| 2010/0194901 A1 | 8/2010 | Van Hoorebeke et al. |
| 2010/0195716 A1 | 8/2010 | Klein G et al. |
| 2010/0201834 A1 | 8/2010 | Maruyama et al. |
| 2010/0202054 A1 | 8/2010 | Niederer |
| 2010/0202683 A1 | 8/2010 | Robinson |
| 2010/0208100 A9 | 8/2010 | Olsen et al. |
| 2010/0220212 A1 | 9/2010 | Perlman et al. |
| 2010/0223237 A1 | 9/2010 | Mishra et al. |
| 2010/0225740 A1 | 9/2010 | Jung et al. |
| 2010/0231285 A1 | 9/2010 | Boomer et al. |
| 2010/0238327 A1 | 9/2010 | Griffith et al. |
| 2010/0244165 A1 | 9/2010 | Lake et al. |
| 2010/0245684 A1 | 9/2010 | Xiao et al. |
| 2010/0254627 A1 | 10/2010 | Panahpour Tehrani et al. |
| 2010/0259610 A1 | 10/2010 | Petersen et al. |
| 2010/0265346 A1 | 10/2010 | Iizuka |
| 2010/0265381 A1 | 10/2010 | Yamamoto et al. |
| 2010/0265385 A1 | 10/2010 | Knight |
| 2010/0281070 A1 | 11/2010 | Chan et al. |
| 2010/0289941 A1 | 11/2010 | Ito et al. |
| 2010/0290483 A1 | 11/2010 | Park et al. |
| 2010/0302423 A1 | 12/2010 | Adams, Jr. et al. |
| 2010/0309292 A1 | 12/2010 | Ho et al. |
| 2010/0309368 A1 | 12/2010 | Choi et al. |
| 2010/0321595 A1 | 12/2010 | Chiu et al. |
| 2010/0321640 A1 | 12/2010 | Yeh et al. |
| 2010/0329556 A1 | 12/2010 | Mitarai et al. |
| 2011/0001037 A1 | 1/2011 | Tewinkle |
| 2011/0018973 A1 | 1/2011 | Takayama |
| 2011/0019048 A1 | 1/2011 | Raynor et al. |
| 2011/0019243 A1 | 1/2011 | Constant, Jr. et al. |
| 2011/0031381 A1 | 2/2011 | Tay et al. |
| 2011/0032370 A1 | 2/2011 | Ludwig |
| 2011/0033129 A1 | 2/2011 | Robinson |
| 2011/0038536 A1 | 2/2011 | Gong |
| 2011/0043661 A1 | 2/2011 | Podoleanu |
| 2011/0043665 A1 | 2/2011 | Ogasahara |
| 2011/0043668 A1 | 2/2011 | McKinnon et al. |
| 2011/0044502 A1 | 2/2011 | Liu et al. |
| 2011/0051255 A1 | 3/2011 | Lee et al. |
| 2011/0055729 A1 | 3/2011 | Mason et al. |
| 2011/0064327 A1 | 3/2011 | Dagher et al. |
| 2011/0069189 A1 | 3/2011 | Venkataraman et al. |
| 2011/0080487 A1 | 4/2011 | Venkataraman et al. |
| 2011/0085028 A1 | 4/2011 | Samadani et al. |
| 2011/0090217 A1 | 4/2011 | Mashitani et al. |
| 2011/0108708 A1 | 5/2011 | Olsen et al. |
| 2011/0115886 A1 | 5/2011 | Nguyen |
| 2011/0121421 A1 | 5/2011 | Charbon et al. |
| 2011/0122308 A1 | 5/2011 | Duparre |
| 2011/0128393 A1 | 6/2011 | Tavi et al. |
| 2011/0128412 A1 | 6/2011 | Milnes et al. |
| 2011/0129165 A1 | 6/2011 | Lim et al. |
| 2011/0141309 A1 | 6/2011 | Nagashima et al. |
| 2011/0142138 A1 | 6/2011 | Tian et al. |
| 2011/0149408 A1 | 6/2011 | Hahgholt et al. |
| 2011/0149409 A1 | 6/2011 | Haugholt et al. |
| 2011/0153248 A1 | 6/2011 | Gu et al. |
| 2011/0157321 A1 | 6/2011 | Nakajima et al. |
| 2011/0157451 A1 | 6/2011 | Chang |
| 2011/0169994 A1 | 7/2011 | DiFrancesco et al. |
| 2011/0176020 A1 | 7/2011 | Chang |
| 2011/0181797 A1 | 7/2011 | Galstian et al. |
| 2011/0193944 A1 | 8/2011 | Lian et al. |
| 2011/0200319 A1 | 8/2011 | Kravitz et al. |
| 2011/0206291 A1 | 8/2011 | Kashani et al. |
| 2011/0207074 A1 | 8/2011 | Hall-Holt et al. |
| 2011/0211077 A1 | 9/2011 | Nayar |
| 2011/0211824 A1 | 9/2011 | Georgiev et al. |
| 2011/0221599 A1 | 9/2011 | Högasten |
| 2011/0221658 A1 | 9/2011 | Haddick et al. |
| 2011/0221939 A1 | 9/2011 | Jerdev |
| 2011/0221950 A1 | 9/2011 | Oostra |
| 2011/0222757 A1 | 9/2011 | Yeatman et al. |
| 2011/0228142 A1 | 9/2011 | Brueckner |
| 2011/0228144 A1 | 9/2011 | Tian et al. |
| 2011/0234841 A1 | 9/2011 | Akeley et al. |
| 2011/0241234 A1 | 10/2011 | Duparre |
| 2011/0242342 A1 | 10/2011 | Goma et al. |
| 2011/0242355 A1 | 10/2011 | Goma et al. |
| 2011/0242356 A1 | 10/2011 | Aleksic et al. |
| 2011/0243428 A1* | 10/2011 | Das Gupta ............... G06T 5/002 382/162 |
| 2011/0255592 A1 | 10/2011 | Sung et al. |
| 2011/0255745 A1 | 10/2011 | Hodder et al. |
| 2011/0261993 A1 | 10/2011 | Weiming et al. |
| 2011/0267264 A1 | 11/2011 | McCarthy et al. |
| 2011/0267348 A1 | 11/2011 | Lin et al. |
| 2011/0273531 A1 | 11/2011 | Ito et al. |
| 2011/0274175 A1 | 11/2011 | Sumitomo |
| 2011/0274366 A1 | 11/2011 | Tardif |
| 2011/0279705 A1 | 11/2011 | Kuang et al. |
| 2011/0279721 A1 | 11/2011 | Mcmahon |
| 2011/0285701 A1 | 11/2011 | Chen et al. |
| 2011/0285866 A1 | 11/2011 | Bhrugumalla et al. |
| 2011/0285910 A1 | 11/2011 | Bamji et al. |
| 2011/0292216 A1 | 12/2011 | Fergus et al. |
| 2011/0298898 A1 | 12/2011 | Jung et al. |
| 2011/0298917 A1 | 12/2011 | Yanagita |
| 2011/0300929 A1 | 12/2011 | Tardif et al. |
| 2011/0310980 A1 | 12/2011 | Mathew |
| 2011/0316968 A1 | 12/2011 | Taguchi et al. |
| 2011/0317766 A1 | 12/2011 | Lim, II et al. |
| 2012/0012748 A1 | 1/2012 | Pain et al. |
| 2012/0014456 A1 | 1/2012 | Martinez Bauza et al. |
| 2012/0019530 A1 | 1/2012 | Baker |
| 2012/0019700 A1 | 1/2012 | Gaber |

(56) References Cited

U.S. PATENT DOCUMENTS

| | | |
|---|---|---|
| 2012/0023456 A1 | 1/2012 | Sun et al. |
| 2012/0026297 A1 | 2/2012 | Sato |
| 2012/0026342 A1 | 2/2012 | Yu et al. |
| 2012/0026366 A1 | 2/2012 | Golan et al. |
| 2012/0026451 A1 | 2/2012 | Nystrom |
| 2012/0039525 A1 | 2/2012 | Tian et al. |
| 2012/0044249 A1 | 2/2012 | Mashitani et al. |
| 2012/0044372 A1 | 2/2012 | Côté et al. |
| 2012/0051624 A1 | 3/2012 | Ando et al. |
| 2012/0056982 A1 | 3/2012 | Katz et al. |
| 2012/0057040 A1 | 3/2012 | Park et al. |
| 2012/0062697 A1 | 3/2012 | Treado et al. |
| 2012/0062702 A1 | 3/2012 | Jiang et al. |
| 2012/0062756 A1 | 3/2012 | Tian |
| 2012/0069235 A1 | 3/2012 | Imai |
| 2012/0081519 A1 | 4/2012 | Goma |
| 2012/0086803 A1 | 4/2012 | Malzbender et al. |
| 2012/0105590 A1 | 5/2012 | Fukumoto et al. |
| 2012/0105691 A1 | 5/2012 | Waqas et al. |
| 2012/0113232 A1 | 5/2012 | Joblove et al. |
| 2012/0113318 A1 | 5/2012 | Galstian et al. |
| 2012/0113413 A1 | 5/2012 | Miahczylowicz-Wolski et al. |
| 2012/0114224 A1 | 5/2012 | Xu et al. |
| 2012/0127275 A1 | 5/2012 | Von Zitzewitz et al. |
| 2012/0147139 A1 | 6/2012 | Li et al. |
| 2012/0147205 A1 | 6/2012 | Lelescu et al. |
| 2012/0153153 A1 | 6/2012 | Chang et al. |
| 2012/0154551 A1 | 6/2012 | Inoue |
| 2012/0155830 A1 | 6/2012 | Sasaki et al. |
| 2012/0163672 A1 | 6/2012 | McKinnon |
| 2012/0169433 A1 | 7/2012 | Mullins |
| 2012/0170134 A1 | 7/2012 | Bolis et al. |
| 2012/0176479 A1 | 7/2012 | Mayhew et al. |
| 2012/0176481 A1 | 7/2012 | Lukk et al. |
| 2012/0188235 A1 | 7/2012 | Wu et al. |
| 2012/0188341 A1 | 7/2012 | Klein Gunnewiek et al. |
| 2012/0188389 A1 | 7/2012 | Lin et al. |
| 2012/0188420 A1 | 7/2012 | Black et al. |
| 2012/0188634 A1 | 7/2012 | Kubala et al. |
| 2012/0198677 A1 | 8/2012 | Duparre |
| 2012/0200669 A1 | 8/2012 | Lai |
| 2012/0200726 A1 | 8/2012 | Bugnariu |
| 2012/0200734 A1 | 8/2012 | Tang |
| 2012/0206582 A1 | 8/2012 | DiCarlo et al. |
| 2012/0219236 A1* | 8/2012 | Ali .................... G06T 5/002 382/276 |
| 2012/0224083 A1 | 9/2012 | Jovanovski et al. |
| 2012/0229602 A1 | 9/2012 | Chen et al. |
| 2012/0229628 A1 | 9/2012 | Ishiyama et al. |
| 2012/0237114 A1 | 9/2012 | Park et al. |
| 2012/0249550 A1 | 10/2012 | Akeley et al. |
| 2012/0249750 A1 | 10/2012 | Izzat et al. |
| 2012/0249836 A1 | 10/2012 | Ali et al. |
| 2012/0249853 A1 | 10/2012 | Krolczyk et al. |
| 2012/0262601 A1 | 10/2012 | Choi et al. |
| 2012/0262607 A1 | 10/2012 | Shimura et al. |
| 2012/0268574 A1 | 10/2012 | Gidon et al. |
| 2012/0274626 A1 | 11/2012 | Hsieh et al. |
| 2012/0287291 A1 | 11/2012 | McMahon et al. |
| 2012/0290257 A1 | 11/2012 | Hodge et al. |
| 2012/0293489 A1 | 11/2012 | Chen et al. |
| 2012/0293624 A1 | 11/2012 | Chen et al. |
| 2012/0293695 A1 | 11/2012 | Tanaka |
| 2012/0307093 A1 | 12/2012 | Miyoshi |
| 2012/0307099 A1 | 12/2012 | Yahata et al. |
| 2012/0314033 A1 | 12/2012 | Lee et al. |
| 2012/0314937 A1 | 12/2012 | Kim et al. |
| 2012/0327222 A1 | 12/2012 | Ng et al. |
| 2013/0002828 A1 | 1/2013 | Ding et al. |
| 2013/0003184 A1 | 1/2013 | Duparre |
| 2013/0010073 A1 | 1/2013 | Do |
| 2013/0016245 A1 | 1/2013 | Yuba |
| 2013/0016885 A1 | 1/2013 | Tsujimoto et al. |
| 2013/0022111 A1 | 1/2013 | Chen et al. |
| 2013/0027580 A1 | 1/2013 | Olsen et al. |
| 2013/0033579 A1 | 2/2013 | Wajs |
| 2013/0033585 A1 | 2/2013 | Li et al. |
| 2013/0038696 A1 | 2/2013 | Ding et al. |
| 2013/0047396 A1 | 2/2013 | Au et al. |
| 2013/0050504 A1 | 2/2013 | Safaee-Rad et al. |
| 2013/0050526 A1 | 2/2013 | Keelan |
| 2013/0057710 A1 | 3/2013 | McMahon |
| 2013/0070060 A1 | 3/2013 | Chatterjee |
| 2013/0076967 A1 | 3/2013 | Brunner et al. |
| 2013/0077859 A1 | 3/2013 | Stauder et al. |
| 2013/0077880 A1 | 3/2013 | Venkataraman et al. |
| 2013/0077882 A1 | 3/2013 | Venkataraman et al. |
| 2013/0083172 A1 | 4/2013 | Baba |
| 2013/0088489 A1 | 4/2013 | Schmeitz et al. |
| 2013/0088637 A1 | 4/2013 | Duparre |
| 2013/0093842 A1 | 4/2013 | Yahata |
| 2013/0107061 A1 | 5/2013 | Kumar et al. |
| 2013/0113888 A1 | 5/2013 | Koguchi |
| 2013/0113899 A1 | 5/2013 | Morohoshi et al. |
| 2013/0113939 A1 | 5/2013 | Strandemar |
| 2013/0120536 A1 | 5/2013 | Song et al. |
| 2013/0120605 A1 | 5/2013 | Georgiev et al. |
| 2013/0121559 A1 | 5/2013 | Hu |
| 2013/0128068 A1 | 5/2013 | Georgiev et al. |
| 2013/0128069 A1 | 5/2013 | Georgiev et al. |
| 2013/0128087 A1 | 5/2013 | Georgiev et al. |
| 2013/0128121 A1 | 5/2013 | Agarwala et al. |
| 2013/0135315 A1 | 5/2013 | Bares |
| 2013/0135448 A1 | 5/2013 | Nagumo et al. |
| 2013/0147979 A1 | 6/2013 | McMahon et al. |
| 2013/0169754 A1 | 7/2013 | Aronsson et al. |
| 2013/0176394 A1 | 7/2013 | Tian et al. |
| 2013/0208138 A1 | 8/2013 | Li |
| 2013/0215108 A1 | 8/2013 | McMahon et al. |
| 2013/0215231 A1 | 8/2013 | Hiramoto et al. |
| 2013/0222556 A1 | 8/2013 | Shimada |
| 2013/0222656 A1 | 8/2013 | Kaneko |
| 2013/0223759 A1 | 8/2013 | Nishiyama et al. |
| 2013/0229540 A1 | 9/2013 | Farina et al. |
| 2013/0230237 A1* | 9/2013 | Schlosser .................. G06T 7/10 382/164 |
| 2013/0250123 A1 | 9/2013 | Zhang et al. |
| 2013/0250150 A1 | 9/2013 | Malone |
| 2013/0258067 A1 | 10/2013 | Zhang et al. |
| 2013/0259317 A1 | 10/2013 | Gaddy |
| 2013/0265459 A1 | 10/2013 | Duparre et al. |
| 2013/0274596 A1 | 10/2013 | Azizian et al. |
| 2013/0274923 A1 | 10/2013 | By et al. |
| 2013/0286236 A1 | 10/2013 | Mankowski |
| 2013/0293760 A1 | 11/2013 | Nisenzon et al. |
| 2013/0321581 A1 | 12/2013 | El-ghoroury et al. |
| 2013/0335598 A1 | 12/2013 | Gustavsson |
| 2014/0002674 A1 | 1/2014 | Duparre et al. |
| 2014/0002675 A1 | 1/2014 | Duparre et al. |
| 2014/0009586 A1 | 1/2014 | McNamer et al. |
| 2014/0013273 A1 | 1/2014 | Ng et al. |
| 2014/0037137 A1 | 2/2014 | Broaddus et al. |
| 2014/0037140 A1 | 2/2014 | Benhimane et al. |
| 2014/0043507 A1 | 2/2014 | Wang et al. |
| 2014/0059462 A1 | 2/2014 | Wernersson |
| 2014/0076336 A1 | 3/2014 | Clayton et al. |
| 2014/0078333 A1 | 3/2014 | Miao |
| 2014/0079336 A1 | 3/2014 | Venkataraman et al. |
| 2014/0085502 A1 | 3/2014 | Lin et al. |
| 2014/0092281 A1 | 4/2014 | Nisenzon et al. |
| 2014/0098266 A1 | 4/2014 | Nayar et al. |
| 2014/0098267 A1 | 4/2014 | Tian et al. |
| 2014/0104490 A1 | 4/2014 | Hsieh et al. |
| 2014/0118493 A1 | 5/2014 | Sali et al. |
| 2014/0118584 A1 | 5/2014 | Lee et al. |
| 2014/0125771 A1 | 5/2014 | Grossmann et al. |
| 2014/0132810 A1 | 5/2014 | McMahon |
| 2014/0146132 A1 | 5/2014 | Bagnato et al. |
| 2014/0146201 A1 | 5/2014 | Knight et al. |
| 2014/0176592 A1 | 6/2014 | Wilburn et al. |
| 2014/0183334 A1 | 7/2014 | Wang et al. |
| 2014/0186045 A1 | 7/2014 | Poddar et al. |
| 2014/0192154 A1 | 7/2014 | Jeong et al. |
| 2014/0192253 A1 | 7/2014 | Laroia |

(56) References Cited

U.S. PATENT DOCUMENTS

| | | |
|---|---|---|
| 2014/0198188 A1 | 7/2014 | Izawa |
| 2014/0204183 A1 | 7/2014 | Lee et al. |
| 2014/0218546 A1 | 8/2014 | McMahon |
| 2014/0232822 A1 | 8/2014 | Venkataraman et al. |
| 2014/0240528 A1 | 8/2014 | Venkataraman et al. |
| 2014/0240529 A1 | 8/2014 | Venkataraman et al. |
| 2014/0253738 A1 | 9/2014 | Mullis |
| 2014/0267243 A1 | 9/2014 | Venkataraman et al. |
| 2014/0267286 A1 | 9/2014 | Duparre |
| 2014/0267633 A1 | 9/2014 | Venkataraman et al. |
| 2014/0267762 A1 | 9/2014 | Mullis et al. |
| 2014/0267829 A1 | 9/2014 | McMahon et al. |
| 2014/0267890 A1 | 9/2014 | Lelescu et al. |
| 2014/0285675 A1 | 9/2014 | Mullis |
| 2014/0300706 A1 | 10/2014 | Song |
| 2014/0313315 A1 | 10/2014 | Shoham et al. |
| 2014/0321712 A1 | 10/2014 | Ciurea et al. |
| 2014/0333731 A1 | 11/2014 | Venkataraman et al. |
| 2014/0333764 A1 | 11/2014 | Venkataraman et al. |
| 2014/0333787 A1 | 11/2014 | Venkataraman et al. |
| 2014/0340539 A1 | 11/2014 | Venkataraman et al. |
| 2014/0347509 A1 | 11/2014 | Venkataraman et al. |
| 2014/0347748 A1 | 11/2014 | Venkataraman et al. |
| 2014/0354773 A1 | 12/2014 | Venkataraman et al. |
| 2014/0354843 A1 | 12/2014 | Venkataraman et al. |
| 2014/0354844 A1 | 12/2014 | Venkataraman et al. |
| 2014/0354853 A1 | 12/2014 | Venkataraman et al. |
| 2014/0354854 A1 | 12/2014 | Venkataraman et al. |
| 2014/0354855 A1 | 12/2014 | Venkataraman et al. |
| 2014/0355870 A1 | 12/2014 | Venkataraman et al. |
| 2014/0368662 A1 | 12/2014 | Venkataraman et al. |
| 2014/0368683 A1 | 12/2014 | Venkataraman et al. |
| 2014/0368684 A1 | 12/2014 | Venkataraman et al. |
| 2014/0368685 A1 | 12/2014 | Venkataraman et al. |
| 2014/0368686 A1 | 12/2014 | Duparre |
| 2014/0369612 A1 | 12/2014 | Venkataraman et al. |
| 2014/0369615 A1 | 12/2014 | Venkataraman et al. |
| 2014/0376825 A1 | 12/2014 | Venkataraman et al. |
| 2014/0376826 A1 | 12/2014 | Venkataraman et al. |
| 2015/0002734 A1 | 1/2015 | Lee |
| 2015/0003752 A1 | 1/2015 | Venkataraman et al. |
| 2015/0003753 A1 | 1/2015 | Venkataraman et al. |
| 2015/0009353 A1 | 1/2015 | Venkataraman et al. |
| 2015/0009354 A1 | 1/2015 | Venkataraman et al. |
| 2015/0009362 A1 | 1/2015 | Venkataraman et al. |
| 2015/0015669 A1 | 1/2015 | Venkataraman et al. |
| 2015/0035992 A1 | 2/2015 | Mullis |
| 2015/0036014 A1 | 2/2015 | Lelescu et al. |
| 2015/0036015 A1 | 2/2015 | Lelescu et al. |
| 2015/0042766 A1 | 2/2015 | Ciurea et al. |
| 2015/0042767 A1 | 2/2015 | Ciurea et al. |
| 2015/0042833 A1 | 2/2015 | Lelescu et al. |
| 2015/0049915 A1 | 2/2015 | Ciurea et al. |
| 2015/0049916 A1 | 2/2015 | Ciurea et al. |
| 2015/0049917 A1 | 2/2015 | Ciurea et al. |
| 2015/0055884 A1 | 2/2015 | Venkataraman et al. |
| 2015/0085073 A1 | 3/2015 | Bruls et al. |
| 2015/0085174 A1 | 3/2015 | Shabtay et al. |
| 2015/0091900 A1 | 4/2015 | Yang et al. |
| 2015/0098079 A1 | 4/2015 | Montgomery et al. |
| 2015/0104076 A1 | 4/2015 | Hayasaka |
| 2015/0104101 A1 | 4/2015 | Bryant et al. |
| 2015/0122411 A1 | 5/2015 | Rodda et al. |
| 2015/0124059 A1 | 5/2015 | Georgiev et al. |
| 2015/0124113 A1 | 5/2015 | Rodda et al. |
| 2015/0124151 A1 | 5/2015 | Rodda et al. |
| 2015/0138346 A1 | 5/2015 | Venkataraman et al. |
| 2015/0146029 A1 | 5/2015 | Venkataraman et al. |
| 2015/0146030 A1 | 5/2015 | Venkataraman et al. |
| 2015/0161798 A1 | 6/2015 | Lelescu et al. |
| 2015/0199793 A1 | 7/2015 | Lelescu et al. |
| 2015/0199841 A1 | 7/2015 | Venkataraman et al. |
| 2015/0243480 A1 | 8/2015 | Yamada et al. |
| 2015/0244927 A1 | 8/2015 | Laroia et al. |
| 2015/0248744 A1 | 9/2015 | Hayasaka et al. |
| 2015/0254868 A1 | 9/2015 | Srikanth et al. |
| 2015/0296137 A1 | 10/2015 | Duparre et al. |
| 2015/0312455 A1 | 10/2015 | Venkataraman et al. |
| 2015/0326852 A1 | 11/2015 | Duparre et al. |
| 2015/0332468 A1 | 11/2015 | Hayasaka et al. |
| 2015/0373261 A1 | 12/2015 | Rodda et al. |
| 2016/0037097 A1 | 2/2016 | Duparre |
| 2016/0044252 A1 | 2/2016 | Molina |
| 2016/0044257 A1 | 2/2016 | Venkataraman et al. |
| 2016/0057332 A1 | 2/2016 | Ciurea et al. |
| 2016/0065934 A1 | 3/2016 | Kaza et al. |
| 2016/0163051 A1 | 6/2016 | Mullis |
| 2016/0165106 A1 | 6/2016 | Duparre |
| 2016/0165134 A1 | 6/2016 | Lelescu et al. |
| 2016/0165147 A1 | 6/2016 | Nisenzon et al. |
| 2016/0165212 A1 | 6/2016 | Mullis |
| 2016/0195733 A1 | 7/2016 | Lelescu et al. |
| 2016/0198096 A1 | 7/2016 | Lelescu et al. |
| 2016/0227195 A1 | 8/2016 | Venkataraman et al. |
| 2016/0249001 A1 | 8/2016 | McMahon |
| 2016/0255333 A1 | 9/2016 | Nisenzon et al. |
| 2016/0266284 A1 | 9/2016 | Duparre et al. |
| 2016/0267665 A1 | 9/2016 | Venkataraman et al. |
| 2016/0267672 A1 | 9/2016 | Ciurea et al. |
| 2016/0269626 A1 | 9/2016 | McMahon |
| 2016/0269627 A1 | 9/2016 | McMahon |
| 2016/0269650 A1 | 9/2016 | Venkataraman et al. |
| 2016/0269651 A1 | 9/2016 | Venkataraman et al. |
| 2016/0269664 A1 | 9/2016 | Duparre |
| 2016/0316140 A1 | 10/2016 | Nayar et al. |
| 2017/0006233 A1 | 1/2017 | Venkataraman et al. |
| 2017/0048468 A1 | 2/2017 | Pain et al. |
| 2017/0053382 A1 | 2/2017 | Lelescu et al. |
| 2017/0054901 A1 | 2/2017 | Venkataraman et al. |
| 2017/0070672 A1 | 3/2017 | Rodda et al. |
| 2017/0070673 A1 | 3/2017 | Lelescu et al. |
| 2017/0078568 A1 | 3/2017 | Venkataraman et al. |
| 2017/0085845 A1 | 3/2017 | Venkataraman et al. |
| 2017/0094243 A1 | 3/2017 | Venkataraman et al. |
| 2017/0099465 A1 | 4/2017 | Mullis et al. |
| 2017/0163862 A1 | 6/2017 | Molina |
| 2017/0178363 A1 | 6/2017 | Venkataraman et al. |
| 2017/0187933 A1 | 6/2017 | Duparre |
| 2017/0244960 A1 | 8/2017 | Ciurea et al. |
| 2017/0257562 A1 | 9/2017 | Venkataraman et al. |
| 2017/0365104 A1 | 12/2017 | McMahon et al. |
| 2018/0007284 A1 | 1/2018 | Venkataraman et al. |
| 2018/0013945 A1 | 1/2018 | Ciurea et al. |
| 2018/0024330 A1 | 1/2018 | Laroia |
| 2018/0035057 A1 | 2/2018 | McMahon et al. |
| 2018/0040135 A1 | 2/2018 | Mullis |
| 2018/0048830 A1 | 2/2018 | Venkataraman et al. |
| 2018/0081090 A1 | 3/2018 | Duparre et al. |
| 2018/0097993 A1 | 4/2018 | Nayar et al. |
| 2018/0109782 A1 | 4/2018 | Duparre et al. |

FOREIGN PATENT DOCUMENTS

| | | |
|---|---|---|
| CN | 101010619 A | 8/2007 |
| CN | 101064780 A | 10/2007 |
| CN | 101102388 A | 1/2008 |
| CN | 101147392 A | 3/2008 |
| CN | 101427372 A | 5/2009 |
| CN | 101606086 A | 12/2009 |
| CN | 101883291 A | 11/2010 |
| CN | 102037717 A | 4/2011 |
| CN | 102375199 A | 3/2012 |
| CN | 104081414 A | 10/2014 |
| CN | 104508681 A | 4/2015 |
| CN | 104662589 A | 5/2015 |
| CN | 104685513 A | 6/2015 |
| CN | 104685860 A | 6/2015 |
| CN | 104081414 B | 8/2017 |
| CN | 107230236 A | 10/2017 |
| CN | 107346061 A | 11/2017 |
| EP | 0677821 A2 | 10/1995 |
| EP | 840502 A2 | 5/1998 |
| EP | 1201407 A2 | 5/2002 |
| EP | 1355274 A2 | 10/2003 |

(56) References Cited

FOREIGN PATENT DOCUMENTS

| | | |
|---|---|---|
| EP | 1734766 A2 | 12/2006 |
| EP | 1243945 B1 | 1/2009 |
| EP | 2026563 A1 | 2/2009 |
| EP | 2104334 A1 | 9/2009 |
| EP | 2244484 A1 | 10/2010 |
| EP | 0957642 B1 | 4/2011 |
| EP | 2336816 A2 | 6/2011 |
| EP | 2339532 A1 | 6/2011 |
| EP | 2381418 A1 | 10/2011 |
| EP | 2652678 A1 | 10/2013 |
| EP | 2761534 A1 | 8/2014 |
| EP | 2867718 A1 | 5/2015 |
| EP | 2873028 A1 | 5/2015 |
| EP | 2888698 A2 | 7/2015 |
| EP | 2888720 A1 | 7/2015 |
| EP | 2901671 A2 | 8/2015 |
| EP | 3066690 A1 | 9/2016 |
| EP | 2652678 B1 | 9/2017 |
| EP | 2817955 B1 | 4/2018 |
| GB | 2482022 A | 1/2012 |
| IN | 2708/CHENP/2014 A1 | 8/2015 |
| JP | 59025483 A | 2/1984 |
| JP | 64037177 A | 2/1989 |
| JP | 02285772 A | 11/1990 |
| JP | 0715457 A | 1/1995 |
| JP | 09181913 A | 7/1997 |
| JP | 11142609 A | 5/1999 |
| JP | 11223708 A | 8/1999 |
| JP | 2000209503 A | 7/2000 |
| JP | 2001008235 A2 | 1/2001 |
| JP | 2001194114 A2 | 7/2001 |
| JP | 2001264033 A2 | 9/2001 |
| JP | 2001277260 A | 10/2001 |
| JP | 2001337263 A2 | 12/2001 |
| JP | 2002195910 A | 7/2002 |
| JP | 2002205310 A | 7/2002 |
| JP | 2002252338 A | 9/2002 |
| JP | 2003094445 A | 4/2003 |
| JP | 2003139910 A | 5/2003 |
| JP | 2003163938 A | 6/2003 |
| JP | 2003298920 A | 10/2003 |
| JP | 2004221585 A | 8/2004 |
| JP | 2005116022 A | 4/2005 |
| JP | 2005181460 A | 7/2005 |
| JP | 2005295381 A | 10/2005 |
| JP | 2005303694 A | 10/2005 |
| JP | 2005341569 A | 12/2005 |
| JP | 2005354124 A | 12/2005 |
| JP | 2006033228 A | 2/2006 |
| JP | 2006033493 A | 2/2006 |
| JP | 2006047944 A | 2/2006 |
| JP | 2006258930 A | 9/2006 |
| JP | 2007520107 A | 7/2007 |
| JP | 2007259136 A | 10/2007 |
| JP | 2008039852 A | 2/2008 |
| JP | 2008055908 A | 3/2008 |
| JP | 2008507874 A | 3/2008 |
| JP | 2008172735 A | 7/2008 |
| JP | 2008258885 A | 10/2008 |
| JP | 2009064421 A | 3/2009 |
| JP | 2009132010 A | 6/2009 |
| JP | 2009300268 A | 12/2009 |
| JP | 2011017764 A | 1/2011 |
| JP | 2011030184 A | 2/2011 |
| JP | 2011109484 A | 6/2011 |
| JP | 2011523538 A | 8/2011 |
| JP | 2012504805 A | 2/2012 |
| JP | 2013509022 A | 3/2013 |
| JP | 2013526801 A | 6/2013 |
| JP | 2014521117 A | 8/2014 |
| JP | 2014535191 A | 12/2014 |
| JP | 2015522178 A | 8/2015 |
| JP | 2015534734 A | 12/2015 |
| JP | 6140709 B2 | 5/2017 |
| JP | 2017163550 A | 9/2017 |
| JP | 2017163587 A | 9/2017 |
| JP | 2017531976 A | 10/2017 |
| KR | 1020110097647 A | 8/2011 |
| KR | 20170063827 A | 6/2017 |
| KR | 101824672 B1 | 2/2018 |
| SG | 191151 A1 | 7/2013 |
| TW | 200828994 A | 7/2008 |
| TW | 200939739 A | 9/2009 |
| WO | 2005057922 A1 | 6/2005 |
| WO | 2006039906 A2 | 4/2006 |
| WO | 2006039906 A3 | 9/2006 |
| WO | 2007013250 A1 | 2/2007 |
| WO | 2007083579 A1 | 7/2007 |
| WO | 2007134137 A2 | 11/2007 |
| WO | 2008045198 A2 | 4/2008 |
| WO | 2008050904 A1 | 5/2008 |
| WO | 2008108271 A1 | 9/2008 |
| WO | 2008108926 A1 | 9/2008 |
| WO | 2008150817 A1 | 12/2008 |
| WO | 2009073950 A1 | 6/2009 |
| WO | 2009151903 A2 | 12/2009 |
| WO | 2009157273 A1 | 12/2009 |
| WO | 2010037512 A1 | 4/2010 |
| WO | 2011008443 A2 | 1/2011 |
| WO | 2011046607 A2 | 4/2011 |
| WO | 2011055655 A1 | 5/2011 |
| WO | 2011063347 A2 | 5/2011 |
| WO | 2011105814 A2 | 9/2011 |
| WO | 2011116203 A1 | 9/2011 |
| WO | 2011063347 A3 | 10/2011 |
| WO | 2011143501 A1 | 11/2011 |
| WO | 2012057619 A1 | 5/2012 |
| WO | 2012057620 A2 | 5/2012 |
| WO | 2012057621 A1 | 5/2012 |
| WO | 2012057622 A1 | 5/2012 |
| WO | 2012057623 A1 | 5/2012 |
| WO | 2012057620 A3 | 6/2012 |
| WO | 2012074361 A1 | 6/2012 |
| WO | 2012078126 A1 | 6/2012 |
| WO | 2012082904 A1 | 6/2012 |
| WO | 2012155119 A1 | 11/2012 |
| WO | 2013003276 A1 | 1/2013 |
| WO | 2013043751 A1 | 3/2013 |
| WO | 2013043761 A1 | 3/2013 |
| WO | 2013049699 A1 | 4/2013 |
| WO | 2013055960 A1 | 4/2013 |
| WO | 2013119706 A1 | 8/2013 |
| WO | 2013126578 A1 | 8/2013 |
| WO | 2013166215 A1 | 11/2013 |
| WO | 2014004134 A1 | 1/2014 |
| WO | 2014005123 A1 | 1/2014 |
| WO | 2014031795 A1 | 2/2014 |
| WO | 2014052974 A2 | 4/2014 |
| WO | 2014032020 A3 | 5/2014 |
| WO | 2014078443 A1 | 5/2014 |
| WO | 2014130849 A1 | 8/2014 |
| WO | 2014133974 A1 | 9/2014 |
| WO | 2014138695 A1 | 9/2014 |
| WO | 2014138697 A1 | 9/2014 |
| WO | 2014144157 A1 | 9/2014 |
| WO | 2014145856 A1 | 9/2014 |
| WO | 2014149403 A1 | 9/2014 |
| WO | 2014150856 A1 | 9/2014 |
| WO | 2014153098 A1 | 9/2014 |
| WO | 2014159721 A1 | 10/2014 |
| WO | 2014159779 A1 | 10/2014 |
| WO | 2014160142 A1 | 10/2014 |
| WO | 2014164550 A2 | 10/2014 |
| WO | 2014164909 A1 | 10/2014 |
| WO | 2014165244 A1 | 10/2014 |
| WO | 2014133974 A9 | 4/2015 |
| WO | 2014149902 A1 | 4/2015 |
| WO | 2015048694 A2 | 4/2015 |
| WO | 2015070105 A1 | 5/2015 |
| WO | 2015074078 A1 | 5/2015 |
| WO | 2015081279 A1 | 6/2015 |

(56) References Cited

FOREIGN PATENT DOCUMENTS

| WO | 2015134996 A1 | 9/2015 |
|---|---|---|
| WO | 2016054089 A1 | 4/2016 |

OTHER PUBLICATIONS

US 8,964,053, 02/2015, Venkataraman et al. (withdrawn)
US 8,965,058, 02/2015, Venkataraman et al. (withdrawn)
US 9,014,491, 04/2015, Venkataraman et al. (withdrawn)
US 9,338,332, 06/2016, Venkataraman et al. (withdrawn)
Levin et al. "A Closed Form Solution to Natural Image Matting," IEEE Conference on Computer Vision and Pattern Recognition (CVPR), vol. 1, pp. 61-68, (2006).*
Chen et al. "Knn Matting", IEEE Conference on Computer Vision and Pattern Recognition (CVPR), pp. 869-876, (2012).*
Robert et al. "Dense Depth Map Reconstruction : A Minimization and Regularization Approach which Preserves Discontinuities," European Conference on Computer Vision (ECCV), pp. 439-451, (1996).*
Farsiu et al., "Multiframe Demosaicing and Super-Resolution of Color Images", IEEE Transactions on Image Processing, Jan. 2006, vol. 15, No. 1, pp. 141-159.
Feris et al., "Multi-Flash Stereopsis: Depth Edge Preserving Stereo with Small Baseline Illumination", IEEE Trans on PAMI, 2006, 31 pgs.
Fife et al., "A 3D Multi-Aperture Image Sensor Architecture", Custom Integrated Circuits Conference, 2006, CICC '06, IEEE, pp. 281-284.
Fife et al., "A 3MPixel Multi-Aperture Image Sensor with 0.7Mu Pixels in 0.11Mu CMOS", ISSCC 2008, Session 2, Image Sensors & Technology, 2008, pp. 48-50.
Fischer et al. "Optical System Design", 2nd Edition, SPIE Press, pp. 191-198.
Fischer et al. "Optical System Design", 2nd Edition, SPIE Press, pp. 49-58.
Goldman et al., "Video Object Annotation, Navigation, and Composition", In Proceedings of UIST 2008, pp. 3-12.
Gortler et al., "The Lumigraph", In Proceedings of SIGGRAPH 1996, pp. 43-54.
Hacohen et al., "Non-Rigid Dense Correspondence with Applications for Image Enhancement", ACM Transactions on Graphics, 30, 4, 2011, pp. 70:1-70:10.
Hamilton, "JPEG File Interchange Format, Version 1.02", Sep. 1, 1992, 9 pgs.
Hardie, "A Fast Image Super-Algorithm Using an Adaptive Wiener Filter", IEEE Transactions on Image Processing, Dec. 2007, vol. 16, No. 12, pp. 2953-2964.
Hasinoff et al., "Search-and-Replace Editing for Personal Photo Collections", Computational Photography (ICCP) 2010, pp. 1-8.
Horisaki et al., "Irregular Lens Arrangement Design to Improve Imaging Performance of Compound-Eye Imaging Systems", Applied Physics Express, 2010, vol. 3, pp. 022501-1-022501-3.
Horisaki et al., "Superposition Imaging for Three-Dimensionally Space-Invariant Point Spread Functions", Applied Physics Express, 2011, vol. 4, pp. 112501-1-112501-3.
Horn et al., "LightShop: Interactive Light Field Manipulation and Rendering", In Proceedings of I3D 2007, pp. 121-128.
Isaksen et al., "Dynamically Reparameterized Light Fields", In Proceedings of SIGGRAPH 2000, pp. 297-306.
Jarabo et al., "Efficient Propagation of Light Field Edits", In Proceedings of SIACG 2011, pp. 75-80.
Joshi et al. "Synthetic Aperture Tracking: Tracking Through Occlusions", I CCV IEEE 11th International Conference on Computer Vision; Publication [online]. Oct. 2007 [retrieved Jul. 28, 2014]. Retrieved from the Internet: <URL: http:I/ieeexplore.ieee.org/stamp/stamp.jsp?tp=84arnumber=4409032&isnumber= 4408819>; pp. 1-8.
Kang et al., "Handling Occlusions inn Dense Multi-View Stereo", Computer Vision and Pattern Recognition, 2001, vol. 1, pp. I-103-I-110.
Kitamura et al., "Reconstruction of a high-resolution image on a compound-eye image-capturing system", Applied Optics, Mar. 10, 2004, vol. 43, No. 8, pp. 1719-1727.
Krishnamurthy et al., "Compression and Transmission of Depth Maps for Image-Based Rendering", Image Processing, 2001, pp. 828-831.
Kutulakos et al., "Occluding Contour Detection Using Affine Invariants and Purposive Viewpoint Control", Proc., CVPR 94, 8 pgs.
Lai et al., "A Large-Scale Hierarchical Multi-View RGB-D Object Dataset", source and date unknown, 8 pgs.
Lensvector, "How LensVector Autofocus Works", printed Nov. 2, 2012 from http://www.lensvector.com/overview.html, 1 pg.
Levin et al., "A Closed Form Solution to Natural Image Matting", Pattern Analysis and Machine Intelligence, Feb. 2008, vol. 30, 8 pgs.
Levoy, "Light Fields and Computational Imaging", IEEE Computer Society, Aug. 2006, pp. 46-55.
Levoy et al., "Light Field Rendering", Proc. ADM SIGGRAPH '96, pp. 1-12.
Li et al., "A Hybrid Camera for Motion Deblurring and Depth Map Super-Resolution", Jun. 23-28, 2008, IEEE Conference on Computer Vision and Pattern Recognition, 8 pgs. Retrieved from www.eecis.udel.edu/~jye/lab_research/08/deblur-feng.pdf on Feb. 5, 2014.
Liu et al., "Virtual View Reconstruction Using Temporal Information", 2012 IEEE International Conference on Multimedia and Expo, 2012, pp. 115-120.
Lo et al., "Stereoscopic 3D Copy & Paste", ACM Transactions on Graphics, vol. 29, No. 6, Article 147, Dec. 2010, pp. 147:1-147:10.
Mitra et al., "Light Field Denoising, Light Field Superresolution and Stereo Camera Based Refocussing using a GMM Light Field Patch Prior", Computer Vision and Pattern Recognition Workshops (CVPRW), 2012 IEEE Computer Society Conference on Jun. 16-21, 2012, pp. 22-28.
Muehlebach, "Camera Auto Exposure Control for VSLAM Applications", Studies on Mechatronics, Swiss Federal Institute of Technology Zurich, Autumn Term 2010 course, 67 pgs.
Nayar, "Computational Cameras: Redefining the Image", IEEE Computer Society, Aug. 2006, pp. 30-38.
Ng, "Digital Light Field Photography", Thesis, Jul. 2006, 203 pgs.
Ng et al., "Super-Resolution Image Restoration from Blurred Low-Resolution Images", Journal of Mathematical Imaging and Vision, 2005, vol. 23, pp. 367-378.
Nitta et al., "Image reconstruction for thin observation module by bound optics by using the iterative backprojection method", Applied Optics, May 1, 2006, vol. 45, No. 13, pp. 2893-2900.
Nomura et al., "Scene Collages and Flexible Camera Arrays", Proceedings of Eurographics Symposium on Rendering, 2007, 12 pgs.
Park et al., "Super-Resolution Image Reconstruction", IEEE Signal Processing Magazine, May 2003, pp. 21-36.
Perwass et al., "Single Lens 3D-Camera with Extended Depth-of-Field", printed from www.raytrix.de, 15 pgs.
Pham et al., "Robust Super-Resolution without Regularization", Journal of Physics: Conference Series 124, 2008, pp. 1-19.
Polight, "Designing Imaging Products Using Reflowable Autofocus Lenses", http://www.polight.no/tunable-polymer-autofocus-lens-html--11.html.
Protter et al., "Generalizing the Nonlocal-Means to Super-Resolution Reconstruction", IEEE Transactions on Image Processing, Jan. 2009, vol. 18, No. 1, pp. 36-51.
Radtke et al., "Laser lithographic fabrication and characterization of a spherical artificial compound eye", Optics Express, Mar. 19, 2007, vol. 15, No. 6, pp. 3067-3077.
Rander et al., "Virtualized Reality: Constructing Time-Varying Virtual Worlds From Real World Events", Proc. of IEEE Visualization '97, Phoenix, Arizona, Oct. 19-24, 1997, pp. 277-283, 552.
Rhemann et al, "Fast Cost-Volume Filtering for Visual Correspondence and Beyond", IEEE Trans. Pattern Anal. Mach. Intell, 2013, vol. 35, No. 2, pp. 504-511.
Robertson et al., "Dynamic Range Improvement Through Multiple Exposures", In Proc. of the Int. Conf. on Image Processing, 1999, 5 pgs.

(56) References Cited

OTHER PUBLICATIONS

Robertson et al., "Estimation-theoretic approach to dynamic range enhancement using multiple exposures", Journal of Electronic Imaging, Apr. 2003, vol. 12, No. 2, pp. 219-228.
Roy et al., "Non-Uniform Hierarchical Pyramid Stereo for Large Images", Computer and Robot Vision, 2007, pp. 208-215.
Sauer et al., "Parallel Computation of Sequential Pixel Updates in Statistical Tomographic Reconstruction", ICIP 1995, pp. 93-96.
Seitz et al., "Plenoptic Image Editing", International Journal of Computer Vision 48, 2, pp. 115-129.
Shum et al., "Pop-Up Light Field: An Interactive Image-Based Modeling and Rendering System", Apr. 2004, ACM Transactions on Graphics, vol. 23, No. 2, pp. 143-162. Retrieved from http://131.107.65.14/en-us/um/people/jiansun/papers/PopupLightField_TOG.pdf on Feb. 5.
Stollberg et al., "The Gabor superlens as an alternative wafer-level camera approach inspired by superposition compound eyes of nocturnal insects", Optics Express, Aug. 31, 2009, vol. 17, No. 18, pp. 15747-15759.
Sun et al., "Image Super-Resolution Using Gradient Profile Prior", Source and date unknown, 8 pgs.
Takeda et al., "Super-resolution Without Explicit Subpixel Motion Estimation", IEEE Transaction on Image Processing, Sep. 2009, vol. 18, No. 9, pp. 1958-1975.
Tallon et al., "Upsampling and Denoising of Depth Maps Via Joint-Segmentation", 20th European Signal Processing Conference, Aug. 27-31, 2012, 5 pgs.
Tanida et al., "Color imaging with an integrated compound imaging system", Optics Express, Sep. 8, 2003, vol. 11, No. 18, pp. 2109-2117.
Tanida et al., "Thin observation module by bound optics (TOMBO): concept and experimental verification", Applied Optics, Apr. 10, 2001, vol. 40, No. 11, pp. 1806-1813.
Taylor, "Virtual camera movement: The way of the future?", American Cinematographer 77, 9 (Sep.), 93-100.
Vaish et al., "Reconstructing Occluded Surfaces Using Synthetic Apertures: Stereo, Focus and Robust Measures", Proceeding, CVPR '06 Proceedings of the 2006 IEEE Computer Society Conference on Computer Vision and Pattern Recognition—vol. 2, pp. 2331-2338.
Vaish et al., "Synthetic Aperture Focusing Using a Shear-Warp Factorization of the Viewing Transform", IEEE Workshop on A3DISS, CVPR, 2005, 8 pgs.
Vaish et al., "Using Plane + Parallax for Calibrating Dense Camera Arrays", IEEE Conference on Computer Vision and Pattern Recognition (CVPR), 2004, 8 pgs.
Veilleux, "CCD Gain Lab: The Theory", University of Maryland, College Park-Observational Astronomy (ASTR 310), Oct. 19, 2006, pp. 1-5 (online), [retrieved on May 13, 2014]. Retrieved from the Internet <URL: http://www.astro.umd.edu/~veilleux/ASTR310/fall06/ccd_theory.pdf, 5 pgs.
Vuong et al., "A New Auto Exposure and Auto White-Balance Algorithm to Detect High Dynamic Range Conditions Using CMOS Technology", Proceedings of the World Congress on Engineering and Computer Science 2008, WCECS 2008, Oct. 22-24, 2008.
Wang, "Calculation of Image Position, Size and Orientation Using First Order Properties", 10 pgs.
Wetzstein et al., "Computational Plenoptic Imaging", Computer Graphics Forum, 2011, vol. 30, No. 8, pp. 2397-2426.
Wheeler et al., "Super-Resolution Image Synthesis Using Projections Onto Convex Sets in the Frequency Domain", Proc. SPIE, 2005, 5674, 12 pgs.
Wikipedia, "Polarizing Filter (Photography)", http://en.wikipedia.org/wiki/Polarizing_filter(photography), 1 pg.
Wilburn, "High Performance Imaging Using Arrays of Inexpensive Cameras", Thesis of Bennett Wilburn, Dec. 2004, 128 pgs.
Wilburn et al., "High Performance Imaging Using Large Camera Arrays", ACM Transactions on Graphics, Jul. 2005, vol. 24, No. 3, pp. 1-12.
Wilburn et al., "High-Speed Videography Using a Dense Camera Array", Proceeding, CVPR'04 Proceedings of the 2004 IEEE Computer Society.Conference on Computer Vision and Pattern Recognition, pp. 294-301.
Wilburn et al., "The Light Field Video Camera", Proceedings of Media Processors 2002, SPIE Electronic Imaging, 2002, 8 pgs.
Wippermann et al., "Design and fabrication of a chirped array of refractive ellipsoidal micro-lenses for an apposition eye camera objective", Proceedings of SPIE, Optical Design and Engineering II, Oct. 15, 2005, 59622C-1-59622C11.
Yang et al., "A Real-Time Distributed Light Field Camera", Eurographics Workshop on Rendering (2002), pp. 1-10.
Yang et al., "Superresolution Using Preconditioned Conjugate Gradient Method", Source and date unknown, 8 pgs.
Zhang et al. "Depth estimation, spatially variant image registration, and super-resolution using a multi-lenslet camera", Proceedings of SPIE, vol.7705, Apr. 23, 2010, pp. 770505-770505-8, XP055113797 ISSN: 0277-786X, DOI: 10.1117/12.852171.
Zhang et al., "A Self-Reconfigurable Camera Array", Eurographics Symposium on Rendering, 2004, 12 pgs.
Zomet et al., "Robust Super-Resolution", IEEE, 2001, pp. 1-6.
Extended European Search Report for European Application EP12782935.6, report completed Aug. 28, 2014 dated Sep. 4, 2014, 6 Pgs.
Extended European Search Report for European Application EP12804266.0, Report Completed Jan. 27, 2015, dated Feb. 3, 2015, 6 Pgs.
Extended European Search Report for European Application EP12835041.0, Report Completed Jan. 28, 2015, dated Feb. 4, 2015, 6 Pgs.
International Preliminary Report on Patentability for International Application No. PCT/US2012/059813, Search Completed Apr. 15, 2014, 7 pgs.
International Preliminary Report on Patentability for International Application PCT/US13/56065, Report dated Feb. 24, 2015, dated Mar. 5, 2015, 4 Pgs.
International Preliminary Report on Patentability for International Application PCT/US2013/024987, dated Aug. 21, 2014, 13 Pgs.
International Preliminary Report on Patentability for International Application PCT/US2013/027146, Completed Apr. 2, 2013, dated Aug. 26, 2014, 10 pgs.
International Preliminary Report on Patentability for International Application PCT/US2013/039155, completed Nov. 4, 2014, dated Nov. 13, 2014, 10 Pgs.
International Preliminary Report on Patentability for International Application PCT/US2013/048772, dated Dec. 31, 2014, dated Jan. 8, 2015, 8 Pgs.
International Preliminary Report on Patentability for International Application PCT/US2013/056502, Report dated Feb. 24, 2015, dated Mar. 5, 2015, 7 Pgs.
International Preliminary Report on Patentability for International Application PCT/US13/62720, Report dated Mar. 31, 2015, dated Apr. 9, 2015, 8 Pgs.
International Search Report and Written Opinion for International Application No. PCT/US13/46002, completed Nov. 13, 2013, dated Nov. 29, 2013, 7 pgs.
International Search Report and Written Opinion for International Application No. PCT/US13/56065, Completed Nov. 25, 2013, dated Nov. 26, 2013, 8 pgs.
International Search Report and Written Opinion for International Application No. PCT/US13/59991, Completed Feb. 6, 2014, dated Feb. 26, 2014, 8 pgs.
International Search Report and Written Opinion for International Application No. PCT/US2009/044687, completed Jan. 5, 2010, dated Jan. 13, 2010, 9 pgs.
International Search Report and Written Opinion for International Application No. PCT/US2011/64921, Completed Feb. 25, 2011, dated Mar. 6, 2012, 17 pgs.
International Search Report and Written Opinion for International Application No. PCT/US2013/024987, Completed Mar 27, 2013, dated Apr. 15, 2013, 14 pgs.

(56) References Cited

OTHER PUBLICATIONS

International Search Report and Written Opinion for International Application No. PCT/US2013/027146, completed Apr. 2, 2013, 12 pgs.
International Search Report and Written Opinion for International Application No. PCT/US2013/039155, completed Jul. 1, 2013, dated Jul. 11, 2013, 11 Pgs.
International Search Report and Written Opinion for International Application No. PCT/US2013/048772, Oct. 21, 2013, dated Nov. 8, 2013, 6 pgs.
International Search Report and Written Opinion for International Application No. PCT/US2013/056502, Completed Feb. 18, 2014, dated Mar. 19, 2014, 7 pgs.
International Search Report and Written Opinion for International Application No. PCT/US2013/069932, Completed Mar. 14, 2014, dated Apr. 14, 2014, 12 pgs.
International Search Report and Written Opinion for International Application PCT/US11/36349, dated Aug. 22, 2011, 11 pgs.
International Search Report and Written Opinion for International Application PCT/US13/62720, completed Mar. 25, 2014, dated Apr. 21, 2014, 9 Pgs.
International Search Report and Written Opinion for International Application PCT/US14/024903 completed Jun. 12, 2014, dated Jun. 27, 2014, 13 pgs.
International Search Report and Written Opinion for International Application PCT/US14/17766, report completed May 28, 2014, dated Jun. 18, 2014, 9 Pgs.
International Search Report and Written Opinion for International Application PCT/US14/18084, report completed May 23, 2014, dated Jun. 10, 2014, 12 Pgs.
International Search Report and Written Opinion for International Application PCT/US14/18116, completed May 13, 2014, dated Jun. 2, 2014, 12 Pgs.
International Search Report and Written Opinion for International Application PCT/US14/22118, report completed Jun. 9, 2014, dated Jun. 25, 2014, 5 pgs.
International Search Report and Written Opinion for International Application PCT/US14/22774 report completed Jun. 9, 2014, dated Jul. 14, 2014, 6 Pgs.
International Search Report and Written Opinion for International Application PCT/US14/24407, report completed Jun. 11, 2014, dated Jul. 8, 2014, 9 Pgs.
International Search Report and Written Opinion for International Application PCT/US14/25100, report completed Jul. 7, 2014, dated Aug. 7, 2014 5 Pgs.
International Search Report and Written Opinion for International Application PCT/US14/25904 report completed Jun. 10, 2014, dated Jul. 10, 2014, 6 Pgs.
International Search Report and Written Opinion for International Application PCT/US2010/057661, completed Mar. 9, 2011, 14 pgs.
International Search Report and Written Opinion for International Application PCT/US2012/044014, completed Oct. 12, 2012, 15 pgs.
International Search Report and Written Opinion for International Application PCT/US2012/056151, completed Nov. 14, 2012, 10 pgs.
International Search Report and Written Opinion for International Application PCT/US2012/059813, Report completed Dec. 17, 2012, 8 pgs.
International Search Report and Written Opinion for International Application PCT/US2012/37670, dated Jul. 18, 2012, Report Completed Jul. 5, 2012, 9 pgs.
International Search Report and Written Opinion for International Application PCT/US2012/58093, Report completed Nov. 15, 2012, 12 pgs.
International Search Report and Written Opinion for International Application PCT/US2014/022123, completed Jun. 9, 2014, dated Jun. 25, 2014, 5 pgs.
International Search Report and Written Opinion for International Application PCT/US2014/024947, Completed Jul. 8, 2014, dated Aug. 5, 2014, 8 Pgs.
International Search Report and Written Opinion for International Application PCT/US2014/028447, completed Jun. 30, 2014, dated Jul. 21, 2014, 8 Pgs.
International Search Report and Written Opinion for International Application PCT/US2014/030692, completed Jul. 28, 2014, dated Aug. 27, 2014, 7 Pages.
International Search Report and Written Opinion for International Application PCT/US2014/23762, Completed May 30, 2014, dated Jul. 3, 2014, 6 Pgs.
Office Action for U.S. Appl. No. 12/952/106, dated Aug. 16, 2012, 12 pgs.
Baker et al., "Limits on Super-Resolution and How to Break Them", IEEE Transactions on Pattern Analysis and Machine Intelligence, Sep. 2002, vol. 24, No. 9, pp. 1167-1183.
Bertero et al., "Super-resolution in computational imaging", Micron, 2003, vol. 34, Issues 6-7, 17 pgs.
Bishop et al., "Full-Resolution Depth Map Estimation from an Aliased Plenoptic Light Field", ACCV 2010, Part II, LNCS 6493, pp. 186-200.
Bishop et al., "Light Field Superresolution", Retrieved from http://home.eps.hw.ac.uk/~sz73/ICCP09/LightFieldSuperresolution.pdf, 9 pgs.
Bishop et al., "The Light Field Camera: Extended Depth of Field, Aliasing, and Superresolution", IEEE Transactions on Pattern Analysis and Machine Intelligence, May 2012, vol. 34, No. 5, pp. 972-986.
Borman, "Topics in Multiframe Superresolution Restoration", Thesis of Sean Borman, Apr. 2004, 282 pgs.
Borman et al, "Image Sequence Processing", Source unknown, Oct. 14, 2002, 81 pgs.
Borman et al., "Block-Matching Sub-Pixel Motion Estimation from Noisy, Under-Sampled Frames—An Empirical Performance Evaluation", Proc SPIE, Dec. 1998, 3653, 10 pgs.
Borman et al., "Image Resampling and Constraint Formulation for Multi-Frame Super-Resolution Restoration", Proc. SPIE, Jun. 2003, 5016, 12 pgs.
Borman et al., "Linear models for multi-frame super-resolution restoration under non-affine registration and spatially varying PSF", Proc. SPIE, May 2004, vol. 5299, 12 pgs.
Borman et al., "Nonlinear Prediction Methods for Estimation of Clique Weighting Parameters in NonGaussian Image Models", Proc. SPIE, 1998. 3459, 9 pgs.
Borman et al., "Simultaneous Multi-Frame MAP Super-Resolution Video Enhancement Using Spatio-Temporal Priors", Image Processing, 1999, ICIP 99 Proceedings, vol. 3, pp. 469-473.
Borman et al., "Super-Resolution from Image Sequences—A Review", Circuits & Systems, 1998, pp. 374-378.
Bose et al., "Superresolution and Noise Filtering Using Moving Least Squares", IEEE Transactions on Image Processing, date unknown, 21 pgs.
Boye et al., "Comparison of Subpixel Image Registration Algorithms", Proc. of SPIE-IS&T Electronic Imaging, vol. 7246, pp. 72460X-1-72460X-9.
Bruckner et al., "Artificial compound eye applying hyperacuity", Optics Express, Dec. 11, 2006, vol. 14, No. 25, pp. 12076-12084.
Bruckner et al., "Driving microoptical imaging systems towards miniature camera applications", Proc. SPIE, Micro-Optics, 2010, 11 pgs.
Bruckner et al., "Thin wafer-level camera lenses inspired by insect compound eyes", Optics Express, Nov. 22, 2010, vol. 18, No. 24, pp. 24379-24394.
Capel, "Image Mosaicing and Super-resolution", [online], Retrieved on Nov. 10, 2012 (Nov. 10, 2012). Retrieved from the Internet at URL:<http://citeseerx.ist.psu.edu/viewdoc/download?doi=10.1.1.226.2643&rep=rep1 &type=pdf>, Title pg., abstract, table of contents, pp. 1-263 (269 total pages).
Chan et al., "Extending the Depth of Field in a Compound-Eye Imaging System with Super-Resolution Reconstruction", Proceedings—International Conference on Pattern Recognition, 2006, vol. 3, pp. 623-626.

(56) References Cited

OTHER PUBLICATIONS

Chan et al., "Investigation of Computational Compound-Eye Imaging System with Super-Resolution Reconstruction", IEEE, ISASSP 2006, pp. 1177-1180.
Chan et al., "Super-resolution reconstruction in a computational compound-eye imaging system", Multidim Syst Sign Process, 2007, vol. 18, pp. 83-101.
Chen et al., "Interactive deformation of light fields", In Proceedings of SIGGRAPH I3D 2005, pp. 139-146.
Chen et al., "KNN Matting", IEEE Transactions on Pattern Analysis and Machine Intelligence, Sep. 2013, vol. 35, No. 9, pp. 2175-2188.
Drouin et al., "Fast Multiple-Baseline Stereo with Occlusion", Proceedings of the Fifth International Conference on 3-D Digital Imaging and Modeling, 2005, 8 pgs.
Drouin et al., "Geo-Consistency for Wide Multi-Camera Stereo", Proceedings of the 2005 IEEE Computer Society Conference on Computer Vision and Pattern Recognition, 2005, 8 pgs.
Drouin et al., "Improving Border Localization of Multi-Baseline Stereo Using Border-Cut", International Journal of Computer Vision, Jul. 2009, vol. 83, Issue 3, 8 pgs.
Duparre et al., "Artificial apposition compound eye fabricated by micro-optics technology", Applied Optics, Aug. 1, 2004, vol. 43, No. 22, pp. 4303-4310.
Duparre et al., "Artificial compound eye zoom camera", Bioinspiration & Biomimetics, 2008, vol. 3, pp. 1-6.
Duparre et al., "Artificial compound eyes—different concepts and their application to ultra flat image acquisition sensors", MOEMS and Miniaturized Systems IV, Proc. SPIE 5346, Jan. 2004, pp. 89-100.
Duparre et al., "Chirped arrays of refractive ellipsoidal microlenses for aberration correction under oblique incidence", Optics Express, Dec. 26, 2005, vol. 13, No. 26, pp. 10539-10551.
Duparre et al., "Micro-optical artificial compound eyes", Bioinspiration & Biomimetics, 2006, vol. 1, pp. R1-R16.
Duparre et al., "Microoptical artificial compound eyes—from design to experimental verification of two different concepts", Proc. of SPIE, Optical Design and Engineering II, vol. 5962, pp. 59622A-1-59622A-12.
Duparre et al., "Microoptical Artificial Compound Eyes—Two Different Concepts for Compact Imaging Systems", 11th Microoptics Conference, Oct. 30-Nov. 2, 2005, 2 pgs.
Duparre et al., "Microoptical telescope compound eye", Optics Express, Feb. 7, 2005, vol. 13, No. 3, pp. 889-903.
Duparre et al., "Micro-optically fabricated artificial apposition compound eye", Electronic Imaging—Science and Technology, Prod. SPIE 5301, Jan. 2004, pp. 25-33.
Duparre et al., "Novel Optics/Micro-Optics for Miniature Imaging Systems", Proc. of SPIE, 2006, vol. 6196, pp. 619607-1-619607-15.
Duparre et al., "Theoretical analysis of an artificial superposition compound eye for application in ultra flat digital image acquisition devices", Optical Systems Design, Proc. SPIE 5249, Sep. 2003, pp. 408-418.
Duparre et al., "Thin compound-eye camera", Applied Optics, May 20, 3005, vol. 44, No. 15, pp. 2949-2956.
Duparre et al., "Ultra-Thin Camera Based on Artificial Apposistion Compound Eyes", 10th Microoptics Conference, Sep. 1-3, 2004, 2 pgs.
Fanaswala, "Regularized Super-Resolution of Multi-View Images", Retrieved on Nov. 10, 2012 (Nov. 10, 2012). Retrieved from the Internet at URL:<http://www.site.uottawa.ca/-edubois/theses/Fanaswala_thesis.pdf>, 163 pgs.
Farrell et al., "Resolution and Light Sensitivity Tradeoff with Pixel Size", Proceedings of the SPIE Electronic Imaging 2006 Conference, 2006, vol. 6069, 8 pgs.
Farsiu et al., "Advances and Challenges in Super-Resolution", International Journal of Imaging Systems and Technology, 2004, vol. 14, pp. 47-57.
Farsiu et al., "Fast and Robust Multiframe Super Resolution", IEEE Transactions on Image Processing, Oct. 2004, vol. 13, No. 10, pp. 1327-1344.

Kim et al., "Scene reconstruction from high spatio-angular resolution light fields", ACM Transactions on Graphics (TOG)—SIGGRAPH 2013 Conference Proceedings, vol. 32, Issue 4, Article 73, Jul. 21, 2013, 11 pages.
Konolige, Kurt, "Projected Texture Stereo", 2010 IEEE International Conference on Robotics and Automation, May 3-7, 2010, p. 148-155.
Kubota et al., "Reconstructing Dense Light Field From Array of Multilocus Images for Novel View Synthesis", IEEE Transactions on Image Processing, vol. 16, No. 1, Jan. 2007, pp. 269-279.
Lane et al, "A Survey of Mobile Phone Sensing", IEEE Communications Magazine, vol. 48, Issue 9, Sep. 2010, pp. 140-150.
Lee et al., "Automatic Upright Adjustment of Photographs", IEEE Conference on Computer Vision and Pattern Recognition (CVPR), 2012, pp. 877-884.
Lee et al., "Electroactive Polymer Actuator for Lens-Drive Unit in Auto-Focus Compact Camera Module", ETRI Journal, vol. 31, No. 6, Dec. 2009, pp. 695-702.
Lee et al. "Nonlocal matting", CVPR 2011, Jun. 20-25, 2011, pp. 2193-2200.
Levin et al., "Spectral Matting", 2007 IEEE Conference on Computer Vision and Pattern Recognition, Jun. 17-22, 2007, Minneapolis, MN, USA, pp. 1-8.
Li et al., "Fusing Images With Different Focuses Using Support Vector Machines", IEEE Transactions on Neural Networks, vol. 15, No. 6, Nov. 8, 2004, pp. 1555-1561.
Lim, Jongwoo, "Optimized Projection Pattern Supplementing Stereo Systems", 2009 IEEE International Conference on Robotics and Automation, May 12-17, 2009, pp. 2823-2829.
Martinez et al., "Simple Telemedicine for Developing Regions: Camera Phones and Paper-Based Microfluidic Devices for Real-Time, Off-Site Diagnosis", Analytical Chemistry (American Chemical Society), vol. 80, No. 10, May 15, 2008, pp. 3699-3707.
McGuire et al., "Defocus video matting", ACM Transactions on Graphics (TOG)—Proceedings of ACM SIGGRAPH 2005, vol. 24, Issue 3, Jul. 2005, pp. 567-576.
Merkle et al., "Adaptation and optimization of coding algorithms for mobile 3DTV", Mobile3DTV Project No. 216503, Nov. 2008, 55 pgs.
Moreno-Noguer et al., "Active Refocusing of Images and Videos", Journal ACM Transactions on Graphics (TOG)—Proceedings of ACM SIGGRAPH 2007, vol. 26, Issue 3, Jul. 2007, Article No. 67 10 pages.
Ng et al., "Light Field Photography with a Hand-held Plenoptic Camera", Stanford Tech Report CTSR Feb. 2005, Apr. 20, 2005, pp. 1-11.
Nguyen et al., "Error Analysis for Image-Based Rendering with Depth Information", IEEE Transactions on Image Processing, vol. 18, Issue 4, Apr. 2009, pp. 703-716.
Nguyen et al., "Image-Based Rendering with Depth Information Using the Propagation Algorithm", Proceedings. ICASSP '05). IEEE International Conference on Acoustics, Speech, and Signal Processing, 2005, vol. 5, Mar. 23-23, 2005, pp. II-589-II-592.
Nishihara, H.K., "Prism: A Practical Real-Time Imaging Stereo Matcher", Massachusetts Institute of Technology, A.I. Memo 780, May 1984, 32 pgs.
Park et al., "Multispectral Imaging Using Multiplexed Illumination", 2007 IEEE 11th International Conference on Computer Vision, Oct. 14-21, 2007, Rio de Janeiro, Brazil, pp. 1-8.
Parkkinen et al., "Characteristic Spectra of Munsell Colors", Journal of the Optical Society of America A, vol. 6, Issue 2, Feb. 1989, pp. 318-322.
Philips 3D Solutions, "3D Interface Specifications, White Paper", Feb. 15, 2008, 2005-2008 Philips Electronics Nederland B.V., Philips 3D Solutions retrieved from www.philips.com/3dsolutions, 29 pgs.
Pouydebasque et al., "Varifocal liquid lenses with integrated actuator, high focusing power and low operating voltage fabricated on 200 mm wafers", Sensors and Actuators A: Physical, vol. 172, Issue 1, Dec. 2011, pp. 280-286.
Rajan et al., "Simultaneous Estimation of Super Resolved Scene and Depth Map from Low Resolution Defocused Observations",

(56) References Cited

OTHER PUBLICATIONS

IEEE Transactions on Pattern Analysis and Machine Intelligence, vol. 25, No. 9, Sep. 8, 2003, pp. 1-16.
Rhemann et al, "A perceptually motivated online benchmark for image matting", 2009 IEEE Conference on Computer Vision and Pattern Recognition, Jun. 20-25, 2009, Miami, FL, USA, pp. 1826-1833.
Scharstein et al., "High-Accuracy Stereo Depth Maps Using Structured Light", IEEE Computer Society Conference on Computer Vision and Pattern Recognition (CVPR 2003), Jun. 2003, vol. 1, pp. 195-202.
Shotton et al., "Real-time human pose recognition in parts from single depth images", CVPR 2011, Jun. 20-25, 2011, Colorado Springs, CO, USA, pp. 1297-1304.
Shum et al., "A Review of image-based Rendering Techniques", Visual Communications and Image Processing 2000, May 2000, 12 pgs.
Silberman et al, "Indoor segmentation and support inference from RGBD images", ECCV'12 Proceedings of the 12th European conference on Computer Vision, vol. Part V, Oct. 7-13, 2012, Florence, Italy, pp. 746-760.
Stober, "Stanford researchers developing 3-D camera with 12,616 lenses", Stanford Report, Mar. 19, 2008, Retrieved from: http:news.stanford.edu/news/2008/march19/camera-031908.html, 5 pgs.
Taguchi et al., "Rendering-Oriented Decoding for a Distributed Multiview Coding System Using a Coset Code", Hindawi Publishing Corporation, EURASIP Journal on Image and Video Processing, vol. 2009, Article ID 251081, Online: Apr. 22, 2009, 12 pages.
Tao et al., "Depth from Combining Defocus and Correspondence Using Light-Field Cameras", ICCV '13 Proceedings of the 2013 IEEE International Conference on Computer Vision, Dec. 1, 2013, pp. 673-680.
Tseng et al., "Automatic 3-D depth recovery from a single urban-scene image", 2012 Visual Communications and Image Processing, Nov. 27-30, 2012, San Diego, CA, USA, pp. 1-6.
Venkataraman et al., "PiCam: An Ultra-Thin High Performance Monolithic Camera Array", ACM Transactions on Graphics (TOG), ACM, US, vol. 32, No. 6, Nov. 1, 2013, pp. 1-13.
Vetro et al., "Coding Approaches for End-To-End 3D TV Systems", Mitsubishi Electric Research Laboratories, Inc., TR2004-137, Dec. 2004, 6 pgs.
Viola et al., "Robust Real-time Object Detection", Cambridge Research Laboratory, Technical Report Series, Compaq, CRL 2001/01, Feb. 2001, Printed from: http://www.hpl.hp.com/techreports/Compaq-DEC/CRL-2001-1.pdf, 30 pgs.
Wang, "Calculation Image Position, Size and Orientation Using First Order Properties", Dec. 29, 2010, OPTI521 Tutorial, 10 pgs.
Wang et al., "Automatic Natural Video Matting with Depth", 15th Pacific Conference on Computer Graphics and Applications, PG '07, Oct. 29-Nov. 2, 2007, Maui, HI, USA, pp. 469-472.
Wang et al., "Image and Video Matting: A Survey", Foundations and Trends, Computer Graphics and Vision, vol. 3, No. 2, 2007, pp. 91-175.
Wang et al., "Soft scissors: an interactive tool for realtime high quality matting", ACM Transactions on Graphics (TOG)—Proceedings of ACM SIGGRAPH 2007, vol. 26, Issue 3, Article 9, Jul. 2007, published Aug. 5, 2007, 6 pages.
Wieringa et al., "Remote Non-invasive Stereoscopic Imaging of Blood Vessels: First In-vivo Results of a New Multispectral Contrast Enhancement Technology", Annals of Biomedical Engineering, vol. 34, No. 12, Dec. 2006, Published online Oct. 12, 2006, pp. 1870-1878.
Wu et al., "A virtual view synthesis algorithm based on image inpainting", 2012 Third International Conference on Networking and Distributed Computing, Hangzhou, China, Oct. 21-24, 2012, pp. 153-156.
Xu, Ruifeng, "Real-Time Realistic Rendering and High Dynamic Range Image Display and Compression", Dissertation, School of Computer Science in the College of Engineering and Computer Science at the University of Central Florida, Orlando, Florida, Fall Term 2005, 192 pgs.
Yokochi et al., "Extrinsic Camera Parameter Estimation Based-on Feature Tracking and GPS Data", Nara Institute of Science and Technology, Graduate School of Information Science, LNCS 3851, 2006, pp. 369-378.
Zheng et al., "Balloon Motion Estimation Using Two Frames", Proceedings of the Asilomar Conference on Signals, Systems and Computers, IEEE, Comp. Soc. Press, US, vol. 2 of 2, Nov. 4, 1991, pp. 1057-1061.
Zhu et al, "Fusion of Time-of-Flight Depth and Stereo for High Accuracy Depth Maps", 2008 IEEE Conference on Computer Vision and Pattern Recognition, Jun. 23-28, 2008, Anchorage, AK, USA, pp. 1-8.
International Preliminary Report on Patentability for International Application PCT/US2014/024407, dated Sep 15, 2015, dated Sep. 24, 2015, 8 Pgs.
International Preliminary Report on Patentability for International Application PCT/US2014/024903, dated Sep. 15, 2015, dated Sep. 24, 2015, 12 Pgs.
International Preliminary Report on Patentability for International Application PCT/US2014/024947, dated Sep. 15, 2015, dated Sep. 24, 2015, 7 Pgs.
International Preliminary Report on Patentability for International Application PCT/US2014/025100, dated Sep. 15, 2015, dated Sep. 24, 2015, 4 Pgs.
International Preliminary Report on Patentability for International Application PCT/US2014/025904, dated Sep 15, 2015, dated Sep. 24, 2015, 5 Pgs.
International Preliminary Report on Patentability for International Application PCT/US2014/028447, dated Sep. 15, 2015, dated Sep. 24, 2015, 7 Pgs.
International Preliminary Report on Patentability for International Application PCT/US2014/030692, dated Sep. 15, 2015, dated Sep. 24, 2015, 6 Pgs.
International Preliminary Report on Patentability for International Application PCT/US2014/064693, dated May 10, 2016, dated May 19, 2016, 14 Pgs.
International Preliminary Report on Patentability for International Application PCT/US2014/066229, dated May 24, 2016, dated Jun. 6, 2016, 9 Pgs.
International Preliminary Report on Patentability for International Application PCT/US2014/067740, dated May 31, 2016, dated Jun. 9, 2016, 9 Pgs.
International Preliminary Report on Patentability for International Application PCT/US2015/019529, dated Sep. 13, 2016, dated Sep. 22, 2016, 9 Pgs.
International Search Report and Written Opinion for International Application PCT/US2009/044687, completed Jan. 5, 2010, dated Jan. 13, 2010, 9 pgs.
International Search Report and Written Opinion for International Application PCT/US2013/027146, completed Apr. 2, 2013, dated Apr. 19, 2013, 11 pgs.
International Search Report and Written Opinion for International Application PCT/US2014/017766, completed May 28, 2014, dated Jun. 18, 2014, 9 Pgs.
International Search Report and Written Opinion for International Application PCT/US2014/018084, completed May 23, 2014, dated Jun. 10, 2014, 12 pgs.
International Search Report and Written Opinion for International Application PCT/US2014/018116, completed May 13, 2014, dated Jun. 2, 2014, 12 Pgs.
International Search Report and Written Opinion for International Application PCT/US2014/021439, completed Jun. 5, 2014, dated Jun. 20, 2014, 10 Pgs.
International Search Report and Written Opinion for International Application PCT/US2010/057661, completed Mar. 9, 2011, dated Mar. 17, 2011, 14 pgs.
International Search Report and Written Opinion for International Application PCT/US2014/064693, Completed Mar. 7, 2015, dated Apr. 2, 2015, 15 pgs.

(56) References Cited

OTHER PUBLICATIONS

International Search Report and Written Opinion for International Application PCT/US2014/066229, Completed Mar. 6, 2015, daed Mar. 19, 2015, 9 Pgs.
International Search Report and Written Opinion for International Application PCT/US2014/067740, Completed Jan. 29, 2015, dated Mar. 3, 2015, 10 pgs.
"File Formats Version 6", Alias Systems, 2004, 40 pgs.
"Light fields and computational photography", Stanford Computer Graphics Laboratory, Retrieved from: http://graphics.stanford.edu/projects/lightfield/, Earliest publication online: Feb. 10, 1997, 3 pgs.
Aufderheide et al., "A MEMS-based Smart Sensor System for Estimation of Camera Pose for Computer Vision Applications", Research and Innovation Conference 2011, Jul. 29, 2011, pp. 1-10.
Barron et al., "Intrinsic Scene Properties from a Single RGB-D Image", 2013 IEEE Conference on Computer Vision and Pattern Recognition, Jun. 23-28, 2013, Portland, OR, USA, pp. 17-24.
Bennett et al., "Multispectral Bilateral Video Fusion", 2007 IEEE Transactions on Image Processing, vol. 16, No. 5, May 2007, published Apr. 16, 2007, pp. 1185-1194.
Bennett et al., "Multispectral Video Fusion", Computer Graphics (ACM SIGGRAPH Proceedings), Jul. 25, 2006, published Jul. 30, 2006, 1 pg.
Bertalmio et al., "Image Inpainting", Proceedings of the 27th Annual Conference on Computer Graphics and Interactive Techniques, ACM Pres/Addison-Wesley Publishing Co., 2000, pp. 417-424.
Bryan et al., "Perspective Distortion from Interpersonal Distance Is an Implicit Visual Cue for Social Judgments of Faces", PLOS One, vol. 7, Issue 9, Sep. 26, 2012, e45301, doi:10.1371/journal.pone.0045301, 9 pages.
Carroll et al., "Image Warps for Artistic Perspective Manipulation", ACM Transactions on Graphics (TOG), vol. 29, No. 4, Jul. 26, 2010, Article No. 127, 9 pgs.
Chen et al., "Image Matting with Local and Nonlocal Smooth Priors", CVPR '13 Proceedings of the 2013 IEEE Conference on Computer Vision and Pattern Recognition, Jun. 23, 2013, pp. 1902-1907.
Chen et al., "KNN matting", 2012 IEEE Conference on Computer Vision and Pattern Recognition, Jun. 16-21, 2012, Providence, RI, USA, pp. 869-876.
Cooper et al., "The perceptual basis of common photographic practice", Journal of Vision, vol. 12, No. 5, Article 8, May 25, 2012, pp. 1-14.
Crabb et al., "'Real-time foreground segmentation via range and color imaging", 2008 IEEE Computer Society Conference on Computer Vision and Pattern Recognition Workshops, Anchorage, AK, USA, Jun. 23-28, 2008, pp. 1-5.
Debevec et al., "Recovering High Dynamic Range Radiance Maps from Photographs", Computer Graphics (ACM SIGGRAPH Proceedings), Aug. 16, 1997, 10 pgs.
Do, Minh N., "Immersive Visual Communication with Depth", Presented at Microsoft Research, Jun. 15, 2011, Retrieved from: http://minhdo.ece.illinois.edu/talks/ImmersiveComm.pdf, 42 pgs.
Do et al., "Immersive Visual Communication", IEEE Signal Processing Magazine, vol. 28, Issue 1, Jan. 2011, DOI: 10.1109/MSP.2010.939075, Retrieved from: http://minhdo.ece.illinois.edu/publications/ImmerComm_SPM.pdf, pp. 58-66.
Eng, Wei Yong et al., "Gaze correction for 3D tele-immersive communication system", IVMSP Workshop, 2013 IEEE 11th. IEEE, Jun. 10, 2013, 4 pages.
Fang et al., "Volume Morphing Methods for Landmark Based 3D Image Deformation", SPIE vol. 2710, Proc. 1996 SPIE Intl Symposium on Medical Imaging, Newport Beach, CA, Feb. 10, 1996, pp. 404-415.
Fecker et al., "Depth Map Compression for Unstructured Lumigraph Rendering", Proc. SPIE 6077, Proceedings Visual Communications and Image Processing 2006, Jan. 18, 2006, pp. 60770B-1-60770B-8.
Gastal et al., "Shared Sampling for Real-Time Alpha Matting", Computer Graphics Forum, EUROGRAPHICS 2010, vol. 29, Issue 2, May 2010, pp. 575-584.
Georgeiv et al., "Light Field Camera Design for Integral View Photography", Adobe Systems Incorporated, Adobe Technical Report, 2003, 13 pgs.
Georgiev et al., "Light-Field Capture by Multiplexing in the Frequency Domain", Adobe Systems Incorporated, Adobe Technical Report, 2003, 13 pgs.
Gupta et al, "Perceptual Organization and Recognition of Indoor Scenes from RGB-D Images", 2013 IEEE Conference on Computer Vision and Pattern Recognition, Jun. 23-28, 2013, Portland, OR, USA, pp. 564-571.
Hernandez-Lopez et al., "Detecting objects using color and depth segmentation with Kinect sensor", Procedia Technology, vol. 3, Jan. 1, 2012, pp. 196-204, XP055307680, ISSN: 2212-0173, DOI: 10.1016/j.protcy.2012.03.021.
Holoeye, "Spatial Light Modulators", Photonics AG, Brochure retrieved from http://holoeye.com/wp-content/uploads/Spatial_Light_Modulators.pdf, printed Jun. 15, 2017, 4 pgs.
Izadi et al., "KinectFusion: Real-time 3D Reconstruction and Interaction Using a Moving Depth Camera", UIST'11, Oct. 16-19, 2011, Santa Barbara, CA, pp. 559-568.
Janoch et al., "A category-level 3-D object dataset: Putting the Kinect to work", 2011 IEEE International Conference on Computer Vision Workshops (ICCV Workshops), Nov. 6-13, 2011, Barcelona, Spain, pp. 1168-1174.
Extended European Search Report for EP Application No. 13810429.4, Completed Jan. 7, 2016, dated Jan. 15, 2016, 6 Pgs.
Extended European Search Report for EP Application No. 13751714.0, completed Aug. 5, 2015, dated Aug. 18, 2015, 8 Pgs.
Extended European Search Report for EP Application No. 13810229.8, Report Completed Apr. 14, 2016, dated Apr. 21, 2016, 7 pgs.
Extended European Search Report for European Application No. 13830945.5, Search completed Jun. 28, 2016, dated Jul. 7, 2016, 14 Pgs.
Extended European Search Report for European Application No. 13841613.6, Search completed Jul. 18, 2016, dated Jul. 26, 2016, 8 Pgs.
Extended European Search Report for European Application No. 14763087.5, Search completed Dec. 7, 2016, dated Dec. 19, 2016, 9 Pgs.
Extended European Search Report for European Application No. 14860103.2, Search completed Feb. 23, 2017, dated Mar. 3, 2017, 7 Pgs.
Supplementary European Search Report for EP Application No. 13831768.0, Search completed May 18, 2016, dated May 30, 2016, 13 Pgs.
International Preliminary Report on Patentability for International Application No. PCT/US2013/059991, dated Mar. 17, 2015, dated Mar. 26, 2015, 8 pgs.
International Preliminary Report on Patentability for International Application No. PCT/US2013/062720, Report dated Mar. 31, 2015, dated Apr. 9, 2015, 8 Pgs.
International Preliminary Report on Patentability for International Application No. PCT/US2013/027146, Report dated Aug. 26, 2014, 10 pgs.
International Preliminary Report on Patentability for International Application No. PCT/US2013/046002, dated Dec. 31, 2014, dated Jan. 8, 2015, 6 Pgs.
International Preliminary Report on Patentability for International Application No. PCT/US2013/069932, dated May 19, 2015, dated May 28, 2015, 12 Pgs.
International Preliminary Report on Patentability for International Application No. PCT/US2014/017766, dated Aug. 25, 2015, dated Sep. 3, 2015, 8 Pgs.
International Preliminary Report on Patentability for International Application No. PCT/US2014/018084, dated Aug. 25, 2015, dated Sep. 3, 2015, 11 Pgs.
International Preliminary Report on Patentability for International Application No. PCT/US2014/018116, dated Sep. 15, 2015, dated Sep. 24, 2015, 12 Pgs.

(56) References Cited

OTHER PUBLICATIONS

International Preliminary Report on Patentability for International Application No. PCT/US2014/021439, dated Sep. 15, 2015, dated Sep. 24, 2015, 9 Pgs.
International Preliminary Report on Patentability for International Application No. PCT/US2014/022118, dated Sep. 8, 2015, dated Sep. 17, 2015, 4 pgs.
International Preliminary Report on Patentability for International Application No. PCT/US2014/022123, dated Sep. 8, 2015, dated Sep. 17, 2015, 4 Pgs.
International Preliminary Report on Patentability for International Application No. PCT/US2014/022774, dated Sep. 22, 2015, dated Oct. 1, 2015, 5 Pgs.
International Preliminary Report on Patentability for International Application No. PCT/US2014/023762, dated Mar. 2, 2015, dated Mar. 9, 2015, 10 Pgs.
"Exchangeable image file format for digital still cameras: Exif Version 2.2", Japan Electronics and Information Technology Industries Association, Prepared by Technical Standardization Committee on AV & IT Storage Systems and Equipment, JEITA CP-3451, Apr. 2002, Retrieved from: http://www.exif.org/EXIF2-2.PDF, 154 pgs.
Extended European Search Report for EP Application No. 11781313.9, Completed Oct. 1, 2013, dated Oct. 8, 2013, 6 pages.
Extended European Search Report for European Application No. 14865463.5, Search completed May 30, 2017, dated Jun. 8, 2017, 6 Pgs.
U.S. Appl. No. 61/527,007.
International Preliminary Report on Patentability for International Application No. PCT/US2011/064921, Report dated Jun. 18, 2013, dated Jun. 27, 2013, 14 pgs.
International Preliminary Report on Patentability for International Application No. PCT/US2012/056151, Report dated Mar. 25, 2014, 9 pgs.
International Preliminary Report on Patentability for International Application No. PCT/US2012/056166, Report dated Mar. 25, 2014, Report dated Apr. 3, 2014 8 pgs.
International Preliminary Report on Patentability for International Application No. PCT/US2012/058093, Report dated Sep. 18, 2013, dated Oct. 22, 2013, 40 pgs.
International Preliminary Report on Patentability for International Application PCT/US2010/057661, dated May 22, 2012, dated May 31, 2012, 10 pages.
International Preliminary Report on Patentability for International Application PCT/US2011/036349, Report dated Nov. 13, 2012, dated Nov. 22, 2012, 9 pages.
International Preliminary Report on Patentability for International Application PCT/US2014/029052, dated Sep. 15, 2015, dated Sep. 24, 2015, 9 Pgs.
International Search Report and Written Opinion for International Application No. PCT/US2012/056166, Report Completed Nov. 10, 2012, dated Nov. 20, 2012, 9 pgs.
International Search Report and Written Opinion for International Application PCT/US2014/029052, completed Jun. 30, 2014, dated Jul. 24, 2014, 10 Pgs.
Collins et al., "An Active Camera System for Acquiring Multi-View Video", IEEE 2002 International Conference on Image Processing, Date of Conference: Sep. 22-25, 2002, Rochester, NY, 4 pgs.
Holoeye Photonics AG, "LC 2012 Spatial Light Modulator (transmissive)", Sep. 18, 2013, retrieved from https://web.archive.org/web/20130918151716/http://holoeye.com/spatial-light-modulators/lc-2012-spatial-light-modulator/ on Oct. 20, 2017, 3 pages.
Holoeye Photonics AG, "Spatial Light Modulators", Sep. 18, 2013, retrieved from https://web.archive.org/web/20130918113140/http://holoeye.com/spatial-light-modulators/ on Oct. 13, 2017, 4 pages.
Jiang et al., "Panoramic 3D Reconstruction Using Rotational Stereo Camera with Simple Epipolar Constraints", 2006 IEEE Computer Society Conference on Computer Vision and Pattern Recognition (CVPR'06), vol. 1, Jun. 17-22, 2006, New York, NY, USA, pp. 371-378.
Joshi, Neel S., "Color Calibration for Arrays of Inexpensive Image Sensors", Master's with Distinction in Research Report, Stanford University, Department of Computer Science, Mar. 2004, 30 pgs.
Van Der Wal et al., "The Acadia Vision Processor", Proceedings Fifth IEEE International Workshop on Computer Architectures for Machine Perception, Sep. 13, 2000, Padova, Italy, pp. 31-40.
Extended European Search Report for European Application No. 15847754.7, Search completed Jan. 25, 2018, dated Feb. 9, 2018, 8 Pgs.
International Preliminary Report on Patentability for International Application PCT/US2015/053013, dated Apr. 4, 2017, dated Apr. 13, 2017, 9 Pgs.
International Search Report and Written Opinion for International Application No. PCT/US2015/053013, completed Dec. 1, 2015, dated Dec. 30, 2015, 9 Pgs.
Drulea et al., "Motion Estimation Using the Correlation Transform", IEEE Transactions on Image Processing, Aug. 2013, vol. 22, No. 8, pp. 3260-3270, first published May 14, 2013.

\* cited by examiner

SYSTEM AND METHODS FOR DEPTH REGULARIZATION AND SEMIAUTOMATIC INTERACTIVE MATTING USING RGB-D IMAGES

RELATED APPLICATION

This application claims priority to U.S. patent application Ser. No. 61/949,999 filed Mar. 7, 2014, which is incorporated by reference herein in its entirety.

FIELD OF INVENTION

The present invention relates image matting using depth information. In particular, the present invention relates to automatic generation of a trimap for image matting using a regularized depth map and/or interactive user input.

BACKGROUND

Image matting is the process of extracting an object of interest (e.g., a foreground object) from its background an important task in image and video editing. Image matting may be used for a variety of different purposes, such as to extract an object for placement with a different background image. Current techniques exist that may be used to determine which pixels belong to the foreground object and which pixels are part of the background. In particular, many current approaches generally estimate foreground and background colors based on color values of nearby pixels, where they are known, or perform iterative nonlinear estimation by alternating foreground and background color estimation with alpha estimation. Conventional matting operations, however, could result in errors in describing certain portions of images that are more difficult to identify as belonging to the background or foreground of the image.

SUMMARY OF THE INVENTION

Systems and methods in accordance with embodiments of this invention perform depth regularization and semiautomatic interactive matting using images. In an embodiment of the invention, an image matting system includes at least one processor for executing sets of instructions, memory containing an image processing pipeline application. In an embodiment of the invention, the image processing pipeline application directs the processor to receive (i) an image comprising a plurality of pixel color values for pixels in the image and (ii) an initial depth map corresponding to the depths of the pixels within the image; regularize the initial depth map into a dense depth map using depth values of known pixels to compute depth values of unknown pixels; determine an object of interest to be extracted from the image; generate an initial trimap using the dense depth map and the object of interest to be extracted from the image; and apply color image matting to unknown regions of the initial trimap to generate a matte for image matting.

In another embodiment of the invention, the image matting system further includes: a camera that captures images of a scene; and a display on the camera for providing a preview of the scene.

In yet another embodiment of the invention, the image processing application further directs the processor to: detect an insufficient separation between the object of interest and remaining portions of the scene being captured; and provide a notification within the display of the camera to capture a new image at a suggested setting.

In still yet another embodiment of the invention, the image processing application further directs the processor to: capture a candidate image using the camera; display the candidate image on the display of the camera; receive a selection of the portion of the image for image matting through a user interface of the camera, where generating the initial trimap includes using the selected portion of the image to determine foreground and background pixels of the image in the initial trimap.

In a still further embodiment of the invention, regularizing the initial depth map into a dense depth map includes performing Laplacian matting to compute a Laplacian L.

In still a further embodiment of the invention, the image processing application directs the processor to prune the Laplacian L.

In another embodiment of the invention, pruning the Laplacian L includes: for each pair i,j of pixels in affinity matrix A, determine if i and j have depth differences beyond a threshold; and if the difference is beyond the threshold, purge the pair i,j within the affinity matrix A.

In still another embodiment of the invention, the image processing application further directs the processor to detect and correct depth bleeding across edges by computing a Laplacian residual R and removing incorrect depth values based on the Laplacian residual R.

In another embodiment of the invention, the image processing application computes the Laplacian residual R by computing R=Lz* where z* is the regularized depth map, where removing incorrect depth values includes identifying regions where R>0.

In a further embodiment of the invention, the image is defined according to a red, green, blue (RGB) color model.

In still another embodiment, the camera is at least one select from the group consisting of an array camera, a light-field camera, a time-of-flight depth camera, and a camera equipped with a depth sensor.

In a yet further embodiment, the image processing application further directs the processor to determine the object of interest to be extracted from the image using at least one selected from the group consisting of: face recognition and object recognition to automatically identify the object of interest in the image.

In another embodiment again, the image processing application further directs the processor to: receive a user touch input on the display of the camera indicating at least one selected from the group consisting: an object of interest, foreground region of the image, and background region of the image.

In another embodiment yet again, the image processing application further directs the processor to place the object of interest on a new background as a composite image.

In a still further embodiment, the initial depth map is received from a device used to capture the image, where the device is at least one selected from the group consisting of: a camera, an array camera, a depth sensor, a time-of-flight camera, and a light-field camera.

An embodiment of the invention includes an array camera, including: a plurality of cameras that capture images of a scene from different viewpoints; memory containing an image processing pipeline application; where the image processing pipeline application direct the processor to: receive (i) an image comprising a plurality of pixel color values for pixels in the image and (ii) an initial depth map corresponding to the depths of the pixels within the image; regularize the initial depth map into a dense depth map using depth values of known pixels to compute depth values of unknown pixels; determine an object of interest to be extracted from the image; generate an initial trimap using the dense depth map and the object of interest to be extracted from the image; and apply color image matting to unknown regions of the initial trimap to generate a matte for image matting.

In a further embodiment, the image processing pipeline application further directs the processor to: capture a set of images using a group of cameras and determine the initial depth map using the set of images.

In yet a further embodiment of the invention, the image processing pipeline application regularizes the initial depth map into a dense depth map by performing Laplacian matting to compute a Laplacian L.

In yet another embodiment of the invention, the image processing application further directs the processor to prune the Laplacian L, wherein pruning the Laplacian L includes for each pair i,j of pixels in affinity matrix A, determine if i and j have depth differences beyond a threshold; and if the difference is beyond the threshold, purge the pair i,j within the affinity matrix A.

In still a further embodiment of the invention, the image processing application further directs the processor to detect and correct depth bleeding across edges by computing a Laplacian residual R and removing incorrect depth values based on the Laplacian residual R.

DETAILED DESCRIPTION

Figure 1A:
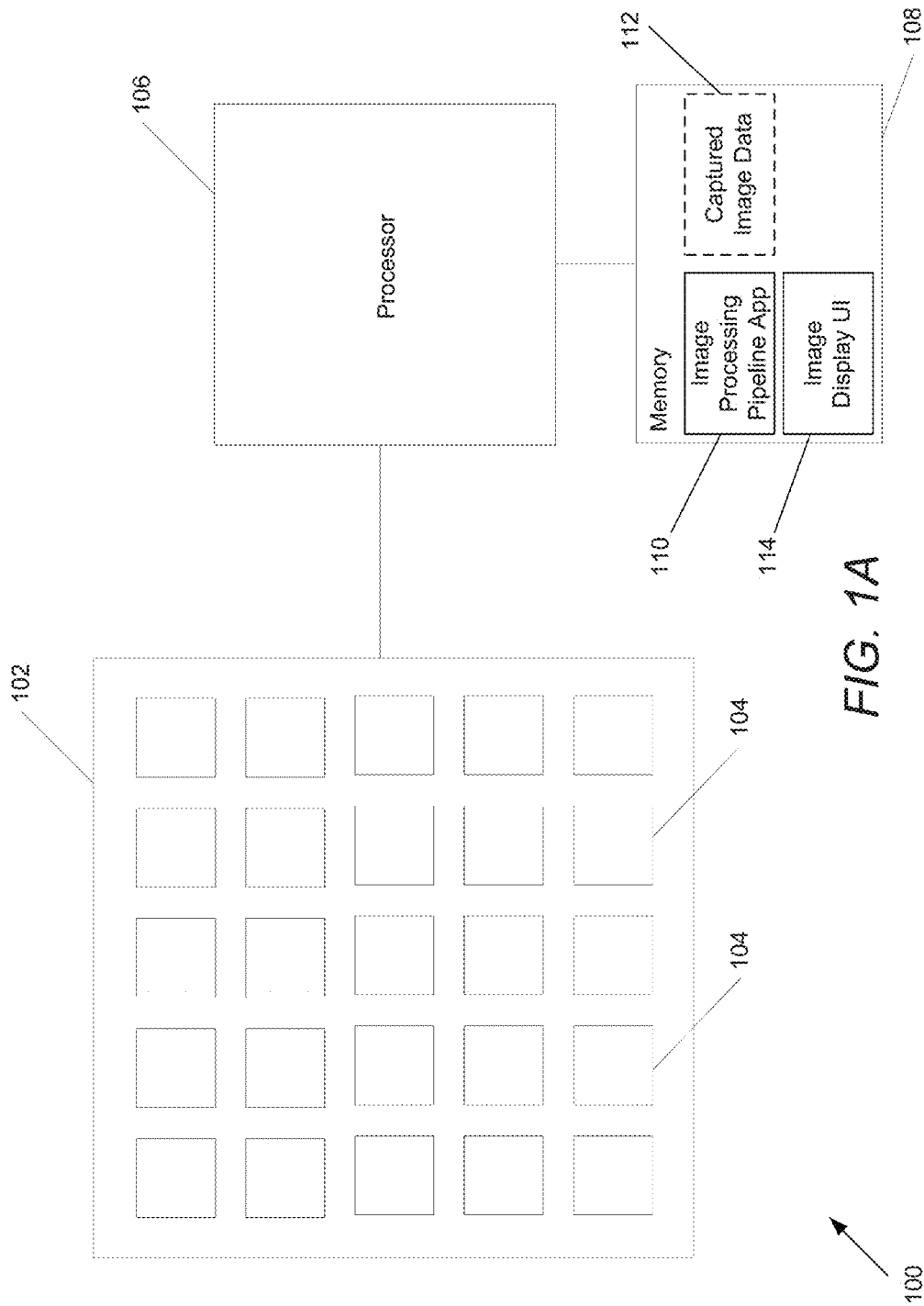
FIG. 1A conceptually illustrates an array camera in accordance with an embodiment of the invention.

Turning now to the drawings, systems and methods for depth regularization and semiautomatic interactive matting using depth information in images in accordance with embodiments of the invention are illustrated. In some embodiments, a camera may be used to capture images for use in image matting. In several embodiments, the camera may also provide information regarding depth to objects within a scene captured by an image that may be used in image matting. In many embodiments, the depth information may be captured using any one of array cameras, time-of-flight depth cameras, light-field cameras, and/or cameras that include depth sensors, among various other types of devices capable of capturing images and/or providing depth information. In several embodiments, the depth information may be obtained through various other methods, such as using a camera that captures multiple images and computing depth information from motion, multiple images captured with different focal lengths and computing depth from defocus, among various other methods for obtaining depth information.

In a number of embodiments, in image matting, the depth information may be used to generate a trimap for use in image matting. In particular, in several embodiments, the trimap may be generated based on the depth of the pixels of the foreground relative to the depth of the pixels in the background. The discussion below may use the term "foreground object" to indicate an object of interest that is to be extracted from an image through image matting, however, this object does not necessarily have to be positioned as the foremost object in the foreground of the image, but may be located at any variety of different depths within the image. However, typically users generally are interested in extracting the foreground object(s) (e.g., faces, people, among other items) appearing in an image during image matting and for purposes of this discussion, the term foreground object may be used to specify the particular object of interest that is to be extracted with image matting.

In certain embodiments, a user may provide an indication of the object of interest (i.e., foreground object) to be extracted from an image through various types of user input and/or interaction with the device. In many embodiments, the user input may be a single stroke indicating an object of interest, a foreground and/or background of the image. In various embodiments, the image matting system may use face recognition and/or object recognition to avoid user input entirely during the image matting process.

In some embodiments, the camera may capture a candidate image and provide a preview display of the candidate image to a user and the user may then provide user input that indicates an object of interest that is to be extracted from the candidate image through image matting. In several embodiments, an image-matting system can be utilized to determine whether the indicated object of interest within the candidate image can be readily extracted from the captured candidate image or if the user should modify certain aspects of the scene being captured and/or camera settings to provide for a better candidate image for use in the matting of the indicated object of interest. In particular, in some embodiments, the camera may provide a notification to adjust the separation between the camera, foreground object of interest, and/or background relative to one another in order to provide the user with the ability to capture a better candidate image and/or depth information for use in image matting of the indicated object of interest.

As described above, the preview display of the camera in some embodiments may display a notification to the user to adjust certain properties of the camera and/or scene being captured. For example, the display may provide a notification to the user to increase the distance (i.e., separation) between the object of interest and the background, to decrease the distance between the camera lens and the object of interest (e.g., move the camera towards the object of interest or move the object closer to the camera), and/or to increase the distance both between the background, object of interest, and camera lens. In some embodiments, the particular recommendation provided within the notification may vary based on the characteristics of the candidate image and/or scene settings.

In some embodiments, the image matting system may also use the user input identifying the object of interest, foreground, and/or background of the image during various stages of the image matting process, including during the generation of the trimap from the user input.

As described above, in many embodiments, the camera may capture color images (e.g., RGB images) that also provide depth information of the scene being captured. In certain embodiments, the initial depth information is provided as an initial sparse depth map. In particular, the initial sparse depth map may not have depth values for all pixels within the captured image, or may have depth values that are below a certain confidence value regarding the accuracy of the depth, for a certain portion of the pixels within the image.

In order to be able to use the initial sparse depth map for image matting, the sparse depth map can be regularized into a dense depth map. In a number of embodiments, the dense depth map is created using an affine combination of depths at nearby pixels to compute depths for unknown and/or ambiguous pixel depths. In several embodiments, the image matting system uses dense depth regularization and matting within a unified Laplacian framework. In certain embodiments, the image matting system may also use the Laplacian residual to correct input depth errors. In particular, the resulting dense depth map may be fairly accurate in most regions, but may not be as precise at boundaries as image pixel values. Therefore, some embodiments utilize depth discontinuities in RGB-D images to automate creation of a thin uncertain region in a trimap. In these embodiments, the user may mark as little as a single foreground and/or background stroke to provide an indication of the object of interest to be extracted with image matting. In some embodiments, the image matting system may also use occlusion and visibility information to automatically create an initial trimap.

In some embodiments, the image matting system uses the dense depth map for trimap generation for use in image matting. In particular, based on an identified object of interest, in some embodiments, the image matting system generates an initial trimap with thin uncertain regions by doing a segmentation based on depth into parts of the image closer to the foreground or background depth.

Upon generating the initial trimap using the dense depth map, the image matting system can apply conventional color matting (e.g. conventional Laplacian color matting) based on the color image to the initial thin tripmap to extract the object of interest, using an optimization to the conventional color matting that solves a reduced linear system for alpha values in only the uncertain regions of the trimap. In particular, the image matting system may use an efficient color matting algorithm that utilizes a reduced linear system to compute alpha values only at unknown pixels and to generate the matte to use for image matting, achieving speedups of one to two orders of magnitude. This also lends itself to incremental computation, enabling interactive changes to the initial automatically-generated trimap, with real-time updates of the matte. In some embodiments, the image matting system may use the matte to extract the object of interest and subsequently overlay the object of interest and/or composite it with other images including (but not limited to) background images.

Image matting using depth information from images, dense depth map regularization, and optimizations to conventional color matting processes in accordance with embodiments of the invention are described below.

Array Cameras

As described above, an array camera may be used to capture color images that include depth information for use in image matting. Array cameras in accordance with many embodiments of the invention can include an array camera module including an array of cameras and a processor configured to read out and process image data from the camera module to synthesize images. An array camera in accordance with an embodiment of the invention is illustrated in FIG. 1A. The array camera 100 includes an array camera module 102 with an array of individual cameras 104, where an array of individual cameras refers to a plurality of cameras in a particular arrangement, such as (but not limited to) the square arrangement utilized in the illustrated embodiment. In other embodiments, any of a variety of grid or non-grid arrangements of cameras can be utilized. Various array camera configurations including monolithic and monolithic arrays incorporating various different types of cameras are disclosed in U.S. Patent Publication No. 2011/0069189 entitled "Capturing and Processing of Images Using Monolithic Camera Array with Heterogeneous Imagers" to Venkataraman et al., the relevant disclosure with respect to different array camera configurations including (but not limited to) the disclosure with respect to arrays of arrays is hereby incorporated by reference herein in its entirety. The array camera module 102 is connected to the processor 106. The processor is also configured to communicate with one or more different types of memory 108 that can be utilized to store an image processing pipeline application 110, image data 112 captured by the array camera module 102, image matting application 108, and an image display UI 114. The image processing pipeline application 110 is typically non-transitory machine readable instructions utilized to direct the processor to perform processes including (but not limited to) the various processes described below. In several embodiments, the processes include coordinating the staggered capture of image data by groups of cameras within the array camera module 102, the estimation of depth information from the captured image data 112 and image matting of the captured images using the captured image data, include the captured depth information. The image display UI 114 receives user inputs on a display of the array camera regarding portions of a captured image to be extracted during image matting and displays the captured images on a display of the device. In some embodiments, the image display UI 114 may continuously receive user inputs for portions of a captured image to be extracted during image matting and provide these inputs to the image processing pipeline application 110. In some embodiments, the image processing pipeline application 110 may determine whether a captured image is optimal for image matting and based on this determination, provides a notification, via the image display UI 114, providing a suggestion for capturing an image to use for image matting.

Processors 108 in accordance with many embodiments of the invention can be implemented using a microprocessor, a coprocessor, an application specific integrated circuit and/or an appropriately configured field programmable gate array that is directed using appropriate software to take the image data captured by the cameras within the array camera module 102 and apply image matting to captured images in order to extract one or more objects of interest from the captured images.

In several embodiments, a captured image is rendered from a reference viewpoint, typically that of a reference camera 104 within the array camera module 102. In many embodiments, the processor is able to synthesize the captured image from one or more virtual viewpoints, which do not correspond to the viewpoints of any of the focal planes 104 in the array camera module 102. Unless all of the objects within a captured scene are a significant distance from the array camera, the images of the scene captured within the image data will include disparity due to the different fields of view of the cameras used to capture the images. Processes for detecting and correcting for disparity are discussed further below. Although specific array camera architectures are discussed above with reference to FIG. 1A, alternative architectures can also be utilized in accordance with embodiments of the invention.

Array camera modules that can be utilized in array cameras in accordance with embodiments of the invention are disclosed in U.S. Patent Publication 2011/0069189 entitled "Capturing and Processing of Images Using Monolithic Camera Array with Heterogeneous Imagers", to Venkataraman et al. and U.S. patent application Ser. No. 14/536,537 entitled "Methods of Manufacturing Array Camera Modules Incorporating Independently Aligned Lens Stacks," to Rodda et al., which are hereby incorporated by reference in their entirety. Array cameras that include an array camera module augmented with a separate camera that can be utilized in accordance with embodiments of the invention are disclosed in U.S. patent application Ser. No. 14/593,369 entitled "Array Cameras Including An Array Camera Module Augmented With A Separate Camera," to Venkataraman et al., and is herein incorporated by reference in its entirety. The use of image depth information for image matting in accordance with embodiments of the invention is discussed further below.

Guided Image Capture for Image Matting

Figure 1B:
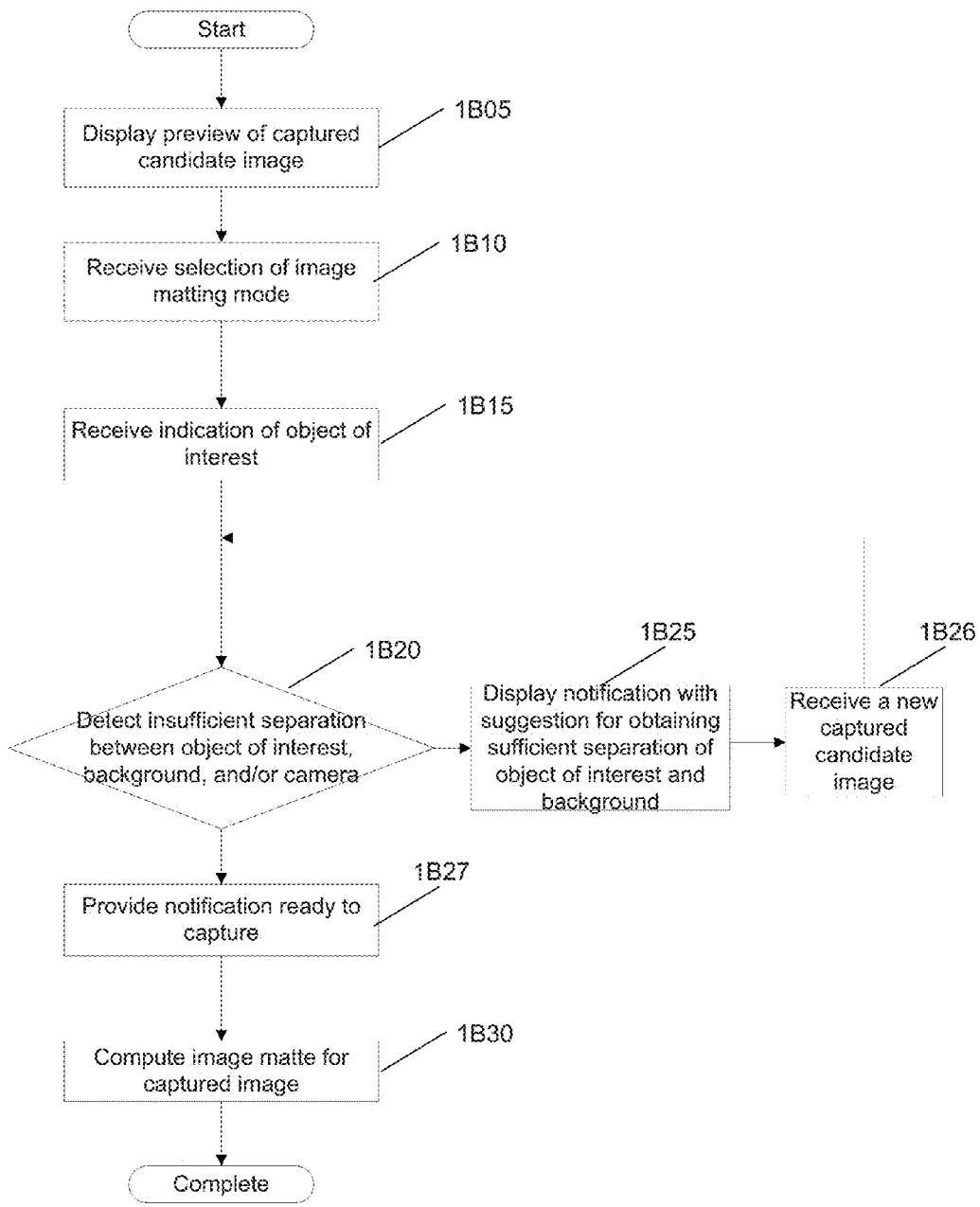
FIG. 1B illustrates a process for interactive guided image capture for image matting in accordance with embodiments of the invention.

In some embodiments, the image matting system guides a user to allow the user to capture a better quality image for image matting. In particular, a camera display can provide a notification to a user to adjust camera settings and/or physical composition of the imaged scene for better image matting results. For example, the camera may display real-time notifications to the user to move the object of interest closer to the camera lens, move the object of interest further away from the background, among various other possible notifications that would allow an image to be captured that is optimized for image matting. A process for guided image capture for image matting in accordance with an embodiment of the invention is illustrated in FIG. 1B.

The process displays 1B05 a preview of a captured candidate image. In some embodiments, the image may be captured by a camera, such as an array camera, time-of-flight camera, light-field camera, among various other types of cameras. In some embodiments, the image being previewed may be captured from a camera while the depth information may be provided by a depth sensor, such as a secondary depth camera.

In some embodiments, the process displays a preview of an image (and the user does not necessarily need to provide a command to capture the image), for example, through a real-time display of the image that is being imaged by the lens of the camera device.

The process may, optionally, receive 1B10 a selection of an image matting mode. For example, a user may select the image matting mode on the camera. The image matting mode may be used to extract an object of interest from the candidate image.

The process receives 1B15 an indication of an object of interest that is to be extracted from the candidate image and/or image being previewed within the display. The selection may be received from a user input identifying the object of interest (e.g., a foreground object), such as a user stroke over the object of interest, a user touch of the display, among various other mechanisms. In some embodiments, the object of interest may be automatically identified using one or more different object recognition processes. In particular, some embodiments may use face recognition processes to automatically identify the object(s) of interest.

The process determines (at 1B20) whether it detects an insufficient separation between the object of interest, foreground, background, and/or the camera. If the process determines (at 1B20) that it does not detect an insufficient separation, the process may provide (at 1B27) a notification that it is ready to capture the image (upon which the user may trigger the capturing of an image) and the process may compute (1B30) the image matte for the captured image.

In some embodiments, in order to determine whether a candidate image provides a sufficient separation, the process estimates depths of pixels in the candidate image scene and determines whether the depths of the object of interest are within a threshold of the depths of the foreground and/or background remaining scene. In some embodiments, the process regularized the sparse depth map into a dense depth map. Techniques for depth regularization are described in detail below.

Based on the dense depth map, in several embodiments, the process computes a histogram and analyzes the distribution of pixels to determine the existence of a prominent foreground object (or object of interest) and a distribution of one or more background depths. In some embodiments, the process uses an automated threshold to separate the foreground object of interest from the background. As described above, when the object of interest is not necessarily the foremost object within the image, some embodiments may use a second threshold to exclude the foreground from the object of interest as well. In several embodiments, once a satisfactory separation of the distribution/histogram of the object of interest is obtained from the distribution/histogram of depths for the rest of the scene, the process determines that the scene satisfies criteria optimal for image matting.

If the process determines (at 1B20) that it detects an insufficient separation between the object of interest, foreground, background, and/or camera, the process displays (at 1B25) a notification with a suggestion for obtaining a sufficient separation between the object of interest, foreground, background, and/or camera that is optimized for image matting.

The process then receives a new captured candidate image, and the initial sparse depth map for the image, for image matting and returns to 1B20 to determine whether the new candidate image is of a sufficient quality for image matting. This process can iterate until a candidate image with sufficient quality is captured.

The process then completes. Although specific processes are described above with respect to FIG. 1B with respect to guided image capture for image matting, any of a variety of processes can be utilized to provide physical (e.g., vibrations), audio and/or visual guides via a user interface to direct image capture for improved image matting quality as appropriate to the requirements of specific applications in accordance with embodiments of the invention. Several examples of guided image capture will now be described.

Figure 1C:
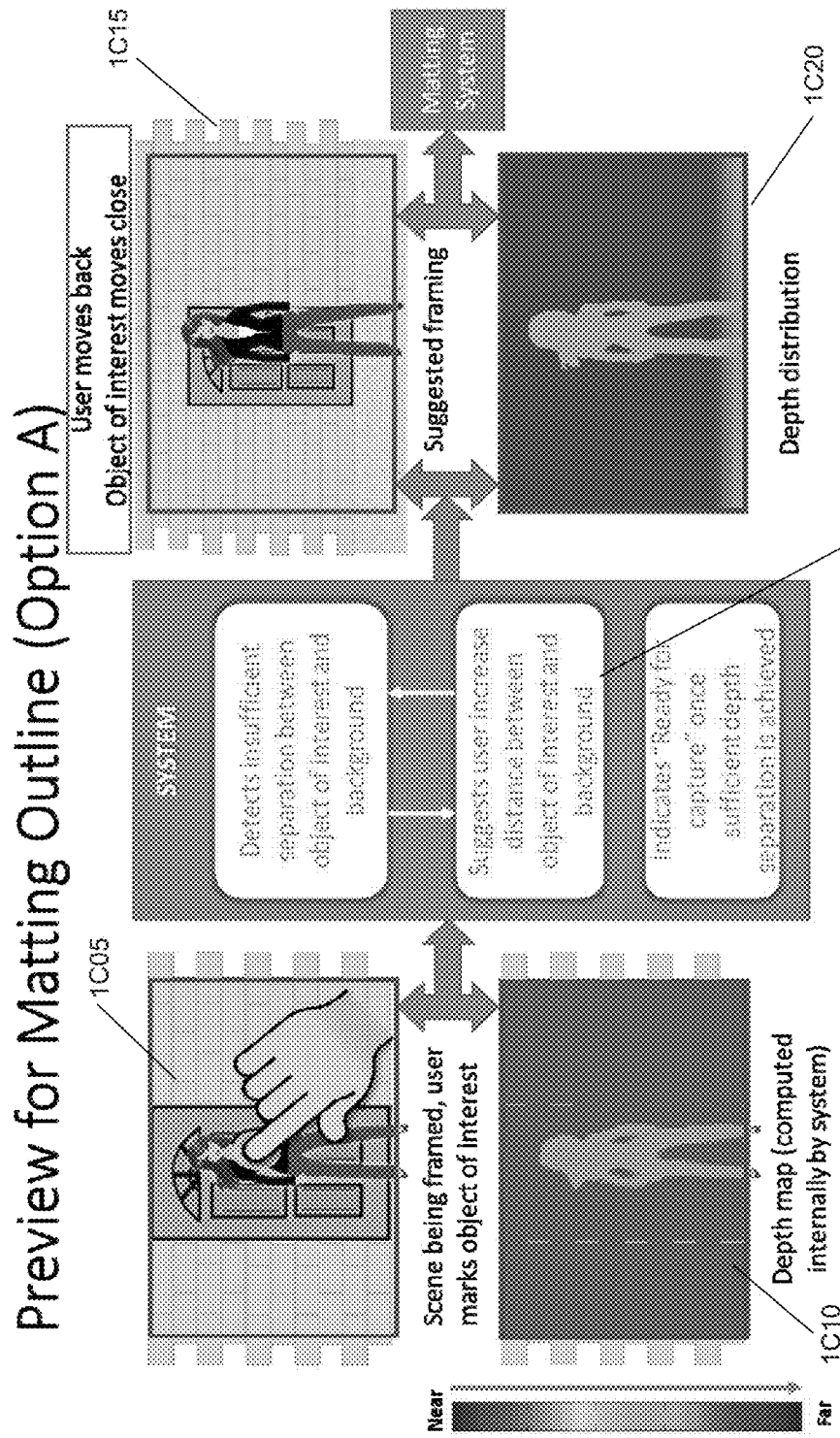
FIGS. 1C-1E conceptually illustrate examples of notifications provided to a user based on a captured candidate image in accordance with an embodiment of the invention.
Figure 1D:
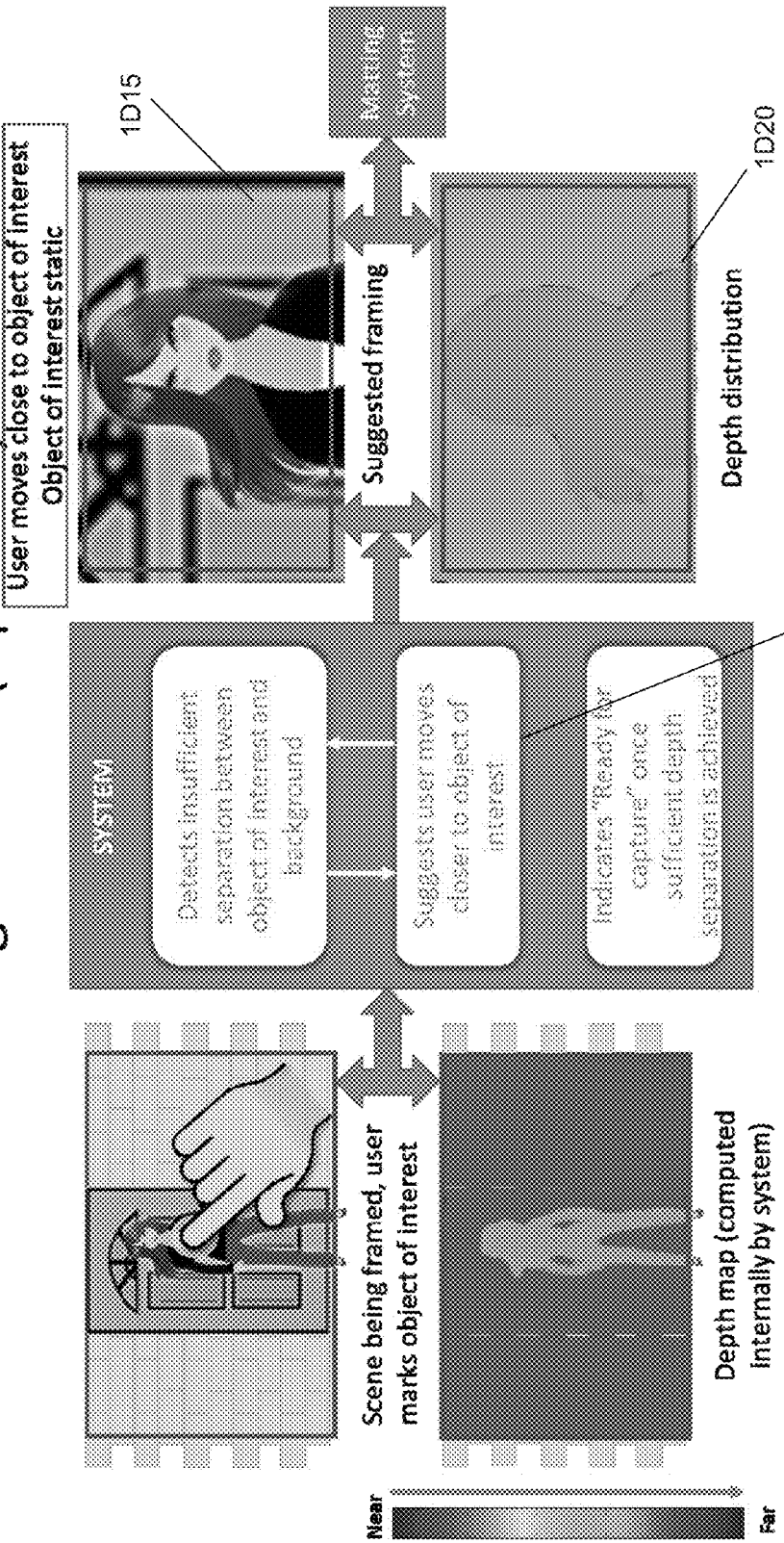
Figure 1E:
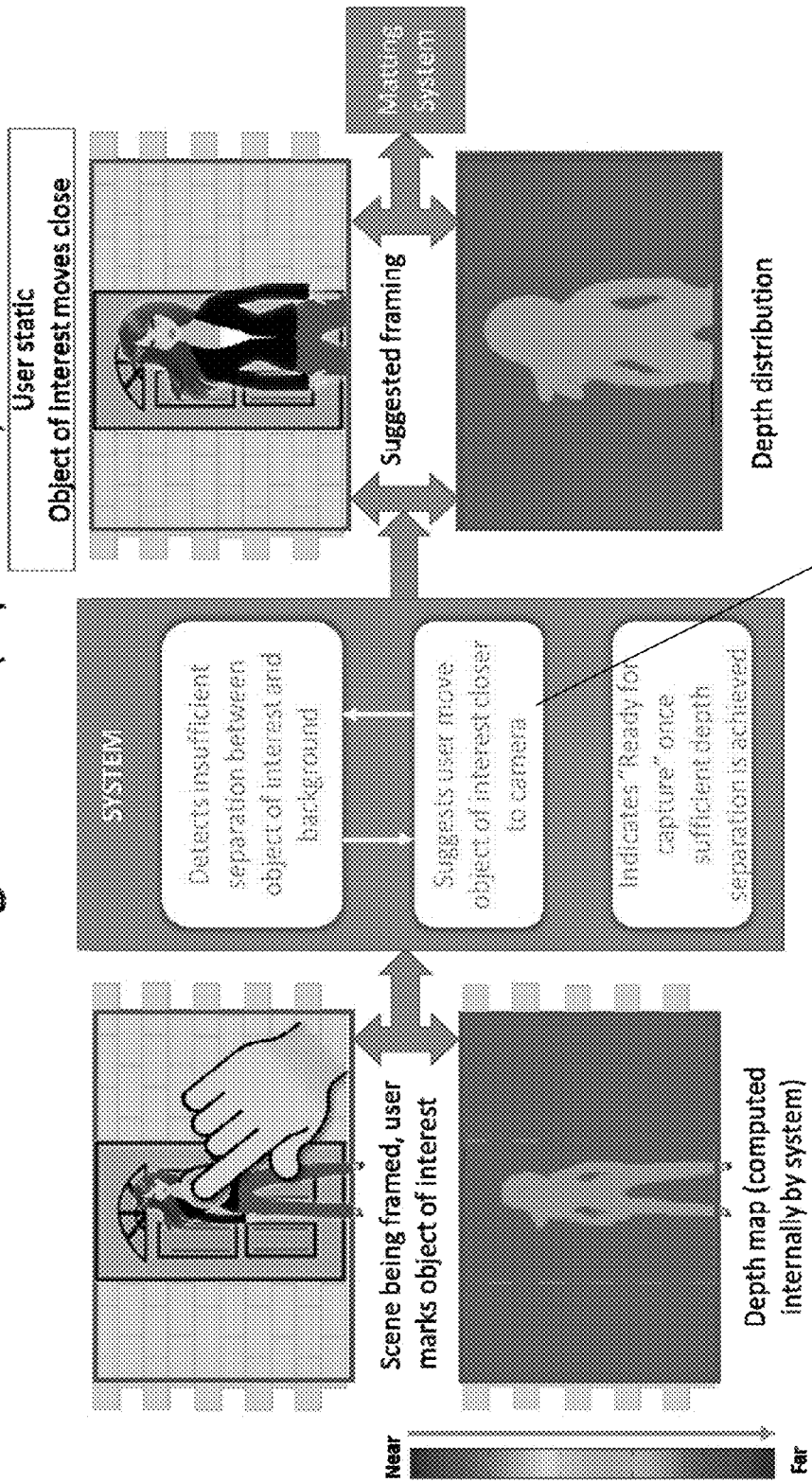

FIGS. 1C-1E illustrate several examples of various different notifications that may be provided to a user via a camera user interface based on a detection of an insufficient separation between a foreground object for image matting. In particular, FIG. 1C illustrates a candidate captured image 1C05 for image matting. In the candidate captured image 1C05, the user is selecting an object of interest of a person standing in front of a door. The image matting system computes a depth map 1C10 for the captured image. As illustrated in the depth map 1C10, the color coding for the depth of the person is a light shade of blue and that of the background is a slightly darker shade of blue, which, according to the depth key, indicate that there is relatively small depth separation between the object of interest and background.

Likewise the image matting system has detected an insufficient separation between the object of interest (i.e., the person) and the background (i.e., the door and wall), and thus provides a notification 1C25 with a suggestion that the user increase the distance between the object of interest (i.e., person) and the background. In this example, the user (i.e., camera) move back and the object of interest (i.e., person) move closer to the camera, increasing the separation between the foreground person and the background wall/door.

In some embodiments, the image matting system provides an indication of "ready for capture" once it detects a sufficient depth separation between the foreground and background. As illustrated in this example, the depth map 1C20 now illustrates a greater depth distribution between the foreground object of interest and background, with the foreground person in bright green and the background wall/door in dark blue indicating a greater depth separation as compared to the depth map 1C10.

Another example of a preview for image matting in accordance with an embodiment of the invention is illustrated in FIG. 1D. Like the example illustrated in FIG. 1C, the image matting system has detected an insufficient separation between the foreground object of interest (i.e., person) and the background (i.e., wall/door). In this example, the image matting system suggests 1D25 that the user (i.e., camera) move closer to the object of interest and that the object of interest remain static. As illustrated by the new captured image 1D15 and the new depth map 1D20, there is an increase depth distribution between the foreground object of interest (illustrated as orange in the depth map) and the background (illustrated as bright green in the depth map).

Yet another example of a preview for image matting in accordance with an embodiment of the invention is illustrated in FIG. 1E. In this example, the notification 1E25 suggests that the user remain static and the object of interest (i.e., person) move closer to the user (i.e., camera). This allows for a sufficient depth separation for image matting.

Although FIGS. 1C-1E illustrate several examples of preview for image matting, many different preview matting and/or notifications may be implemented as appropriate to the requirements of specific applications and/or scene content in accordance with embodiments of the invention. The use of depth regularization for image matting in accordance with embodiments of the invention is described further below.

Introduction to Image Matting with RGB-D Images

As described above, recent developments have made it easier to acquire RGB-D images with scene depth information D in addition to pixel RGB color. Examples of devices that may capture depth information include time-of-flight depth cameras, camera arrays, depth from light-field cameras and depth from sensors (e.g., Kinect). These developments provide for new opportunities for computer vision applications that utilize RGB-D images. However, the initial sparse depth is typically coarse and may only be available in sparse locations such as image and texture edges for stereo-based methods. Thus, in order to allow for image matting using the depth information, in some embodiments, the initial sparse depth may be regularized into a dense depth map. During the depth map regularization, some embodiments detect and correct depth bleeding across edges.

Accordingly, many embodiments provide for depth regularization and semi-automatic interactive alpha-matting of RGB-D images. In several embodiments, a compact form-factor camera array with multi-view stereo is utilized for depth acquisition. Certain embodiments may use high quality color images captured via an additional camera(s) that are registered with the depth map to create an RGB-D image. Although RGB-D images captured using array cameras are described above, image matting using image depth information provided by many different types of depth sensors may be used as appropriate to the requirements of specific application in accordance with embodiments of the invention.

As described above, many embodiments of the image matting system leverage a Laplacian-based matting framework, with the recent K Nearest Neighbors ("kNN") matting approach disclosed in Chen et al. "Knn Matting", IEEE Conference on Computer Vision and Pattern Recognition (CVPR), pp. 869-876, (2012), ("the Chen et al. 2012 paper") the relevant disclosure from which is incorporated by reference herein in its entirety, to build the Laplacian in order to regularize the initial sparse depth map into a dense depth map for image matting. Some embodiments enable semi-automatic interactive matting with RGB-D images by making the following contributions described in more detail below: (1) dense depth regularization and matting within a unified Laplacian framework, and also use of the Laplacian residual to correct input depth errors; (2) the use of the dense depth segmentation for automatic detailed trimap generation from very sparse user input (a single stroke for foreground and/or background); (3) the use of face detectors to avoid user input entirely of some embodiments; and (4) efficient interactive color matting by incrementally solving a reduced linear system.

Figure 1F:
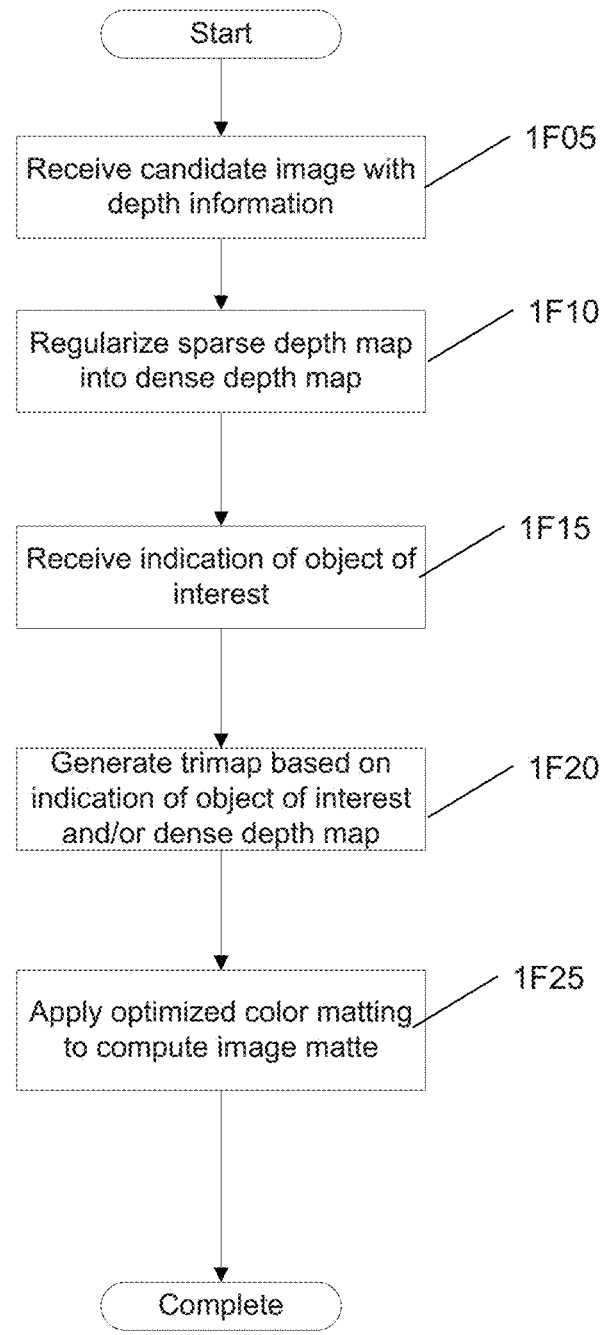
FIG. 1F illustrates a process for depth regularization and semiautomatic interactive matting in accordance with an embodiment of the invention.

A process for depth regularization and semiautomatic interactive matting using color and/or depth information of images for image matting in accordance with an embodiment of the invention is illustrated in FIG. 1F.

The process receives (at 1F05) a candidate image that includes depth information. In some embodiments the image is an RGB-D (i.e., a red, green, blue image with an initial sparse depth map) image. In other embodiments, the image may be defined according to a different color model.

The process regularizes (at 1F10) the initial sparse depth map into a dense depth map. As described in detail below, the regularization process of some embodiments may include using Laplacian framework to compute depth values and using the Laplacian residual to correct input depth bleeding across image edges.

The process receives (at 1F15) an indication of an object of interest to be extracted by the image matting system. In some embodiments, the indication of an object of interest may be received from a user input identifying the object of interest, foreground, and/or background portions of the image. In some embodiments, the process may receive a single user stroke of foreground and the process may automatically identify the foreground and/or background layers based on the stroke. In certain embodiments, the user input may be a single stroke on the foreground and a single stroke on the background for image matting. In certain embodiments, object recognition processes, such as (but not limited to) face recognition, may be used to automatically identify an object of interest.

The process can generate (at 1F20) a trimap with a thin uncertain zone based on the indicated foreground object of interest and/or the dense depth map. In particular, in some embodiments, the process computes the average depth of the regions under the indicated foreground and/or background and segments based on depth into parts closer to the foreground depth and/or background depth. The process then automatically generates the thin trimap by dilating the boundary between foreground and background for the unknown regions. In some embodiments, the process may continue to receive user inputs (e.g., user strokes) indicative of foreground and/or background regions of the image, and the process may continue to refine the initial trimap. This may occur when the process omits parts of the object of interest (e.g., foreground object) and the user may provide more hints as to the foreground object of interest.

The process can apply (at 1F25) optimized color matting to compute the image matte. As will be described in detail below, in some embodiments, the process may apply a conventional kNN-based (K nearest-neighbor) Laplacian color matting based on the color values of the image, with the Laplacian matting optimized to solve for alpha values in only the unknown regions of the trimap. In the illustrated embodiment, the process then completes.

Although specific processes are described above with respect to FIG. 1F with respect to depth regularization and semiautomatic interactive image matting using color and depth information for an image, any of a variety of processes can be utilized for depth regularization as appropriate to the requirements of specific applications in accordance with embodiments of the invention.

Figure 1G:
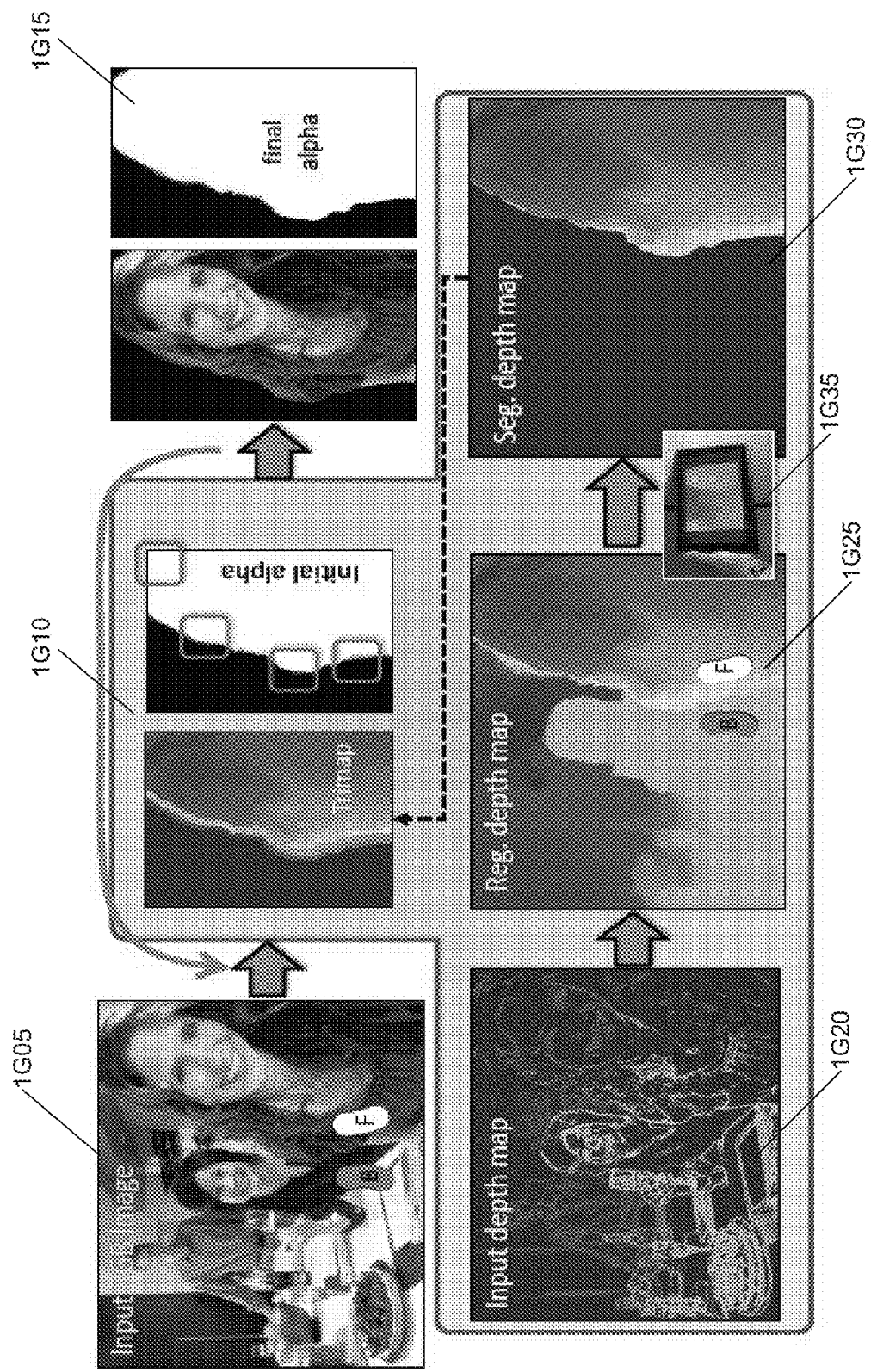
FIG. 1G conceptually illustrates an overall pipeline for semi-automatic interactive image matting in accordance with an embodiment of the invention.

An example of the image matting pipeline for semi-automatic interactive RGB-D matting in accordance with an embodiment of the invention is illustrated in FIG. 1G. As illustrated, given an input image 1G05 with a single user stroke or blob to identify foreground (F) and background (B), the image matting system produces an alpha matte 1G15. The image matting system can automatically create a thin trimap 1G10 that can also be interactively modified (e.g., to correct it slightly near the arm and shoulder, marked by squares). The bottom row shows the input depth map 1G20 and the regularized dense depth map 1G25 that can be utilized to perform depth-based segmentation 1G30, that can be dilated to create the trimap 1G10. In some embodiments, the RGB-D image may be captured on a tablet equipped with a miniature array camera 1G35. In other embodiments, any of a variety of camera architectures including (but not limited to) an array incorporating a sub-array dedicated to depth sensing and a separate camera(s) dedicated to capturing texture (e.g. RGB) data and/or an active depth sensor can be utilized as appropriate to the requirements of specific applications.

In some embodiments of the image matting system, essentially the same machinery as Laplacian-matting may be used for depth regularization. This enables an efficient unified framework for depth computation and matting. Some embodiments also provide a novel approach of using the Laplacian residual to correct input depth bleeding across image edges. In many embodiments, the dense depth may also be used for other tasks, such as image-based rendering.

In several embodiments, the image matting system may receive a single stroke on the foreground and/or background to identify the foreground object that is to be extracted during image matting. During image matting, the image matting system can compute the average depth of the regions under one or both strokes (i.e. foreground and background), and the image matting system may do a quick segmentation based on depth, into parts closer to the foreground or background depth. In some embodiments, the image matting system can automatically create a thin trimap for image matting, by dilating the boundary between foreground and background for the unknown regions. Thereafter, the image matting system may apply a kNN-based Laplacian color matting in the conventional way, but with certain optimizations described in detail below, based on the color image only (since colors typically have greater precision at object boundaries in the image than the regularized depth).

Some embodiments of the image matting system provide an optimization to conventional Laplacian color matting that makes it one to two orders of magnitude more efficient without any loss in quality. In particular, in some embodiments, instead of solving for alpha values over the entire image and treating the user-provided trimap as a soft constraint with high weight, the image matting system solves a reduced linear system for alpha values only in the unknown regions and no constraint weight is needed. Moreover, by starting the linear solver at the previous solution, the image matting system may incrementally update a matte efficiently. Thus, the user can interactively modify or correct the automatic trimap with real-time feedback.

Related Work—Alpha Matting

Laplacian matting is a popular framework. Methods like local and non-local smooth priors ("LNSP") matting build on this, achieving somewhat higher performance on the Alpha Matting benchmark by combining nonlocal and local priors. A few matting systems are interactive, but typically must make compromises in quality. Other methods are specialized to inputs from array cameras but do not apply to general RGB-D images, or demonstrate quality comparable to state of the art color matting.

Accordingly, image matting systems in accordance with many embodiments of the invention can provide for making semi-automatic and interactive, Laplacian matting methods on RGB-D images and also enable depth regularization in a unified framework.

Background of Affinity Based Matting

Described below is a brief review of Affinity-Matrix based matting. These methods typically involve construction of a Laplacian matrix. Some embodiments use this approach for its simplicity and high-quality. However, processes in accordance with several embodiments of the invention perform certain optimizations, and use the framework as the basic building block for both depth regularization and matting.

In convention matting, a color image is assumed to be generated as $I=\alpha F+(1-\alpha)B$, where I is the image, $\alpha$ is the matte, between 0 and 1, and F and B are the foreground and background layers. $\alpha$ is a number, while I, F and B are RGB intensity values (or intensity values in another appropriate color space).

The Laplacian L=D−A, where A is the affinity matrix (methods to construct A are discussed at the end of the section). D is a diagonal matrix, usually set to the row sum of A. The idea is that alpha at a pixel is an affine combination of close-by alpha values, guided by A. Some embodiments define x as a large (size of image) vector of alpha or matte values (between 0 and 1). Ideally, some embodiments provide that:

$$x_i = \frac{\sum_j A_{ij} x_j}{\sum_j A_{ij}} \Rightarrow D_{ii} x_i = \sum_j A_{ij} x_j \quad (1)$$

where the diagonal matrix D is the row sum, such that $D_{ii}=\Sigma_j A_{ij}$.

Succinctly, $$Lx \approx 0 \quad (2)$$

Since L=D−A and D is a diagonal matrix. However, solving this equation without any additional constraints is largely meaningless; for example $x=x_0$ for any constant $x_0$ is a solution. Therefore, Laplacian-matting systems solve:

$$x = \operatorname{argmin} x^T L x + \lambda (x-y)^T C(x-y), \quad (3)$$

where the first term optimizes for the constraint that Lx=0, and the second term enforces user constraints in a soft way, with $\lambda$ a user-defined parameter, y being the user-marked known region (either 0 or 1) and C being a diagonal confidence matrix (that will usually have entries of 1 for known or 0 for unknown).

The solution to this optimization problem (minimization) is:

$$(L+\lambda C)x=\lambda Cy, \quad (4)$$

which can be viewed as a sum of constraints Lx=0 and Cx=Cy. This equation (6) is usually solved using preconditioned conjugate gradient descent.

Several methods have been proposed to generate the affinity matrix including the procedures described in Levin et al. "A Closed Form Solution To Natural Image Matting," IEEE Conference on Computer Vision and Pattern Recognition (CVPR), vol. 1, pages 61-68, (2006), the disclosure of which is hereby incorporated by reference in its entirety, uses the color lines model to look for neighboring pixels. Some embodiments use the kNN-method described in the Chen et al. 2012 paper. First, a feature vector may be computed for each pixel in the image, usually a combination of pixel color and scaled spatial location that may be referred to as RGBxy. Some embodiments may also use the regularized depth estimates as the feature vector, that is, the feature vector can be RGBDxy. A kd-tree may be constructed using this array of features. For each pixel (row), n nearest neighbors may be found by searching the kd-tree, and may be assigned affinity scores (mapped to the range [0, 1] based on distance in feature space). Several other methods, do not use the affinity matrix explicitly; however, one can think of them in the affinity matrix framework.

Depth Regularization

In many embodiments, before the initial sparse depth map may be usable for image matting, it may be regularized into a dense depth map. Some embodiments provide a novel matting-Laplacian based process to create the dense depth map. In particular, an unknown depth may be approximately an affine combination of depths at "nearby" pixels, just as the alpha value is in color matting, and there may be a strong correlation between image and depth discontinuities. Some embodiments thus are able to precompute the Laplacian once while creating the RGB-D image, and make it available to subsequent applications (see FIG. 6). As described above, in some embodiments, the image matting system handles depth ambiguity that is typical for depth maps obtained through multi-view stereo.

As noted above, depth map maps can be obtained using multi-view stereo (MVS) to generate the dense depth map. Other embodiments may use other depth acquisition devices with different characteristics, such as the Kinect depth sensor distributed by Microsoft Corporation of Redmond, Wash., and 3D light field cameras distributed by Raytrix GmbH of Kiel, Germany, as illustrated in the example in FIG. 5 to obtain the initial sparse depth map.

Figure 2:
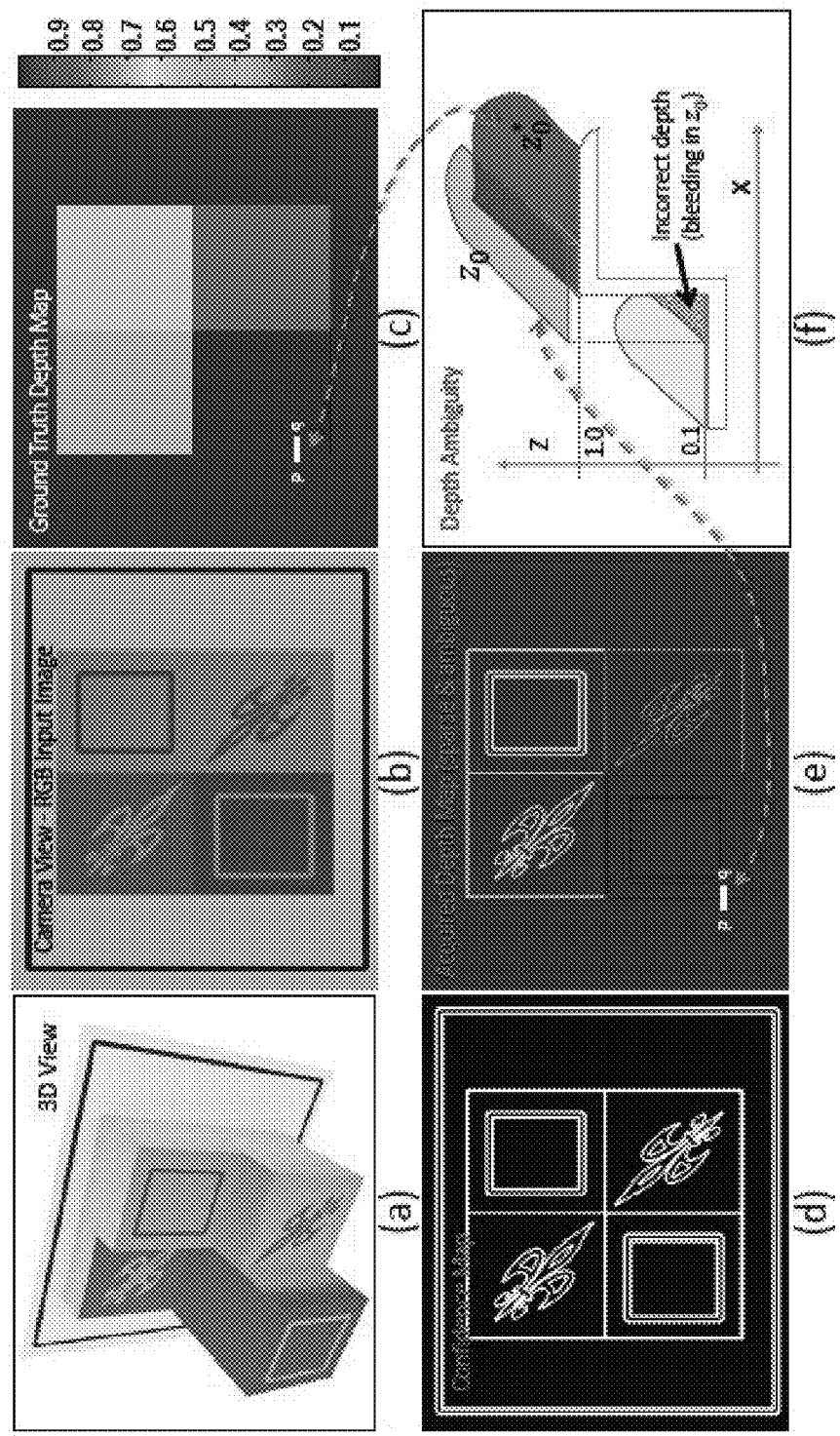
FIG. 2 conceptually illustrates an example of depth map regularization for a sample 3D scene in accordance with an embodiment of the invention.
Figure 3:
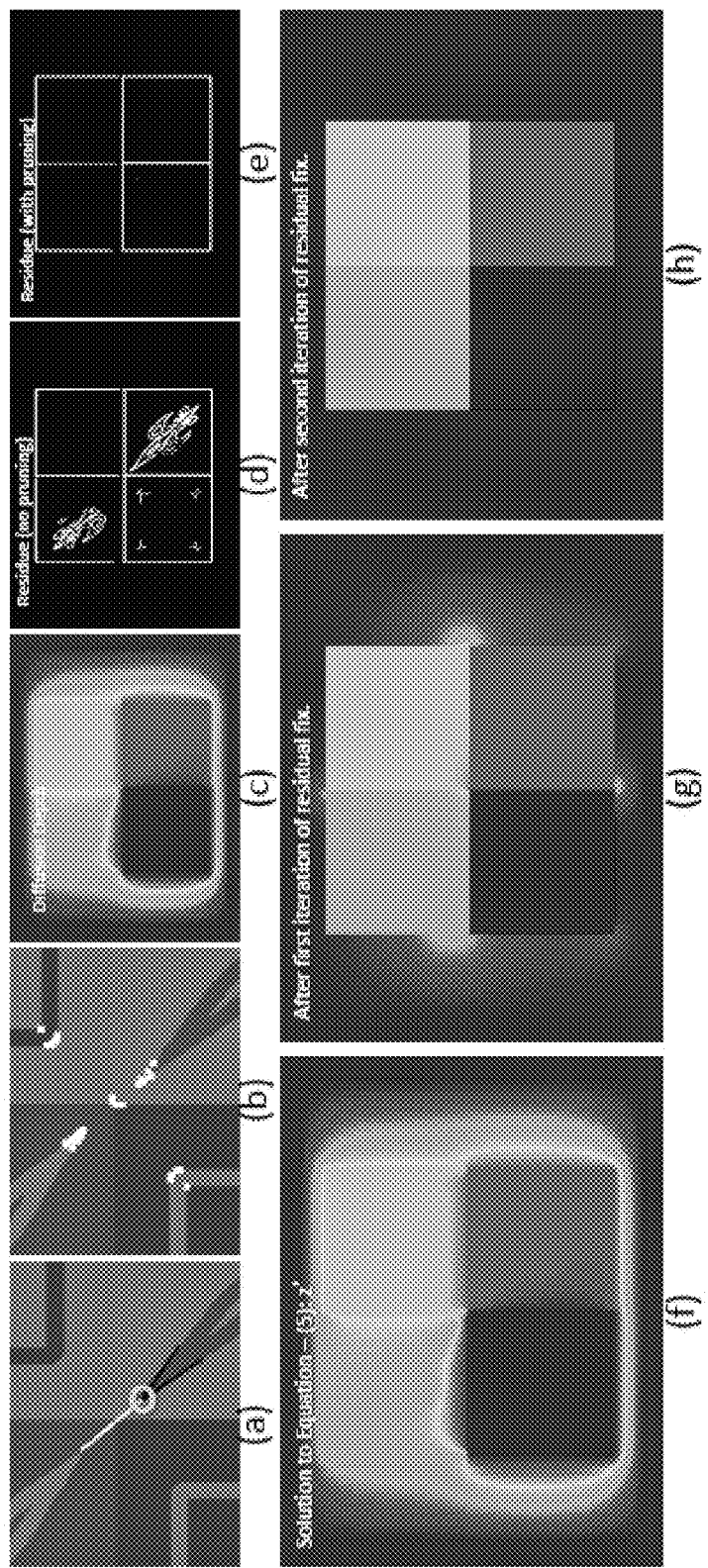
FIG. 3 conceptually illustrates Laplacian pruning and residual correction of a depth map in accordance with an embodiment of the invention.
Figure 4:
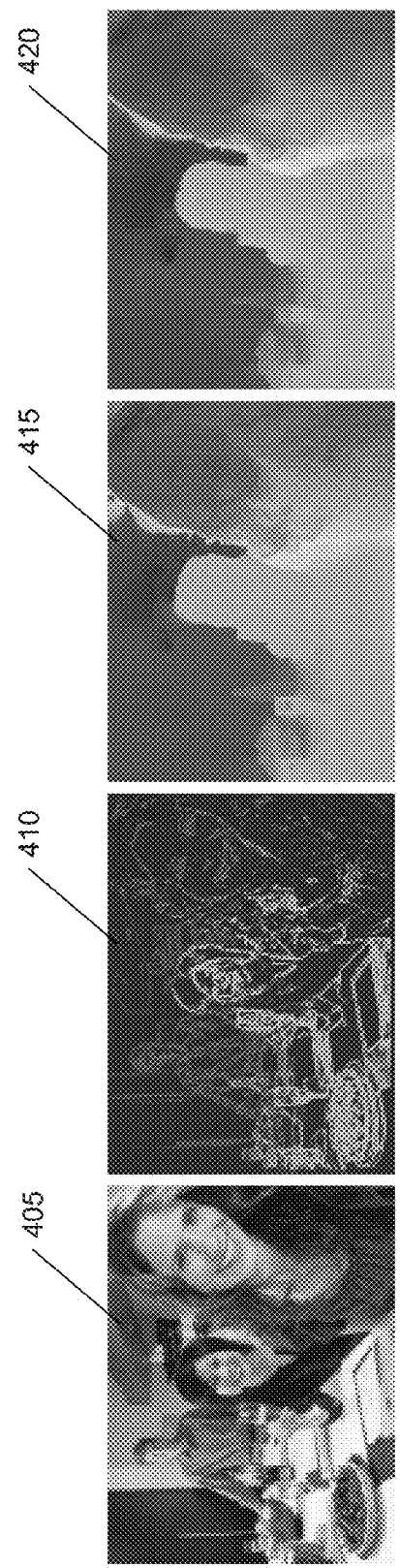
FIG. 4 conceptually illustrates an example of depth regularization of an image produced from an array camera in accordance with an embodiment of the invention.

In some embodiments, the inputs to the image matting system may be a high resolution RGB image I with m×n pixels, and an indexed depth map $z_0$. In the image matting system, $z_0$ may correspond essentially to disparity, with higher z indicating greater disparity. Some embodiments may also use a binary confidence map C that indicates whether the depth at a given pixel is confident. Some embodiments may obtain C by a thresholded gradient of the intensity of the input image I, since stereo depth is generally accurate at image and texture edges. FIGS. 2-4 show synthetic (simulated) and real example outputs of the sensor.

In a number of embodiments, since the confidence map may be defined only at edges, the depth map reported may span ("bleeds" across) an edge, as shown for simple synthetic data in FIG. 2(c,f). In particular, FIG. 2 illustrates an example of a simple synthetic scene (5 depth planes). FIG. 2(a) illustrates a 3D view of the scene. FIG. 2(b) illustrates the color image. FIG. 2(c) illustrates ground truth depth map (disparity) $z^*_0$ shown in false color (normalized). FIG. 2(d) illustrates the confidence map C where the depth is available (simulated), mainly at texture and object edges. FIG. 2(e) illustrates bleeding edge depth $z_0$ reported by the sensor (simulated). FIG. 2(f) shows a sectional view of the 3D scene along a cutting plane p-q marked in FIG. 2(c) and FIG. 2(e). Bleeding depth is shown along the profile indicated by the white line segment.

In FIG. 2, 14% of the pixels are confident, 11.2% because of surface texture gradients and 2.8% from depth at edges. Of these 2.8%, half (1.4%) are the correct depth (interior of foreground object) while the other half (1.4%) are incorrect depth (bleeding), assigning foreground depth on the background object. When there is a geometric discontinuity, it is difficult to determine which side of the surface the depth really belongs to. This is a fundamental limitation. However, the depth may belong to the closer foreground layer with greater disparity, whichever side that happens to be.

Depth Regularization in Laplacian Framework

An example of Laplacian pruning and residual correction in accordance with an embodiment of the invention is illustrated in FIG. 3. The synthetic scene is from FIG. 2. FIG. (A) illustrates incorrect connection. The white line indicates the pixel highlighted by a circle is connected to another similar pixel from a different depth group. Black lines indicate acceptable connections. (B) highlights more pixels with "bad" connections. (C) illustrates diffusion depth map $z_D$. (D) illustrates Laplacian residual R without Laplacian pruning, that is retaining all the connections shown in (A). (E) illustrates residue R after Laplacian pruning (F) illustrates regularized depth map $z^*$. (G) illustrates regularized depth map after first iteration of residue correction. (H) illustrates regularized depth map after second pass of residue correction.

As described above, some embodiments perform depth regularization using the Laplacian L and the data term $z_0$ weighed by confidence map C. For mathematical convenience, some embodiments treat C as a sparse mn×mn diagonal matrix, whose diagonal entries are the binary confidence values. The regularized depth $z^*$ with reference to a given C can be computed through an optimization process similar to equations 3, 4 as:

$$z^* = \operatorname{argmin}_z(z^T L z + \lambda(z-z_0)^T C(z-z_0)) \Rightarrow (L+\lambda C)$$
$$z^* = \lambda C z_0 \quad (5)$$

An example of $z^*$ in accordance with an embodiment of the invention is illustrated in FIG. 3f. As illustrated, the very sparse depth at edges of the initial depth map has been regularized into a dense depth map everywhere in the image. However, the depth edges are smeared, which can be attributed to incorrect bleeding of input depth. The remainder of this sub-section addresses this issue by (1) pruning the Laplacian to avoid incorrect non-local affinity matches across depth boundaries, and (2) exploiting Laplacian residuals to detect and correct bleeding of input depths. The final result in FIG. 3(h) is much more precise.

As described above, some embodiments use the kNN approach which may pair similar pixels without regards to their depth, when constructing the affinity matrix A and Laplacian L. Two nearby color-wise similar pixels may be at two different depths (FIG. 3(a,b)). Such non-local pairings can be beneficial to matte extraction. However, they can also cause issues in some cases for depth regularization, and unexpected results during matting if foreground and background objects have similar colors. Ideally, for each pair (i,j) corresponding to a nonzero entry in $A_{ij}$, some embodiments test if i and j have depth differences beyond a threshold. However, detecting and pruning such pairs is a chicken-and-egg challenge, since depth is needed to do the pruning, but depth is obtained by using the original Laplacian. Therefore, some embodiments may first find an approximate dense depth map through a diffusion process, $$(L_D + \lambda C) z_D = \lambda C z_0 \quad (6)$$

where $L_D$ is the diffusion Laplacian constructed such that each pixel may be connected to 8 of its surrounding neighbors (using only spatial proximity, not RGB color values). A result is shown in FIG. 3(c). Using $z_D$, some embodiments may compute the depth difference for each pair (i,j) as $|z_D(i) - z_D(j)|$. If this difference is above a certain threshold, some embodiments purge those pairs by assigning $A_{ij}=0$. While pruning, some embodiments ensure a minimum number of connections are retained.

Processes in accordance with certain embodiments of the invention provide a novel approach to detect and correct depth bleeding across edges. The key insight is that solving equation 5 above, the basic Laplacian condition in equation 2, namely that $Lz^* \approx 0$ should also be satisfied. In some embodiments, after solving for $z^*$, it is easy to compute the Laplacian residual, $$R = Lz^* \quad (7)$$

As shown in the example illustrated in FIG. 3(d), the residual R is close to 0 in most regions—those pixels have depth or disparity well represented as an affine combination of values at nearby pixels. However, there are regions involving connections across different depths, with large residuals. The pruning discussed above resolves most of these issues (FIG. 3(e)), but there are still regions along depth edges where |R| is large. This residue indicates a disagreement between the Laplacian prior and the data term. It indicates the data term is enforcing an incorrect depth value.

Some embodiments seek to find and remove depth edges that have "bled" over to the wrong side. Some embodiments observe that confident depth may always belong to the foreground layer. Since z represents disparity in some embodiments, the z value (disparity) of foreground should be greater than that of background. For example, consider a pixel that should have background depth, but is incorrectly given confident foreground depth (FIG. 2(c,f)). After regularization, this pixel may have higher disparity $z^*$ than the average of its neighbors (which will include both foreground and background disparity values). The Laplacian L=D−A, and the residual R=$Lz^*$−$Az^*$. This is effectively the value at $z^*$ minus the average of its neighbors (connected through the affinity matrix). Since disparity $z^*$ is higher than its neighbors, incorrect confident depths can be identified as those regions where R>0.

A new confidence map can be computed and set $C_i=0$ at pixel i whenever $R_i > \tau$, leaving C unchanged otherwise (for example using an appropriate value such as, but not limited to, τ=0.005). In several embodiments, the process may iterate by solving equation 5 with the new confidence map, starting with the previous solution (compare FIG. 3(f,g)). Results in this section are presented with two iterations found as adequate. Although, as can readily be appreciated, any number of iterations can be performed as appropriate to the requirements of a specific application. FIG. 3(h) shows the result in the synthetic case, that is much more accurate than without the residual correction.

An example of image matting on a real scene in accordance with an embodiment of the invention is illustrated in FIG. 4. In particular, FIG. 4 illustrates an RGB image 405 produced from an array camera, initial sparse depth map 410 from multiview stereo at edges and texture boundaries, initial regularized depth map with bleeding 415, and final regularized depth map 420 after Laplacian residual correction. As illustrated in this example, the initial sparse depth map from the sensor is regularized into a high quality dense depth map, with Laplacian residual correction improving the results further.

Figure 5:
FIG. 5 conceptually illustrates a depth regularization comparison with several different depth sensors in accordance with embodiments of the invention.

Comparison and Generality:

FIG. 5 shows the generality of the approach to other RGB-D systems, and compares against other methods. In all cases, it can be seen that the depth from an embodiment of the image matting system is sharper and more complete. In particular, FIG. 5 illustrates the results of depth regularization processes performed on depth maps generated by various types of depth sensing technologies and provides a comparison. The top row (a-f) provide a comparison of the image matting system to Markov Random Field (MRF) and the method described in Tallon et al., "Upsampling and Denoising of Depth Maps Via Joint-Segmentation," $20^{th}$ European Signal Processing Conference (EUSIPCO), pp. 245-249 (2012), (the "Tallon et al. paper"), the relevant disclosure of which is hereby incorporated by reference in its entirety. (A) illustrates an input color image. (B) illustrates ⅛ scaled and noisy version of the ground truth depth map (c). (D) is the recovered upscaled depth map using MRF. (E) is the method in the Tallon et al. paper. (F) is an embodiment of the image matting system method that produces a depth map closer to the ground truth. The middle row (g-h) compare with Kinect images. (G) is the colored image, (h) is the Kinect depth map that has holes, (i) is the sharper and more complete version after regularization. Bottom row (j-l) compare with Raytrix images. The color image from one view is in (j). Their regularized depth map in (k) has more spurious depths and bleeding than the sharper result from an embodiment of regularization of the image matting system in (l).

To compare to MRF, source images and results from the method described in the Tallon et al. paper are used. Here, a known ground truth image is downsized to ⅛ its original size and noise is added. The Tallon et al. paper proposes a method to upscale the depth map using the original color image as prior, and also performs comparison to MRFs. The comparison started with the same downsized image, upscaled it, and regularized the depth map. Accordingly, this produces a depth map with less noise, and the edges are well defined, resembling the ground truth, as shown in FIG. 5—(top row).

Next, an RGB-D image from the Kinect sensor (depth map warped to color image) using the method disclosed in Lai et al. "A large-scale hierarchical multi-view RGB-D object dataset," Proc. IEEE International Conference on Robotics and Automation (ICRA), pp. 1817-1824 (2011), the relevant disclosure of which is herein incorporated by reference in its entirety, is considered. Due to warping errors and occlusions, the input depth map has holes and misalignment. In several embodiments, the image matting system may fill l in the missing values (confidence map is set to 1 when the depth is known) and may also align the depth map to the color image. In this case, residue correction (confidence set to 0) is performed wherever the absolute value of the Laplacian residual |R| is greater than a threshold. These regions essentially indicate incorrect alignment of depth. The result is shown in FIG. 5—(middle row).

Regularization was also performed on a sparse depth image captured with the Raytrix light field camera as disclosed in Perwass et al., "Single Lens 3D-Camera with Extended Depth-of-Field," SPIE 8291, 29-36, (2012), the relevant disclosure from which is hereby incorporated by reference in its entirety. A confidence map was generated based on the Raytrix depth map (wherever the depth is available, which is clustered around textured areas). The resulting regularized depth map shows a lot more depth detail, compared to the Raytrix regularization method, as seen in FIG. 5—(bottom row). However, a few outliers in are observed in the resulting regularized depth map due to a lack of access to the noise model of the input depth map, and the noisy input depth.

Figure 6:
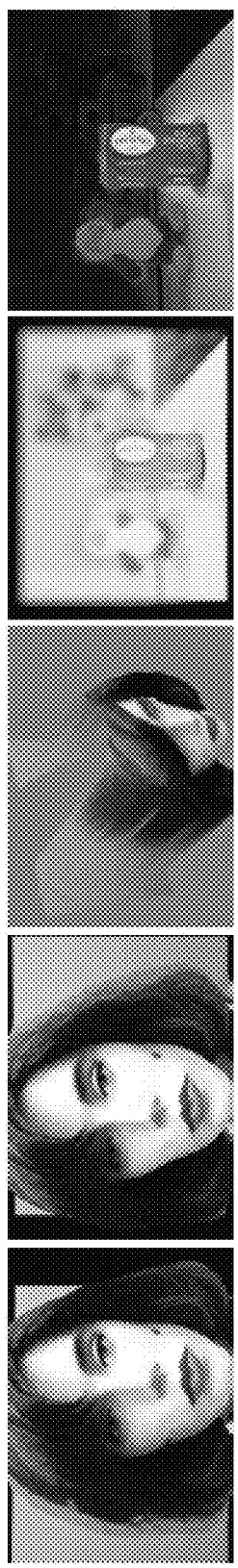
FIG. 6 conceptually illustrates applications of regularized depths in accordance with embodiments of the invention.

Various application of regularized depth maps in accordance with various embodiments of the invention are illustrated in FIG. 6. The left three images show examples of changing view-point as in image-based rendering, as well as the 3D mesh obtained simply by connecting neighboring pixels (foreground/background connections are not prevented). The right two images show refocusing on the foreground object with a simulated large aperture, and a visual effect obtained by making the light intensity fall off with depth from the camera.

Efficiency Optimizations

Performing depth regularization in large flat areas may involve redundant computation. Accordingly, in order to speed-up processing, an image can be broken into super-pixels, where the size of a super-pixel is a function of the texture content in the underlying image. For example, processes in accordance with several embodiments of the invention use a quad-tree structure, starting with an entire image as a single super-pixel and sub-divide each super-pixel into four roughly equal parts if the variance of pixel intensities within the initial super-pixel is larger than a certain threshold. This may be done recursively with the stopping criteria being: until either the variance in each super-pixel is lower than the predetermined threshold, or the number of pixels in the super-pixel is lower than a chosen number.

In some embodiments, each super-pixel can be denoted by a single feature vector. For example, RGBxy or RGBxyz feature of the centroid of each super-pixel. This process may significantly reduce the number of unknowns for images that have large texture-less regions, thus allowing the image matting system to solve a reduced system of equations.

After performing regularization on the superpixels, an interpolation can be performed to achieve smoothness at the seams of superpixels. In particular, to smoothen this out, each uncertain (unknown) pixel's depth can be estimated as a weighted average of the depths of the k-nearest super-pixels. In some embodiments, the weights may be derived as a function of the distance of the RGBxy (or RGBxyz) feature of the pixel from the super-pixel centroids.

The speedup factor can be roughly linear in the percentage of pixel reduction. For example, with superpixels equal to 10% of the original image pixels, a speed up of an order of magnitude is obtained, and the regularized depths can be accurate to within 2-5%.

Automatic Trimap Generation

In some embodiments, an initial step in matting processes may be to create a trimap. In several embodiments, the trimap includes user-marked known foreground and background regions, and the unknown region. While methods like kNN matting can work with a coarse trimap or sparse strokes, they usually produce high quality results only when given a detailed thin trimap. Creating such a trimap often involves significant user effort. Accordingly, some embodiments provide a semi-automatic solution by providing that RGB-D images enable separation of foreground and background based on depth. However, in a number of embodiments, the depth may be less precise at boundaries than the color image, even with the Laplacian-residue adjustments described above. Accordingly, some embodiments may use the depth to automatically create a detailed thin trimap from sparse user strokes, followed by color matting. Note that this is not possible with RGB only images.

As described above, FIG. 1 illustrates the overall pipeline for semi-automatic interactive RGB-D matting. As illustrated in the example in FIG. 1, the user may draw a single foreground and a single background stroke or blob. In another embodiment, the user may only select the object of interest in the scene. This object need not necessarily be the foreground (or foremost) object in the scene. The image matting system in some embodiments analyzes the user stroke, along with the distribution of objects (in 3D, i.e., including depth) in the scene and automatically suggests a depth range so as to separate the object of interest from the rest of the scene. In some embodiments, the image matting system does so by analyzing the depth histogram of the image. If a multimodal distribution is found, the image matting system attempts to estimate thresholds to segregate the mode containing the depth of the object of interest from the rest of the depth distribution.

If multiple objects lie in the same depth range, the image matting system may also automatically limit the selection to a single object by analyzing depth discontinuities. If an incorrect selection is made, the user may have the option to provide active inputs (e.g., marking regions to be region of interest or not), whereby the image matting system may refine the initial identification of the object of interest from multiple inputs.

In many embodiments, the image matting system may analyze depths within only a window around the object of interest. The trimap may be enforced globally (that is, to the entire scene), locally (only in the window selected, the window may be resizable by the user) or by an object segmentation process whereby the object of interest is identified in the entire image based on the threshold selected from the user input.

In several embodiments, the image matting system computes the average depth in the foreground versus background strokes, and simply classifies pixels based on the depth to which they are closest. As shown in FIG. 1, this may provide a good segmentation, but may not be perfect at the boundaries. Therefore, some embodiments use edge detection, and apply standard image dilation on the boundaries to create the unknown part of the trimap (FIG. 1 top row).

Figure 7:
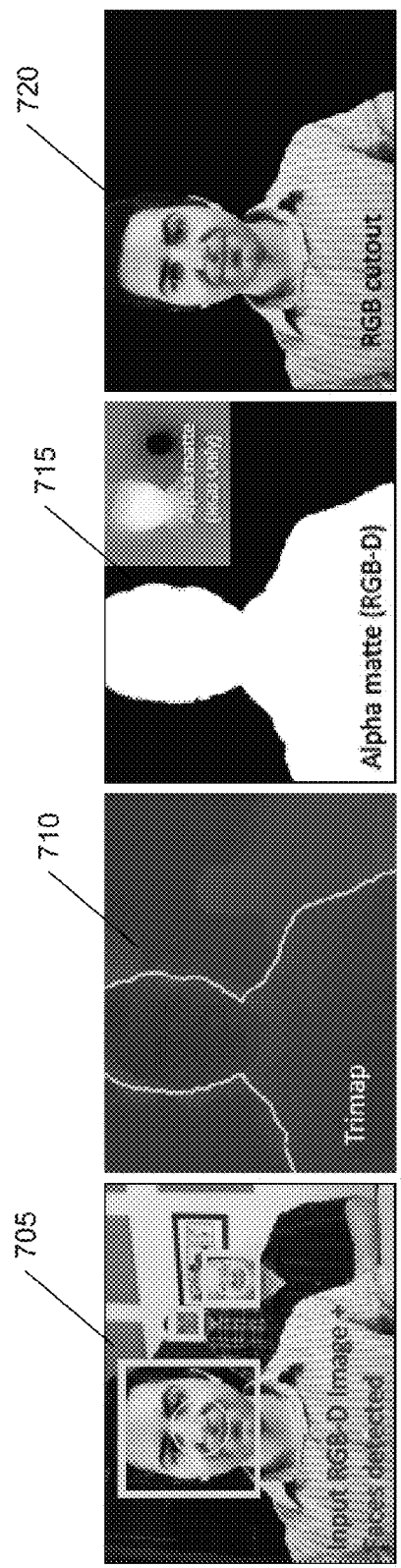
FIG. 7 conceptually illustrates fully automatic image matting using object recognition in accordance with an embodiment of the invention.

Many different alternatives may be possible for semi-automatic or automatic matting. In a number of embodiments, the user could simply draw a box around the region of interest. Alternatively, the image matting system could use a face detector and/or other types of automatic object detectors and automatically create the box, as illustrated in an example in FIG. 7, where the front person is matted from the background completely automatically. In particular, FIG. 7 illustrates an example of fully automatic RGB-D matting using a face detector in accordance with an embodiment of the invention. FIG. 7 illustrates the input image 705 with face detection. The image matting system creates a thin trimap 710 from which the alpha matte 715 is automatically computed. As illustrated, the insert in the alpha matte 715 shows using the same blobs for RGB-only matting; without depth information, the quality is much worse.

In some embodiments, the foreground and background blobs may be automatically computed as circles within the two largest boxes from the face detector. In certain embodiments, a comparison can be performed with simple RGB only matting, using the same foreground/background blobs (alpha inset in third sub-figure). Accordingly, the RGB-D image may be used for detailed trimap creation and high quality mattes.

Using Occlusion and Visibility Information

As described above, initial sparse depth maps from camera arrays may be obtained through disparity estimation (e.g., parallax processing) and typically yield high confidence depth values for textured regions. As part of the disparity estimation process in the camera array pipeline, it is easy to identify regions containing occlusions, which are regions that are adjacent to foreground objects that are occluded by the foreground object to some of the cameras in the array. These occluded regions may be easily identified in the disparity estimation step and potentially seed the trimap that is needed for the start of the color image matting stage. This enables a reduction in the user inputs to the matting process resulting in an improved user experience Efficient Interactive Laplacian Color Matting In some embodiments, after trimap extraction, Laplacian color matting is employed to compute the matte, and extract foreground/background colors if desired. Reduced matting equations can be used that solve for alpha only in the unknown regions of the trimap, with a speedup proportional to the ratio of the full image to the unknown part of the trimap. In several embodiments, since the automatic trimap may have a thin unknown region, efficiencies of one to two orders of magnitude may be achieved, providing interactive frame rates without any loss in quality. Moreover, in a number of embodiments, the exact Laplacian equation can be solved for, without an arbitrary parameter λ to enforce user-defined constraints (that by definition are now met exactly in the known regions). In certain embodiments, this method is very simple and may extend easily to incremental matting where interactive edits are made to the trimap, with real-time updates of the matte. Furthermore, as described above, some embodiments may use the interactive guided image capture for image matting.

Computational Considerations and Reduced Matting

In general, the conventional matting formulation wastes considerable effort in trying to enforce and trade-off the Laplacian constraint even for pixel values in the known regions of the trimap. Instead, some embodiments solve for the constraint only at pixels marked unknown in the trimap. In other words, these embodiments directly solve equation 2 for unknown pixels. Accordingly, this provides a much simpler system, with no parameter λ. Furthermore, the image matting system is no longer under-constrained, since the unknown pixels will have neighbors that are known, and this may provide constraints that lead to a unique solution. More formally, these embodiments use superscripts u to denote unknown pixels f for foreground pixels and b for background. The pixels can be conceptually re-ordered for simplicity, so that equation 2 can be written as $$\begin{pmatrix} L^{uu} & L^{uf} & L^{ub} \\ L^{uf} & L^{ff} & L^{fb} \\ L^{ub} & L^{fb} & L^{bb} \end{pmatrix} \begin{pmatrix} x^u \\ x^f \\ x^b \end{pmatrix} = 0 \tag{8}$$

So far, this is simply rewriting equation 2. In some embodiments, the image matting system may now restrict the Laplacian and solve only for the rows corresponding to the unknown pixels. Unlike in the standard formulation, these embodiments may simply leave known pixels unchanged, and do not consider the corresponding rows in the Laplacian. Accordingly, in some embodiments this is rewritten as:

$$(L^{uu} L^{uf} L^{ub}) \begin{pmatrix} x^u \\ x^f \\ x^b \end{pmatrix} = 0 \qquad (9)$$

Several embodiments can do this, in a modified form, for depth regularization. This may be especially useful for images that are well textured and regularization is only needed for a small percentage of pixels that are marked as non-confident. The formulation is as follows:

$$(L^{uu} L^{uk}) \begin{pmatrix} x^u \\ x^k \end{pmatrix} = 0 \qquad (9B)$$

where $L^{uk}$ is the Laplacian connections between unknown (not confident) pixel with unknown depth $x^u$ and pixels with known (high confidence) depths annotated by $x^k$.

In the above equation (9), some embodiments may now set $x^f=1$ and $x^b=0$, to derive $$L^{uu} x^u = -L^{uf} \cdot 1 \qquad (10)$$

where the right-hand side corresponds to row-sums of $L^{uf}$ (1 is a column-matrix of 1, of the same size as the number of foreground pixels).

Note that $L^{uu}$ is diagonally dominant, since the diagonal elements are row-sums of the full affinity matrix, which is more than the reduced affinity in $L^{uu}$. Therefore, the image matting system may have a solution and is in fact usually better conditioned than the original system.

The computational savings may be considerable, since the image matting system may only need the reduced matrices for the unknown pixels. The Laplacian size is now ur rather than pr, where r is the number of neighbors for each pixel, and u<<p is the number of unknown pixels while p is the total number of pixels. If unknown pixels in the trimap are one-tenth of the image, the image matting system can easily save an order of magnitude in computation with essentially no change in the final image.

Within an interactive matting system, it may seek to update x in real-time, as the user changes the trimap. A simple approach is to use x from the previous frame as the initial value for preconditioned conjugate gradient. Often, this is close enough to the error tolerance immediately, and usually only one or two iterations are needed, making the incremental cost of an update very fast. As can readily be appreciated, motion tracking can be utilized to accommodate motion of the depth sensor and/or camera relative to the scene.

Matting also may often involve solving for foreground and background. For kNN-matting, Chen et al., "KNN Matting," IEEE Transactions on Pattern Analysis and Machine Intelligence, Vol. 35, No. 9, September 2013, (the Chen et al. 2013 paper) the relevant disclosure of which is hereby incorporated by reference in its entirety, pose an optimization problem. As described in detail below, with respect to this optimization problem, some embodiments can solve a reduced system, providing considerable speedups for layer extraction.

Accuracy and Quality

Figure 8:
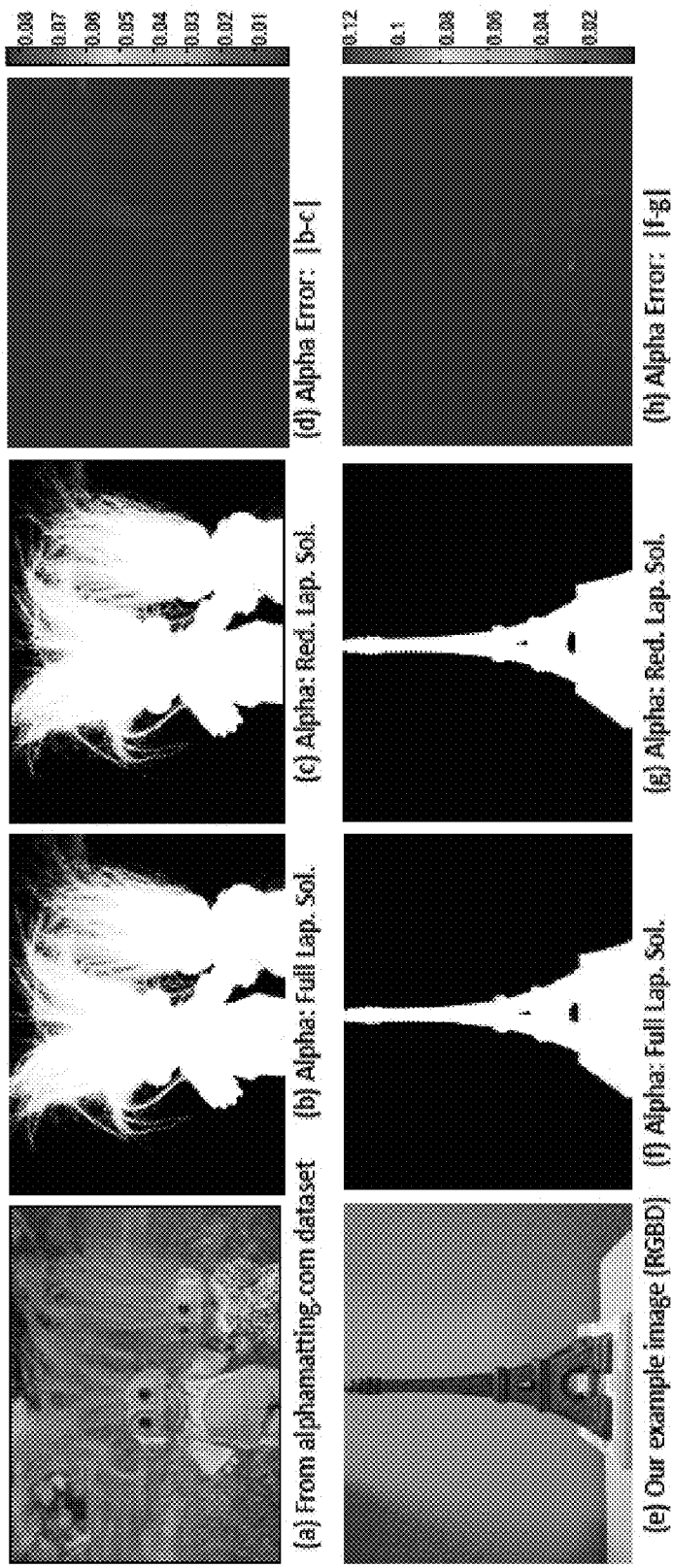
FIG. 8 conceptually illustrates two mattes computed with an embodiment of the image matting system, one on a color RGB alpha matting benchmark and one with an embodiment of the image matting system.

An example of a quality comparison to unoptimized kNN on a color image (top row) and from an embodiment of the RGB-D data (bottom row) in accordance with an embodiment of the invention is illustrated in FIG. 8. The results (c,g) are almost identical to the full Laplacian solution (b,f). Solving the reduced Laplacian provides a speed benefit without any loss in quality (d,h).

In particular, FIG. 8 shows two mattes computed with our method, one on the color RGB alpha matting benchmark, and one with an image matting system in accordance with an embodiment of the invention. In both cases, the quality is essentially identical to kNN matting without the speed optimization. For all 20+ images in the alpha matting benchmark, the optimization introduced a difference in the matte of less than 0.1%, with the median being 0.0001.

Figure 9:
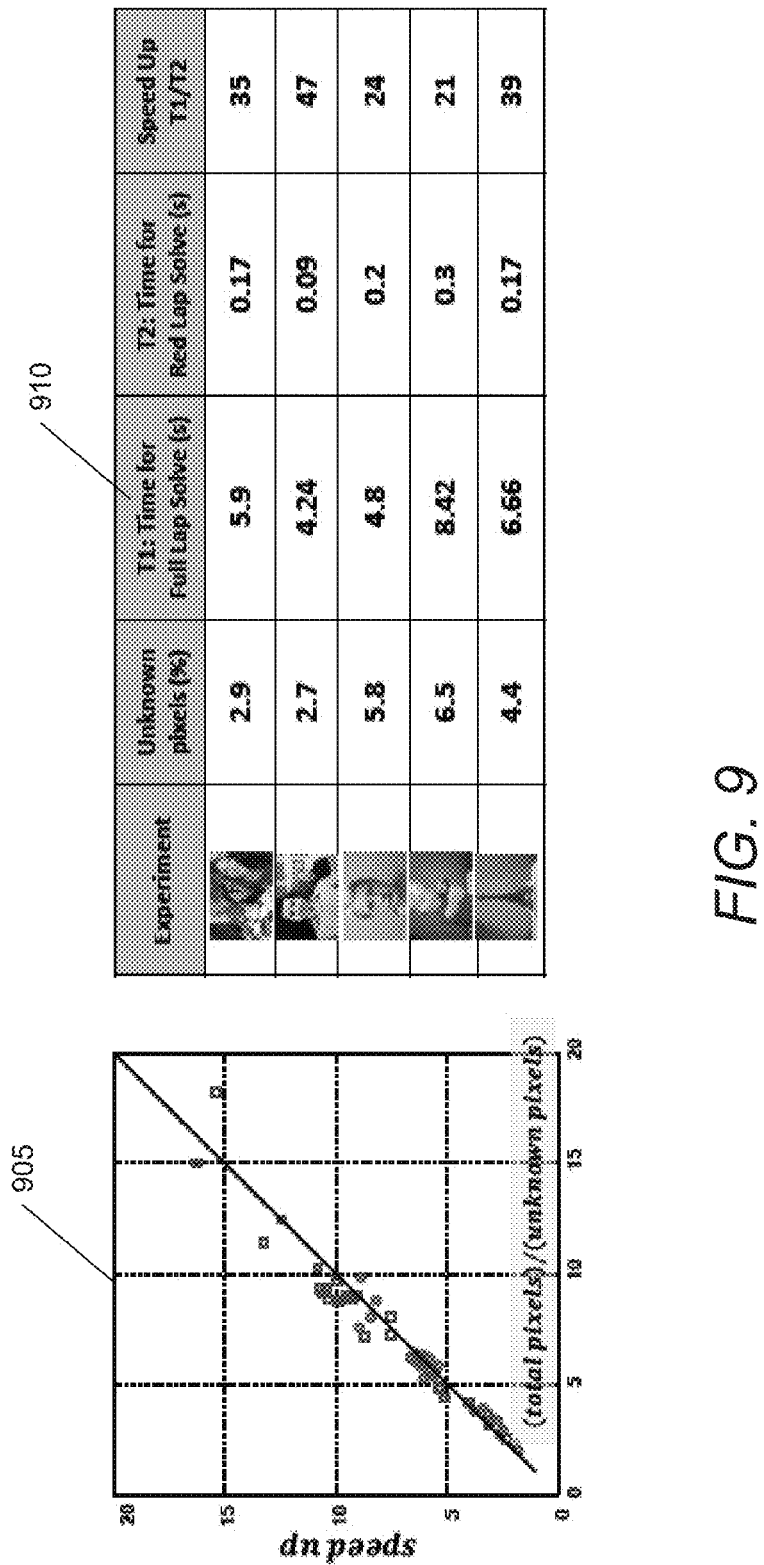
FIG. 9 conceptually illustrates the speedup of an embodiment of the image matting system versus KNN matting in accordance with an embodiment of the invention.

An example of timings in accordance with an embodiment of the invention is illustrated in FIG. 9. The graph 905 graphs speedup vs. ratio of total to unknown trimap pixels on the alpha matting benchmark referred to above with respect to FIG. 8. Two trimaps are shown in red and blue circles, and the black line indicates the linear speedup achieved on average. The table 910 on the right illustrates timing for 1000×750 RGB-D images captured with the image matting system. Speedups of more than an order of magnitude are achieved, given the image matting system's detailed thin trimaps.

In particular, FIG. 9 plots 905 the speedup of the optimized method versus standard kNN. The example ran comparisons on all of the standard color only images in the alpha matting benchmark using two trimaps of varying precision (shown as red and blue circles in FIG. 9). The speed-ups are essentially linear (black line), based on the ratio of the number of total pixels to unknown trimap pixels, and obtain a 10× benefit in many cases. FIG. 9 (right) shows the running time and speedup for the final color matting step on a number of RGB-D images captured with the image matting system. Because the image matting system's method automatically creates thin detailed trimaps, speedups are even more impressive, with running times a fraction of a second. In some embodiments, a user may adjust the trimap in real-time using various interactive editing tools as described in detail below.

Interactive Editing

Figure 10:
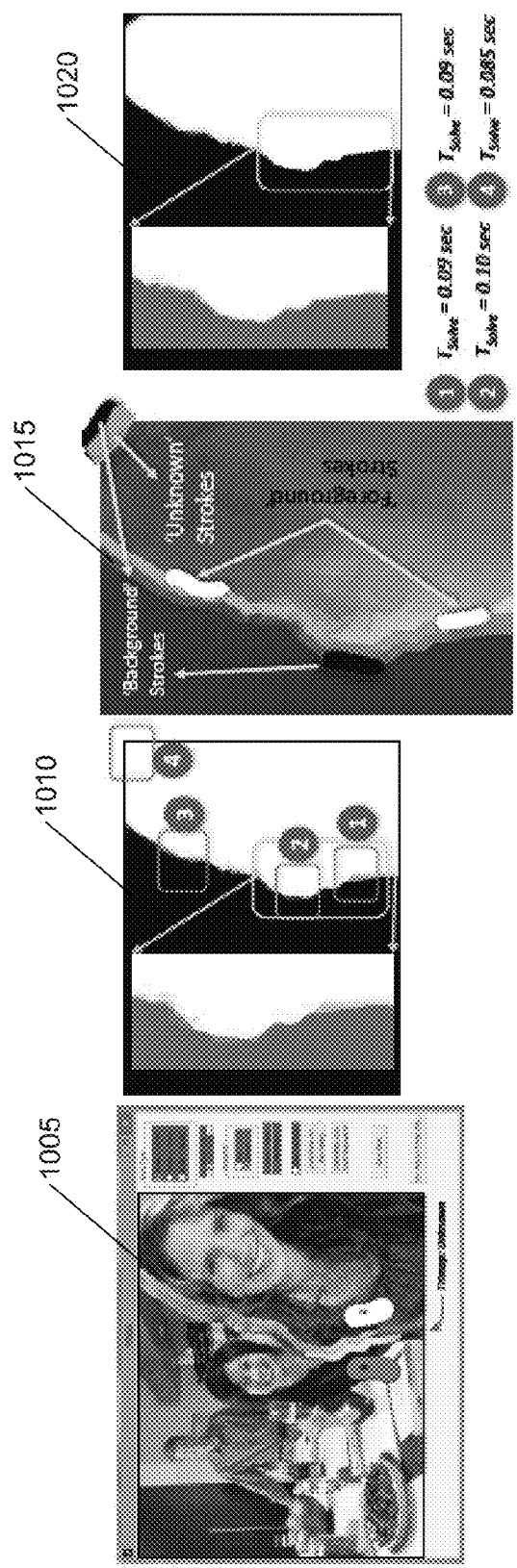
FIG. 10 conceptually illustrates interactive editing of trimaps with real-time feedback in accordance with an embodiment of the invention.

FIG. 10 illustrates screen shots from an example of an interactive system, that allows the user to adjust the trimap in real-time. In particular, FIG. 10 illustrates an interactive editing of trimaps with real-time feedback on the matte. FIG. 10 illustrates the graphical user interface ("GUI") 1005 and minor touch-ups to specific trimap 1010 regions, illustrated as boxes 1-4 on the trimap, to produce the final high-quality matte 1020. The user simply adds small foreground, background, or unknown strokes 1015 to modify the trimap. Updates to the matte happen in less than 0.1 seconds.

In particular, the incremental computation happens in real-time, taking an average of 0.1 seconds in Matlab to update after each edit, with between 0 and 5 iterations, starting from the previous solution. In many frames, the previous solution is close enough (using a threshold of 0.001), so no iterations or changes are required. The disclosure below includes more examples of depth regularization and matting using images from an array camera. This disclosure considers various scenes (objects, people, indoor and outdoor) and present timing and performance information.

In some embodiments, the Laplacian residual may also be applied to image matting, to automatically fix regions that are incorrectly marked in the trimap. Some embodiments may use reduced Laplacians to reduce precompute time, in addition to speeding up run-time. In some embodiments, the image matting system could also be extended to depth estimation and matting in video. In several embodiments, the image matting system may be used in potential applications in mobile devices like phones and tablets, equipped with mobile light field or camera array sensors, among various other devices.

Depth Regularization and Semiautomatic Interactive Matting Using RGB-D Images

The image matting system of some embodiments may be further optimized using various different optimization techniques, as will be described in detail below. These techniques include an extension to efficient Laplacian color matting to also solve for foreground and background efficiently. In several embodiments, a further efficiency optimization may be performed, as will be described below, that makes a small additional approximation to achieve faster times and eliminate the tradeoff parameter λ, as illustrated in the examples in FIG. 11 and FIG. 12.

Figure 11:
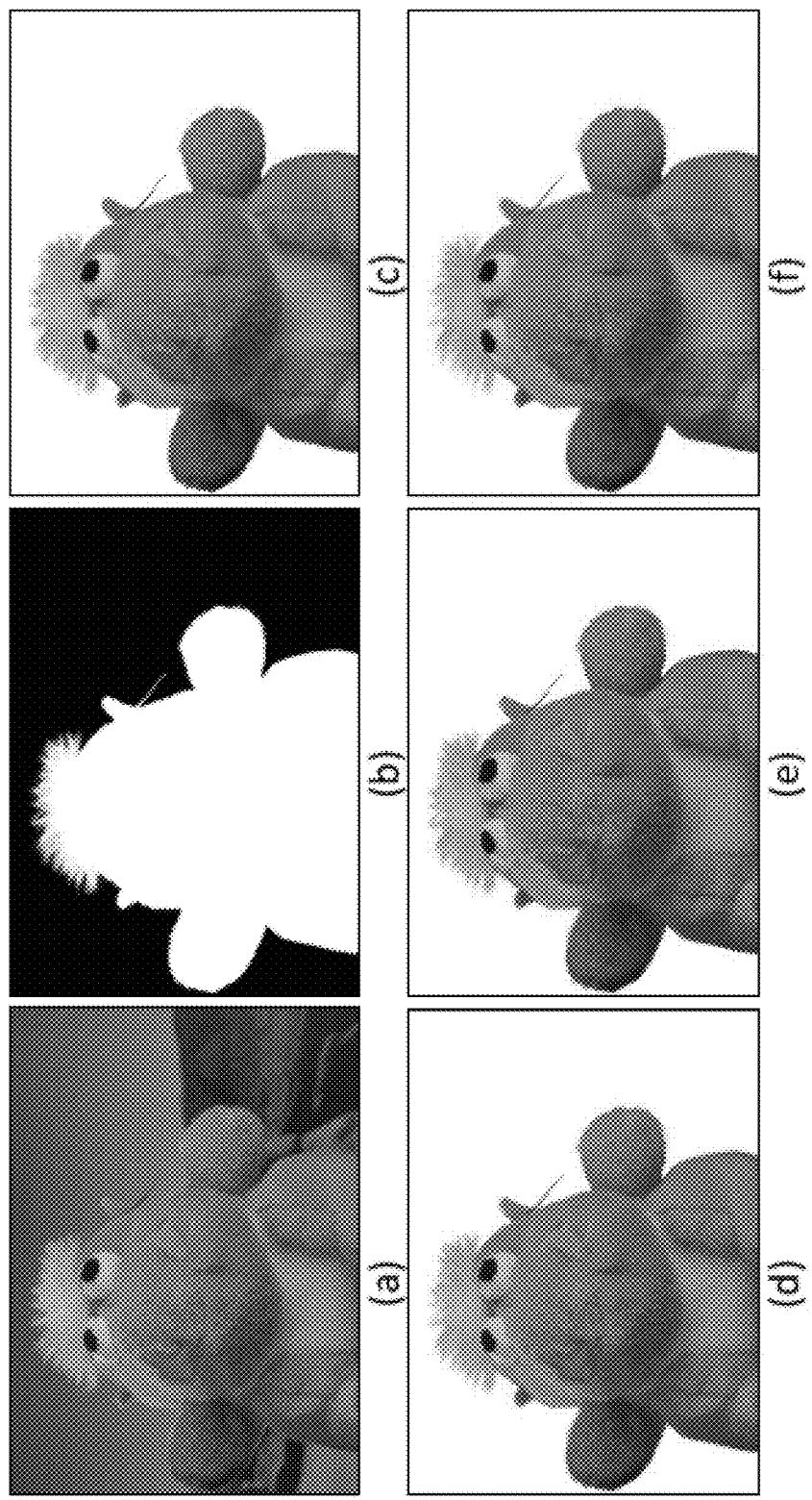
FIG. 11 conceptually illustrates an example of an additional efficiency optimization to color matting to also solve for foreground and background efficiently in accordance with an embodiment of the invention.

In particular FIG. 11 illustrates (a) a color image, (b) ground truth alpha, (c) color image multiplied by alpha, with the blue background bleeding in the fur on the top, (d) foreground multiplied by alpha using kNN took 140 seconds, (e) foreground multiplied by alpha: using reduced system took 3.5 sec (speed up of 40×), (f) using faster approximation extraction to compute foreground multiplied by alpha. Took 1.4 sec for a net speed up of 100×. The images are almost identical in all cases.

Figure 12:
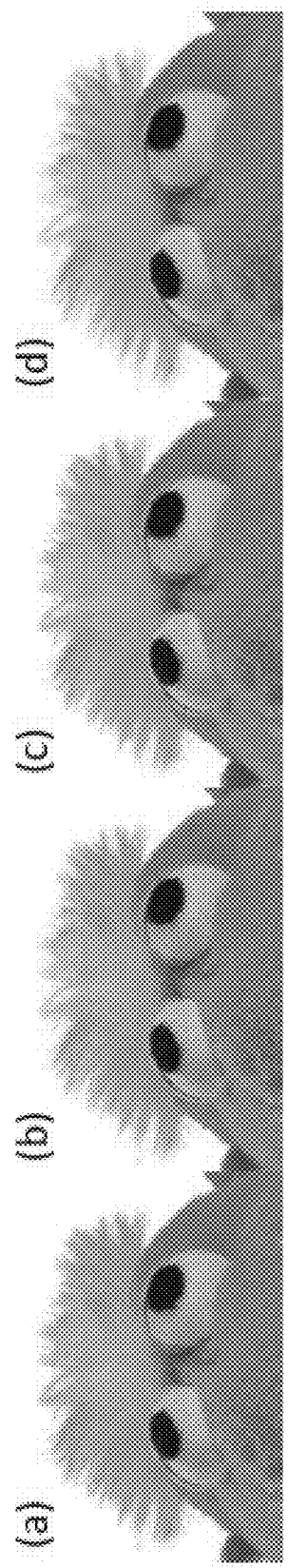
FIG. 12 conceptually illustrates an example of a fast approximation optimization in accordance with an embodiment of the invention.

FIG. 12 illustrates (a) color image multiplied by alpha; see incorrect colors in the top of the hair, (b) kNN-matting, (c) reduced system, (d) fast approximate method. The images are almost identical with two order of magnitude speedups between (d) and (b).

Finally, FIGS. 13-18 show a number of additional examples of semiautomatic interactive depth-based matting on RGB-D images from a compact array camera, beyond the results described above in accordance with embodiments of the invention. In particular, FIGS. 13-18 showcase a variety of successful examples of automatic trimap generation with minimal user input, and one failure case in FIG. 17.

Efficiently Solving for Foreground and Background

While the above description primarily focuses on estimation of the alpha value, processes in accordance with many embodiment of the invention also involve solving for the foreground and background regions of images. For kNN-matting, the Chen et al. 2013 paper poses an optimization problem. In this case, the image matting system cannot avoid the optimization, but can solve a reduced system, providing considerable speedups for layer extraction as well. This section first introduces the original formulation of Chen et al. 2013 paper (correcting a minor typographical error in their equations) and then develops the speedup. The next section develops an approximation of some embodiments that may be even faster and does not require optimization.

Optimization Formulation

The optimization considers two terms: The closeness of foreground and background to their neighbors, and faithfulness to data. The data term can be written as, $$\min 2\lambda \Sigma_k (\alpha_k F_k + \overline{\alpha}_k B_k - I_k)^2 \quad (11)$$

where the subscript k denotes the pixel, and $\overline{\alpha}=1-\alpha$. Note that the data term handles each pixel separately, and couples foreground and background. Setting the derivative with respect to $F_k$ and $B_k$ to zero separately, and omitting the constant factor of 4 (that is also present in the proximity term), to obtain:

$$\alpha_2^2 F_k + \alpha_k \overline{\alpha}_k B_k = \alpha_k I_k \quad (12)$$

$$\alpha_k \overline{\alpha}_k F_k + \overline{\alpha}_k^2 B_k = \overline{\alpha}_k I_k \quad (12)$$

One can write this in matrix form as $$[\overline{K}]\begin{bmatrix} F \\ B \end{bmatrix} = \begin{bmatrix} \alpha I \\ \overline{\alpha} I \end{bmatrix} \quad (13)$$

where the matrix $\overline{K}$ is such that $\overline{K}_{ii}=\alpha_i^2$ for $0 \le i \le p$, where p is the number of pixels ($\overline{K}$ is a 2p×2p), and $\overline{K}_{ii}=\overline{\alpha}_i^2$ for $p \le i \le 2p$.

The off-diagonal values are also sparse, with $\overline{K}_{i,i+p}=\overline{K}_{i+p,i}=\alpha_i \overline{\alpha}_i$ for $0 \le i < p$. Some embodiments also use $\overline{I}$ to denote the matrix on the right-hand side.

The proximity constraint (proximity is in the standard RGBxy space for kNN) leads to the standard Laplacian equation for foreground and background, $$LF=0 \; LB=0 \quad (14)$$

which can be combined to $$\begin{bmatrix} L & 0 \\ 0 & L \end{bmatrix}\begin{bmatrix} F \\ B \end{bmatrix} = \begin{bmatrix} 0 \\ 0 \end{bmatrix} \quad (15)$$

Some embodiments use a matrix $\overline{L}$ to encapsulate the matrix on the left. Some embodiments can combine all of these constraints to write, similar to the original matting (equation 4 above), $$(\overline{L}+\lambda \overline{K})\overline{X}=\lambda \overline{I}, \quad (16)$$

where $\overline{X}=[FB]^T$. This can again be solved using preconditioned conjugate gradient with an initial condition of $\overline{X}=\overline{I}$. The solution is run separately for each color channel.

Reduced Formulation

As for efficient alpha matting, processes in accordance with many embodiments of the invention only solve in the unknown trimap regions (other regions are foreground or background and their colors are known). The formulation is even simpler than before, because $L^{uk}=0$ using the weights in the Chen et al. 2013 paper (here the superscript k stands for known, that may be foreground or background). Indeed, the affinity matrix is weighted in such a way that it reduces to 0 when $\alpha=0$ or $\alpha=1$ (technically it uses $A_{jk}=A_{jk} \times \min(W_j, W_k)$ where $W_j=1-|2\alpha-1|$.) Thus, some embodiments can simply replace the Laplacian L by the reduced form $L^{uu}$ writing $$\begin{bmatrix} L^{uu} & 0 \\ 0 & L^{uu} \end{bmatrix}\begin{bmatrix} F^u \\ B^u \end{bmatrix} = \begin{bmatrix} 0 \\ 0 \end{bmatrix} \quad (17)$$

Similarly, the data term can be reduced to simply looking at the unknown pixels. The ultimate reduced form is directly analogous to equation 16, $$(\overline{L}^u+\lambda \overline{K}^u)\overline{X}^u=\lambda \overline{I}^u \quad (18)$$

where it has simply used a single super-script u to consider the restriction of matrices/vectors to unknown rows and columns. This may immediately provide a dramatic speedup proportional to the size of the unknown region, relative to the image. Note that known regions are not needed or used here. As before, the image matting system may be well conditioned since $\overline{L}$ is diagonally-dominant, and it also has the data term. Unlike previously, the image matting system may not omit the data term, since the requirement that the alpha-matting equation hold is fundamental.

Fast Direction Estimation of αF and (1−α)B

Instead of estimating pure foreground and background colors F and B, some embodiments may seek to estimate αF and (1−α)B instead. Computing only αF suffices for applications such as compositing (replacing background), since the compositing is typically achieved through $I_{composited} = \alpha F + (1-\alpha) B_{new-background}$.

The basic idea is similar to previous Laplacian formulations, now applied to αF instead. Note that this is technically an approximation, since even if both α and F satisfy the Laplacian condition, the product does not necessarily do so. However, as seen in FIGS. 11 and 12, the images are almost identical, while speedups of 2-3× are obtained over the previous section, and two orders of magnitude over standard kNN. Moreover, no λ parameter or optimization is needed.

Let X=αF be the foreground layer and Y=(1−α)B be the background layer; thus X+y=I. Since α has already been computed, it possible to segment the image into three regions: foreground pixels f where α>0.99, background pixels b where α<0.01 and unknown pixels u elsewhere. Expanding equation 8 of the main paper, provides $$L_{uu}X^u + L_{uf}X^f + L_{ub}X^b = 0 \quad (19)$$

$$L_{uu}Y^u - L_{uf}Y^f - L_{ub}Y^b = 0 \quad (19)$$

For foreground pixels, the foreground layer is simply the image, $X^f = I^f$. Similarly, for background pixels, $Y^b = I^b$. One can assume the foreground color is black in background regions and vice-versa, so $X^b = 0$ and $Y^f = 0$. Hence, one can reduce equation 19 to $$L_{uu}X^u + L_{uf}I^f + 0 = 0 \quad (20)$$

$$L_{uu}Y^u + 0 + L_{ub}I^b = 0 \quad (21)$$

In addition, it is known that $X^u + Y^u = I^u$. In principal, this is an over-constrained system of three linear equations that can only be solved for by optimization as in the previous section. However, some algebraic manipulation will allow us to derive a symmetric form that can be solved directly. Let us now solve for $X^u$. Applying $L_{uu}$ on both sides, provides:

$$L_{uu}Y^u = L_{uu}I^u - L_{uu}X^u \quad (22)$$

Replacing $L_{uu}Y^u$ in equation 21 using equation 22, provides:

$$L_{uu}I^u - L_{uu}X^u + L_{ub}I^b = 0 \quad (23)$$

Note that both equations 20 and 23 constraints on $X^u$. One simply combines (sums) the two equations rather than solving an optimization problem, to arrive at a more symmetric formulation:

$$2L_{uu}X^u + L_{uf}I^f - L_{uu}I^u - L_{ub}I^b = 0 \quad (24)$$

leading to a system that can be solved using the preconditioned conjugate gradient method:

$$\Rightarrow L_{uu}X^u = \frac{-(L_{uf}I^f - L_{uu}I^U - L_{ub}I^b)}{2} \quad (25)$$

One can solve for $Y^u$ if desired simply using $X^u + Y^u = I^u$. This simply flips the signs of $I^f$ and $I^b$ in the above equation.

Laplacian Pruning

In order to take advantage of known α, some embodiments prune the links in the Laplacian when the α difference is high. That is for nonzero $A_{i,j}$, some embodiments find the difference $\alpha_i - \alpha_j$. If the difference is beyond a threshold, some embodiments make $A_{i,j} = 0$.

RGB-D Matting Examples

This section (FIGS. 13-18) shows a number of examples from a full RGB-D semi-automatic interactive matting system in accordance with an embodiment of the invention, similar to FIG. 1 describe above. As illustrated, in most cases, a very good trimap is obtained with a couple of user strokes, and minor interactive touch-ups can be used to refine the matte. FIG. 17 shows one challenging failure case near the bottom of the trunk, where similar colors/texture lead to imperfect matting. As can readily be appreciated, feedback via a user interface during image capture preview can minimize the likelihood of capturing an RGB-D image that will yield a degenerate case during matting.

Figure 13:
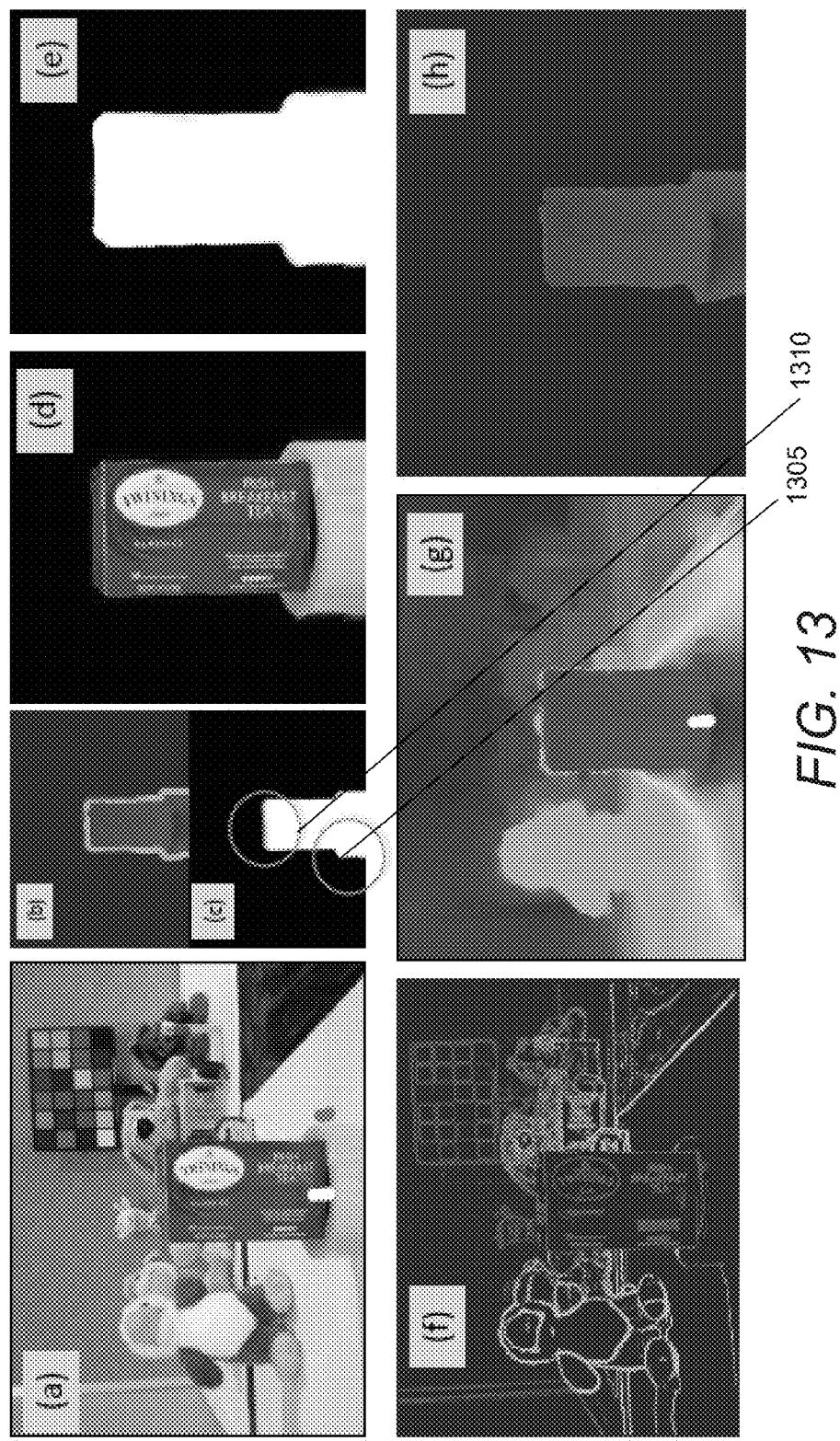
FIG. 13 conceptually illustrates a first example of semi-automatic interactive image matting in accordance with an embodiment of the invention.

FIG. 13 illustrates results: (A) input RGB image. User marked foreground (white blob) and background (orange blob). (B) segmented depth map with trimap outlining it. (C) Initial alpha matte. Circles show problematic areas, which the user then fixes through the GUI. (D) After the user fixes the trimap, final image cutout. (E) Final alpha. (F) Input raw depth map. (G) Regularized depth map. (H) Segmented depth map. In this example, the depth near the tape-roll 1305 is inaccurate, which leads to incorrect trimap generation. Even though the trimap is accurate at the top of the tea-box 1310, the alpha matting has failed due to thick trimap. The user can fix the trimap by reducing the width to obtain (E).

Figure 14:
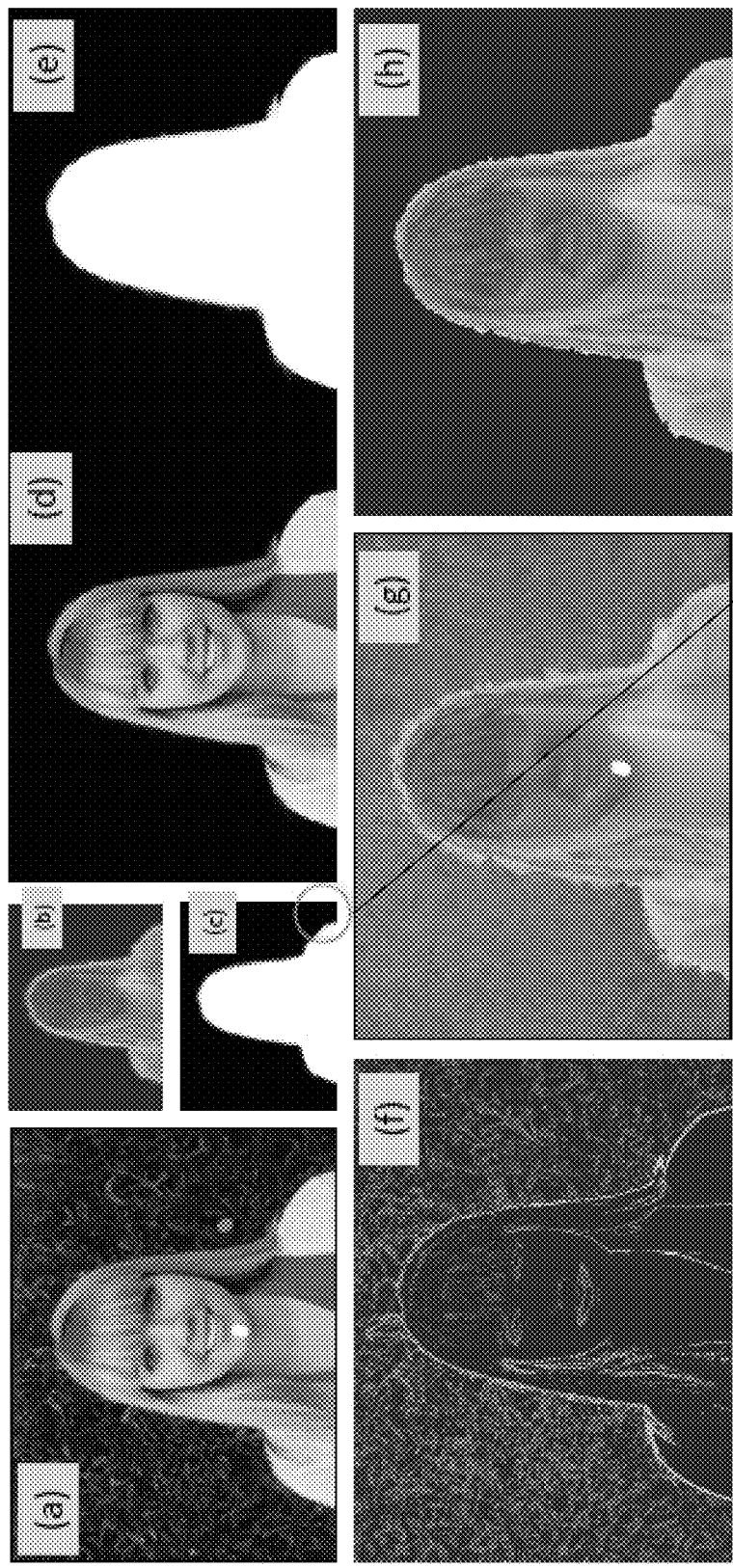
FIG. 14 conceptually illustrates a second example of semi-automatic interactive image matting in accordance with an embodiment of the invention.

FIG. 14 illustrates: (A) input RGB image. User marked foreground (white blob) and background (orange blob). (B) segmented depth map with trimap outlining it. (C) Initial alpha matte. Circles show problematic areas, which the user then fixes through the GUI. (D) After the user fixes the trimap, final image cutout. (E) Final alpha. (F) Input raw depth map. (G) Regularized depth map. (H) Segmented depth map. In this example, the user corrected only a very small portion of the trimap (1405 circled in (C)). After which, a high quality matte was obtained in (E).

Figure 15:
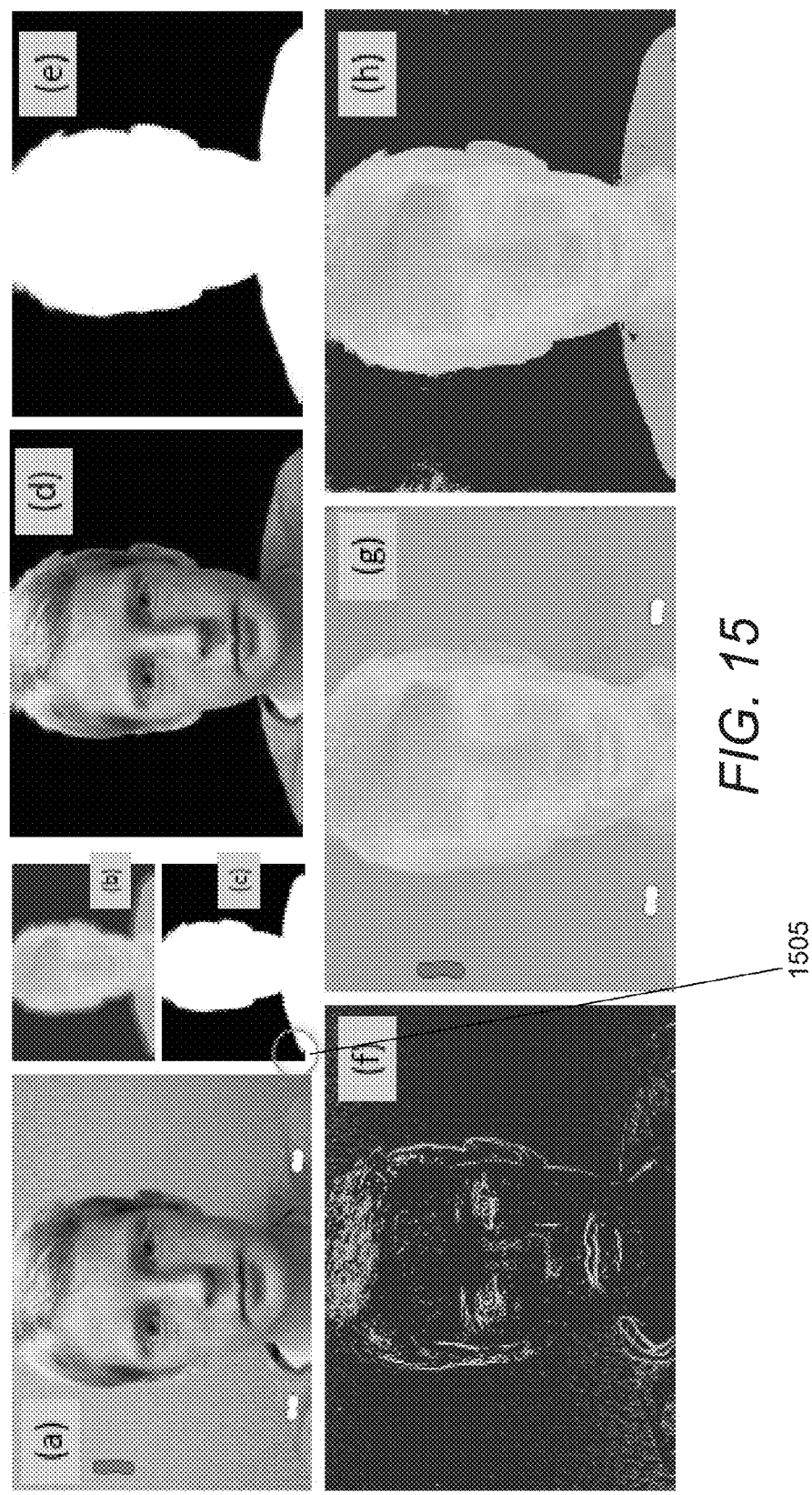
FIG. 15 conceptually illustrates a third example of semi-automatic interactive image matting in accordance with an embodiment of the invention.

FIG. 15 illustrates: (A) input RGB image. User marked foreground (white blob) and background (orange blob). (B) segmented depth map with trimap outlining it. (C) Initial alpha matte. Circles show problematic areas, which the user then fixes through the GUI. (D) After the user fixes the trimap, final image cutout. (E) Final alpha. (F) Input raw depth map. (G) Regularized depth map. (H) Segmented depth map. In this example, the raw depth is very sparse and noisy (on the left eye) and also on at many places on the wall. Given that the subject is really close to the wall, the user had to mark larger foreground and background blobs for trimap generation. However, the initial alpha matte had a minor issue near the left shoulder 1505 which was fixed to obtain (E).

Figure 16:
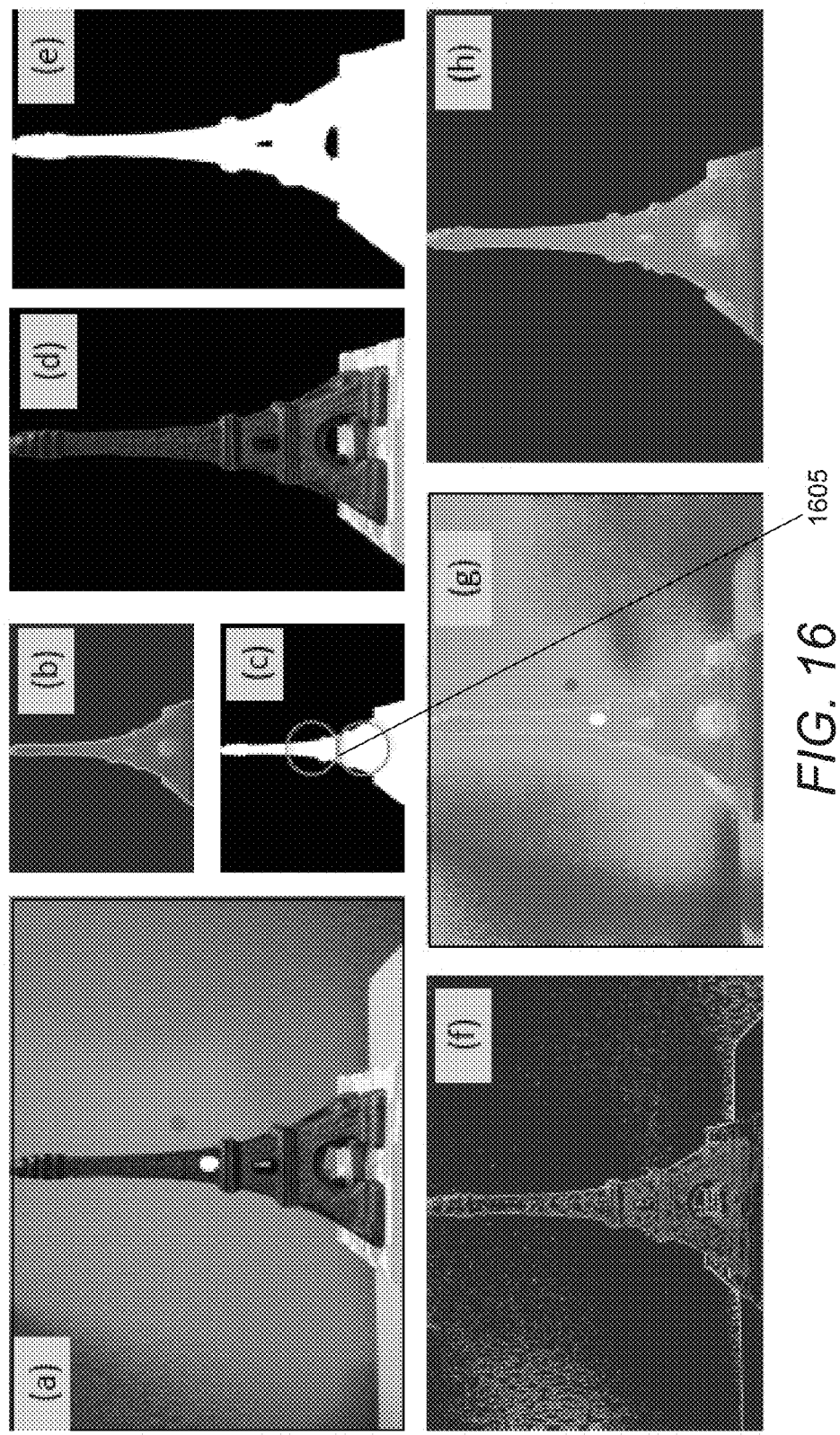
FIG. 16 conceptually illustrates a fourth example of semi-automatic interactive image matting in accordance with an embodiment of the invention.
Figure 17:
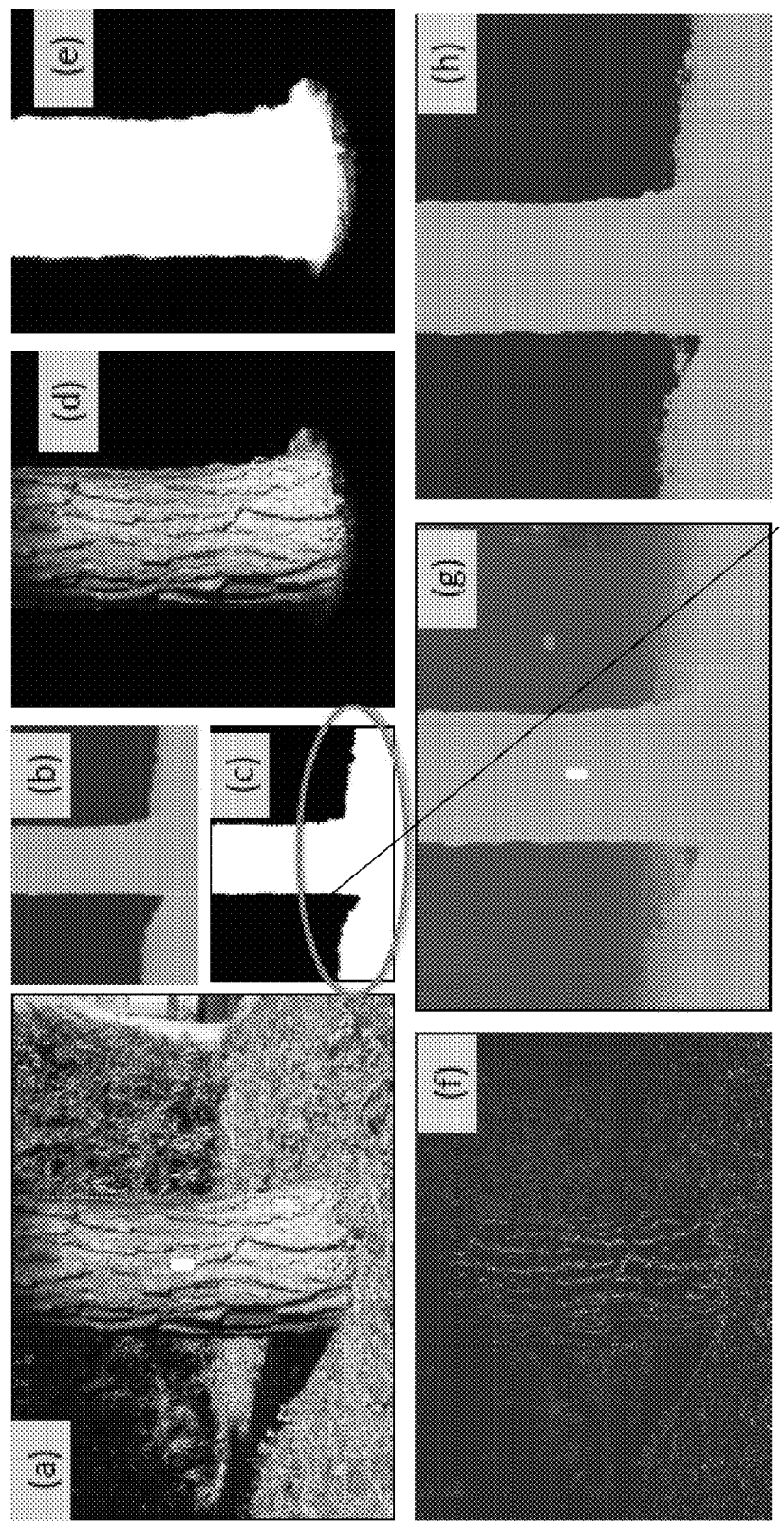
FIG. 17 conceptually illustrates a fifth example of semi-automatic interactive image matting in accordance with an embodiment of the invention.

FIG. 16 illustrates: (A) input RGB image. User marked foreground (white blob) and background (orange blob). (B) segmented depth map with trimap outlining it. (C) Initial alpha matte. Circles show problematic areas, which the user then fixes through the GUI. (D) After the user fixes the trimap, final image cutout. (E) Final alpha. (F) Input raw depth map. (G) Regularized depth map. (H) Segmented depth map. In this example, a very noisy input depth map (F) was used. In addition, the depth map was scaled down to quarter size in order to perform fast regularization. The regularized depth map was scaled up before using it for trimap generation. Even with such an operation, a thin trimap was obtained. It can be noted that, the depth map does not retain holes (in the areas 1605 marked in (C)). This is because the raw depth does not have this information. The user then manually corrected through the GUI to obtain a high quality final alpha (E).

FIG. 17 illustrates: (A) input RGB image. User marked foreground (white blob) and background (orange blob). (B)

segmented depth map with trimap outlining it. (C) Initial alpha matte. Circles show problematic areas, which the user then fixes through the GUI. (D) After the user fixes the trimap, final image cutout. (E) Final alpha. (F) Input raw depth map. (G) Regularized depth map. (H) Segmented depth map. This example uses a very cluttered scene with strong highlights and shadows. The input raw depth map (F) is very sparse after noise-filtering. Even in this case, only few foreground/background blobs were sufficient. However, as expected it is hard to isolate the tree back since the depth does not provide discrimination. The user then manually cleans up only the ground area. The trimap on the trunk of the tree 1705 was found to be accurate and no adjustment was needed. The final alpha matte (E) shows the fuzzy area at the bottom of the trunk. This is because the ground has similar colors/textures as that of the tree trunk at the bottom. This is a failure case of matting.

Figure 18:
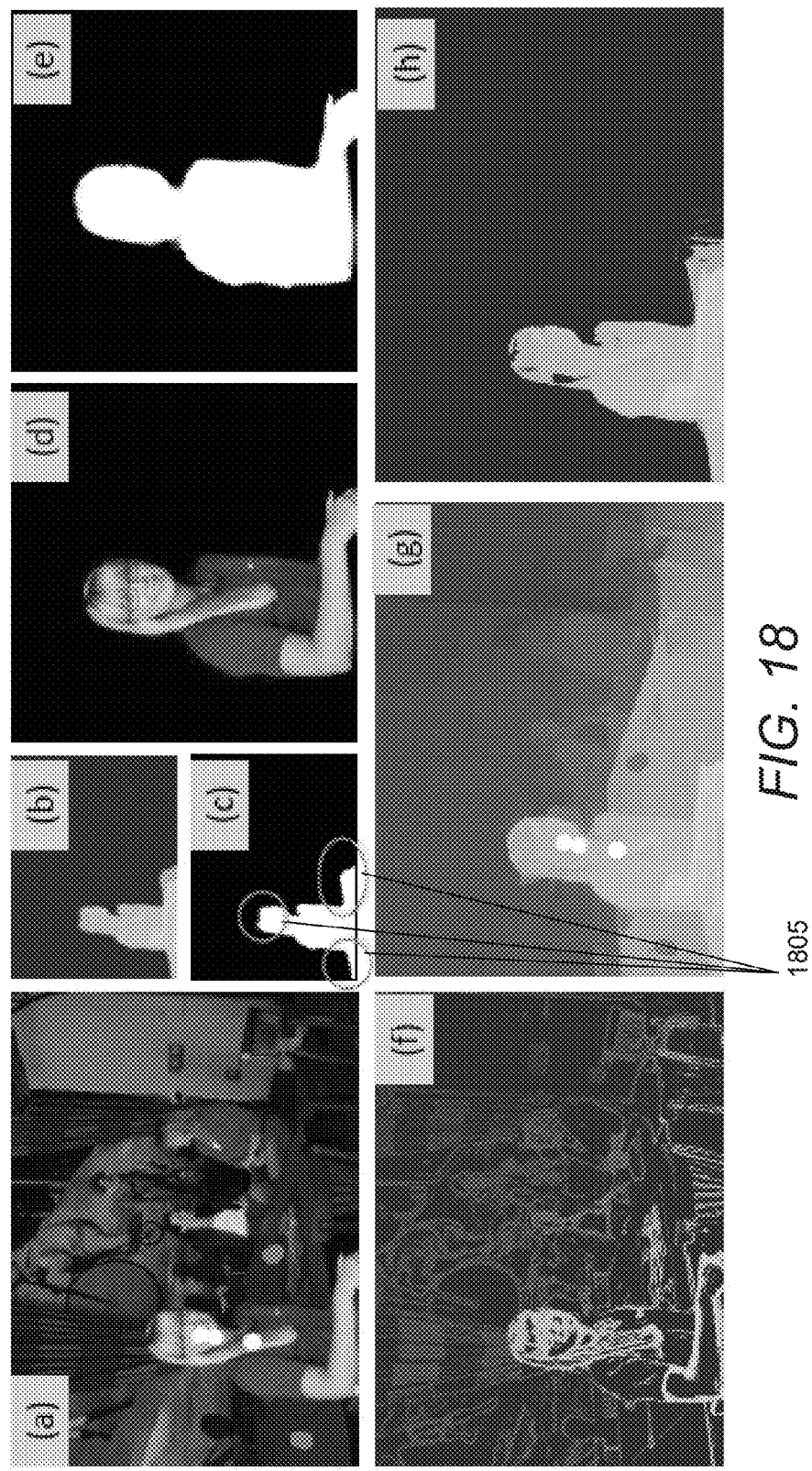
FIG. 18 conceptually illustrates a sixth example of semi-automatic interactive image matting in accordance with an embodiment of the invention.

FIG. 18 illustrates: (A) input RGB image. User marked foreground (white blob) and background (orange blob). (B) segmented depth map with trimap outlining it. (C) Initial alpha matte. Circles 1805 show problematic areas, which the user then fixes through the GUI. (D) After the user fixes the trimap, final image cutout. (E) Final alpha. (F) Input raw depth map. (G) Regularized depth map. (H) Segmented depth map. In this example, the scene is cluttered and also the input depth map has outliers (on the hair of the front most subject). As a result, the trimap fails to outline the subject correctly. However, the trimap is reasonable in most of the other places. After a few touch up strokes, a high quality final matte (E) was obtained.

While the above description contains many specific embodiments of the invention, these should not be construed as limitations on the scope of the invention, but rather as an example of embodiments thereof. Accordingly, the scope of the invention should be determined not by the embodiments illustrated, but by the appended claims and their equivalents.

What is claimed is:

1. An array camera, comprising:
    a plurality of cameras that capture images of a scene from different viewpoints;
    memory containing an image processing pipeline application;
    wherein the image processing pipeline application direct the processor to:
        capture a set of images using a group of cameras from the plurality of cameras;
        receive (i) an image comprising a plurality of pixel color values for pixels in the image and (ii) an initial depth map corresponding to the depths of the pixels within the image, wherein the initial depth map is generated using the set of images; and
        regularize the initial depth map into a dense depth map using pixels for which depth is known to estimate depths of pixels for which depth is unknown by using affine combinations of the depths of nearby known pixels to compute depths for the unknown pixel depths, wherein regularizing the initial depth map into the dense depth map further comprises performing Laplacian matting to compute a Laplacian L, wherein the Laplacian matting is optimized by solving a reduced linear system for depth values only in unknown regions;
    wherein regularizing the initial depth map into the dense depth map further comprises:
        finding an approximate dense depth map using a diffusion process where $L_D$ is a diffusion Laplacian constructed such that each pixel is connected to a plurality of its surrounding neighbors using spatial proximity;
        pruning the Laplacian L based upon the approximate dense depth map; and
        detecting and correcting depth bleeding across edges by computing a Laplacian residual R based upon the pruned Laplacian and removing incorrect depth values based on the Laplacian residual R; and
    using the dense depth map to perform image-based rendering.

2. The array camera of claim 1, wherein pruning the Laplacian L comprises:
    for each pair i,j of pixels in affinity matrix A, determine if i and j have depth differences beyond a threshold; and
    if the difference is beyond the threshold, purge the pair i,j within the affinity matrix A.

3. The array camera of claim 1, wherein the computing the Laplacian residual R comprises computing R=Lz* where z* is the regularized depth map, wherein removing incorrect depth values comprises identifying regions where R>0.

4. The array camera of claim 1, wherein a pixel for which depth is unknown is a pixel that has a confidence value below a particular threshold regarding the accuracy of the depth.

5. The array camera of claim 4, wherein the image processing application further directs the processor to use a binary confidence map C that indicates whether a depth at a given pixel is confident.

6. The array camera of claim 5, wherein the confidence map C is obtained by a thresholded gradient of intensity of an input image.

7. The array camera of claim 5, wherein the confidence map C is defined at texture and object edges within the image.

8. The array camera of claim 5, wherein the confidence map C is a sparse mn×mn diagonal matrix whose diagonal entries are binary confidence values.

9. The array camera of claim 5, wherein the image processing application further directs the processor to compute a new confidence map whenever the Laplacian residual R is greater than a threshold.

10. The array camera of claim 1, wherein the image processing application further directs the processor to utilize the regularized dense depth map to perform depth-based segmentation that can be dilated to create a trimap.

11. The array camera of claim 1, wherein an unknown pixel's depth is estimated as a weighted average of depths of k-nearest super-pixels.

12. The array camera of claim 11, where the weights are derived as a function of distance of an RGBxy feature of a pixel from super-pixel centroids.

13. The array camera of claim 1, wherein the Laplacian matting is optimized by solving a reduced linear system for alpha values only in unknown regions.

14. The array camera of claim 1, wherein the image processing application further directs the processor:
    determine an object of interest to be extracted from the image;
    generate an initial trimap using the dense depth map and the object of interest to be extracted from the image; and
    apply color image matting to unknown regions of the initial trimap to generate a matte for image matting.

15. The array camera of claim 1, wherein the image processing pipeline application directs the processor to generate a trimap based on the regularized depth map.

16. The array camera of claim 2, wherein the Laplacian matting is a kNN-based (K nearest-neighbor) Laplacian that pairs similar pixels without regards to their depth when constructing the affinity matrix A and Laplacian L.

17. The array camera of claim 1, wherein the image processing application further directs the processor to detect and correct depth bleeding across edges.

* * * * *